United States Patent
Clarke et al.

(10) Patent No.: US 6,751,583 B1
(45) Date of Patent: *Jun. 15, 2004

(54) HARDWARE AND SOFTWARE CO-SIMULATION INCLUDING SIMULATING A TARGET PROCESSOR USING BINARY TRANSLATION

(75) Inventors: Neville A. Clarke, Quorrobolong (AU); James R. Torossian, Whale Beach (AU)

(73) Assignee: VaST Systems Technology Corporation, Sunnyvale, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 09/933,579

(22) Filed: Aug. 20, 2001

Related U.S. Application Data

(63) Continuation-in-part of application No. 09/852,972, filed on May 9, 2001, which is a continuation of application No. 09/491,390, filed on Jan. 26, 2000, now Pat. No. 6,263,302, which is a continuation-in-part of application No. 09/430,855, filed on Oct. 29, 1999, now Pat. No. 6,230,114.

(51) Int. Cl.$^7$ .......................... G06F 9/455; G06F 17/50

(52) U.S. Cl. .......................... 703/17; 703/19; 703/20; 703/22; 717/127

(58) Field of Search .......................... 703/13, 14, 17, 703/19, 6, 22, 27, 28; 716/3, 18; 717/104, 127

(56) References Cited

U.S. PATENT DOCUMENTS 5,546,562 A * 8/1996 Patel .......................... 703/14
5,832,205 A    11/1998 Kelly et al. ............ 395/185.06

(List continued on next page.)

FOREIGN PATENT DOCUMENTS

EP    WO9859292    12/1998    .............. G06F/9/45
EP    WO9908191    2/1999    ........... G06F/12/00

(List continued on next page.)

OTHER PUBLICATIONS

Peter S. Magnusson, "Efficient Instruction Cache Simulation and Execution Profiling with a Threaded–Code Interpreter", Winter Simulation Conference, pp. 1093–1100, 1997.

(List continued on next page.)

*Primary Examiner*—Russell Frejd
(74) *Attorney, Agent, or Firm*—Dov Rosenfeld; Inventek

(57) ABSTRACT

A co-simulation design system to simulate on a host an electronic system that includes target digital circuitry and a target processor with an accompanying user program. The system includes a processor simulator to simulate execution of the user program by executing host software that includes an analyzed version of the user program. The system further includes a hardware simulator to simulate the target digital circuitry and an interface mechanism that couples the hardware simulator with the processor simulator. The user program is provided in binary form. Determining the analyzed version of the user program includes decomposing the user program into linear blocks, translating each linear block of the user program into host code that simulate the operations of the linear block, storing the host code of each linear block in a host code buffer for the linear block, and adding timing information into the code in the host code buffer on the time it would take for the target processor to execute the user program. The timing information incorporates target processor instruction timing. Adding of timing information includes inserting dynamic hooks into the host code that during execution invoke dynamic mechanisms that may effect timing and that cannot be determined ahead of execution such that while the processor simulator executes the analyzed version of the user program, the processor simulator accumulates simulation time according to a simulation time frame, the accumulated simulation time accounting for the target processor instruction timing as if the user program was executing on the target processor.

83 Claims, 12 Drawing Sheets

U.S. PATENT DOCUMENTS

| | | | | |
|---|---|---|---|---|
| 5,838,948 A | * | 11/1998 | Bunza | 703/27 |
| 5,926,832 A | | 7/1999 | Wing et al. | 711/141 |
| 5,946,472 A | * | 8/1999 | Graves et al. | 703/6 |
| 5,958,061 A | | 9/1999 | Kelly et al. | 714/1 |
| 6,031,992 A | | 2/2000 | Cmelik et al. | 395/705 |
| 6,052,524 A | * | 4/2000 | Pauna | 703/22 |
| 6,110,220 A | * | 8/2000 | Dave et al. | 716/3 |
| 6,178,542 B1 | * | 1/2001 | Dave | 716/18 |
| 6,181,754 B1 | * | 1/2001 | Chen | 375/350 |
| 6,199,152 B1 | | 3/2001 | Kelly et al. | 711/207 |
| 6,230,114 B1 | * | 5/2001 | Hellestrand et al. | 703/13 |
| 6,263,302 B1 | * | 7/2001 | Hellestrand et al. | 703/17 |
| 6,504,885 B1 | * | 1/2003 | Chen | 375/350 |
| 6,584,436 B2 | * | 6/2003 | Hellestrand et al. | 703/13 |

FOREIGN PATENT DOCUMENTS

| | | | | |
|---|---|---|---|---|
| EP | WO0077965 A2 | 12/2000 | | |
| EP | WO0077965 A3 | 12/2000 | | G06F/13/00 |
| EP | WO0127741 A1 | 4/2001 | | G06F/7/20 |
| EP | WO0127743 A1 | 4/2001 | | G06F/9/00 |
| EP | WO0127752 A1 | 4/2001 | | G06F/9/445 |
| EP | WO0127873 A1 | 4/2001 | | G06M/3/02 |

OTHER PUBLICATIONS

Robert F. Cmelik and David Keppel. Shade: A fast instruction-set simulator for execution profiling. Technical Report Jun. 6, 1993, Department of Computer Science and Engineering, University of Washington, Jun. 1993.

B. Cogswell and Z. Segall, "Timing Insensitive Binary to Binary Translation of Real Time Systems," Technical Report, ECE Dept., Carnegie Mellon University, 5000 Forbes Ave., Pittsburgh, PA 15213.

Peter Magnusson and Bengt Werner, Efficient Memory Simulation in SimICS, 28th Annual Simulation Symposium, Phoenix, Apr. 1995.

M. Rosenblum, S. Herrod, E. Witchel, and A. Gupta, "Complete Computer Simulation: The SimOS Approach," IEEE Parallel and Distributed Technology, Fall 1995.

E. Witchel and M. Rosenblum, "Embra: Fast and Flexible Machine Stimulation", In Proceedings of the 1996 SIGMETRICS Conference on Measurement and Modeling of Computer Systems, Philadelphia, May, 1996.

W. A. Christopher and S. J. Procter and T. E. Anderson. The Nachos Instructional Operating System. Technical Report UCB//CSD–93–739, University of California, Berkeley, Apr. 1993.

C Cifuentes and V Malhotra, Binary Translation: Static, Dynamic, Retargetable?. Proceedings International Conference on Software Maintenance. Monterey, CA, Nov. 4–8, 1996. IEEE–CS Press. pp. 340–349.

Lars Albertsson and Peter S. Magnusson. Simulation–Based Temporal Debugging of Linux. In Proceedings of the 2nd Real–Time Linux Workshop, Lake Buena Vista, FL, USA, Nov. 2000.

Harold W. Cain, Kevin M. Lepak, and Mikko H. Lipasti, "A Dynamic Binary Translation Approach to Architectural Simulation," Workshop on Binary Translation, Oct. 2000 (In conjunction with International Conference on Parallel Architectures and Compilation Techniques–Philadelphia, PA Oct. 15, 2000–Oct. 19, 2000.

Lars Albertsson, Simulation–Based Debugging of Soft Real–Time Applications. Presented in the Work–in–Progress session of 7th IEEE Real–Time Technology and Applications Symposium, (RTAS 2001), May 30–Jun. 1, 200, Taipei, Taiwan.

Gschwind, M., Altman, E. R., Sathaye, S., Ledak, P., and Appenzeller, D. 2000. Dynamic and Transparent Binary Translation. IEEE Computer Magazine 33, 3 (Mar.), 54–59.

Lars Albertsson and Peter S Magnusson, Using Complete System Simulation for Temporal Debugging of General Purpose Operating Systems and Workloads. Presented at 8th International Workshop on Modeling, Analysis, and Simulation of Computer and Telecommunication Systems (MASCOTS 2000), Aug. 29–Sep. 1, 2000, San Francisco, CA.

Kemal Ebcioglu, Erik R. Altman: DAISY: Dynamic Compilation for 100% Architectural Compatibility. ISCA 1997–24th International Symposium on Computer Architecture, Denver, Colorado, USA, Jun. 2–4, 1997, pp. 26–37.

L. Tauro and F. Vahid, "Message–Based Hardware/Software Communication in HDL/C Environments," Asia–Pacific Conference on Hardware Description Languages, Aug. 1997.

C. Zheng and C. Thompson, "PA–RISC to IA–64: Transparent Execution, No Recompilation", IEEE Computer, 33(3):4752, 2000.

D. Nagle, R. Uhlig, T. Mudge, and S. Sechrest. Kernel-based memory simulation ACM SIGMETRICS Conf. Measurement and Modeling of Computer Systems, May 1994, pp. 286–287.

V. Zivojnovi'c, S. Pees, Ch. Schlager, R. Weber, and H. Meyr, Supersim—A New Technique For Simulation Of Programmable Dsp Architectures In the Proceedings of ICSPAT'95 (International Conference on Signal Processing—Applications and Technologies, Boston, USA, pp. 1748–1763, 1995.

S. A. Herrod. Using Complete Machine Simulation to Understand Computer System Behavior. PhD thesis, Stanford University, Feb. 1998.

C Cifuentes and M Van Emmerik UQBT: Adaptable Binary Translation at Low Cost Computer, IEEE Computer, vol. 33, No. 3, Mar. 2000, pp. 60–66.

E. R. Altman, D. Kaeli, and Y. Sheffer. Welcome to the Opportunities of Binary Translation. IEEE Computer, vol. 33, No. 3, pp. 40–45, Mar. 2000.

Vojin Zivojnovi'c, Stefan Pees, Christian Schlager, Markus Willems, Rainer Schoenen, and Heinrich Meyr, "DSP Processor/Compiler Co–Design: A Quantitative Approach, " in Proc. ISSS, 1996, To be presented at ISSS.– 9th International Symposium on System Synthesis, Nov. 6–8, 1996, San Diego, CA, USA.

J. Chen, A. Borg, N. Jouppi, "A Simulation Based Study of TLB Performance," Proc. of the 18th Int. Symp. on Computer Architecture, pp. 114–123, 1991.

VAST Systems, Flyer handed out at Intel Developers Forum, Fall 2000, Aug. 22–24, 2000, San Jose, CA.

Pardo, "Instruction–Level Stimulation and Tracing," online bibliography, last updated Jan. 26, 2001,available at www.x-sim.com/bib.

Mendel Rosenblum, Edouard Bugnion, Scott Devine and Steve Herrod. Using the SimOS Machine Simulator to study Complex Computer Systems, ACM Transactions on Modelling and Computer Simulation (TOMACS), 7(1), pp. 78–103. Jan. 1997.

Richard L. Sites, Anton Chernoff, Matthew B. Kirk, Maurice P. Marks, Scott G. Robinson: Binary Translation. CACM 36 (2): 69–81 (1993).

* cited by examiner

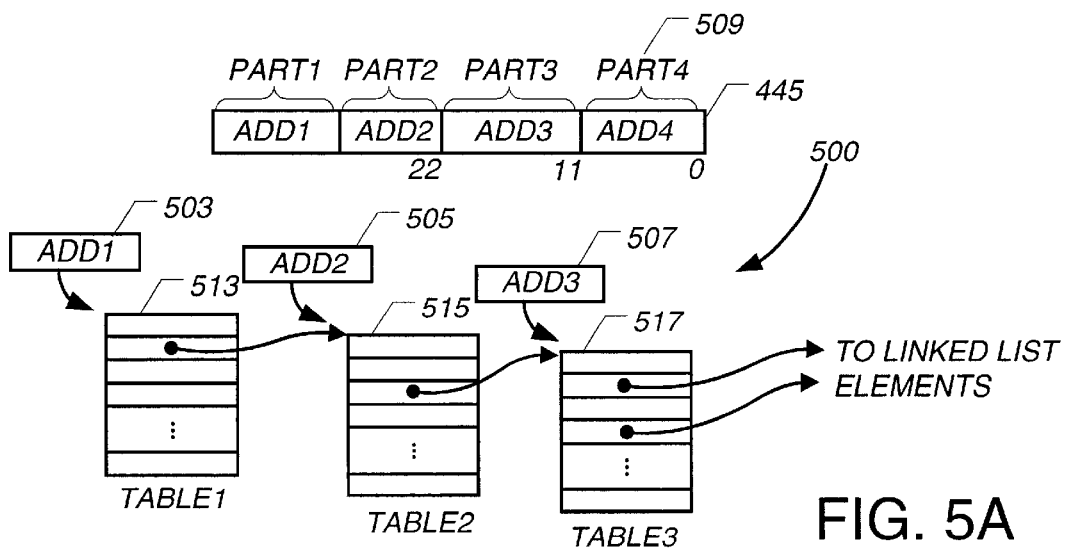
FIG. 5A
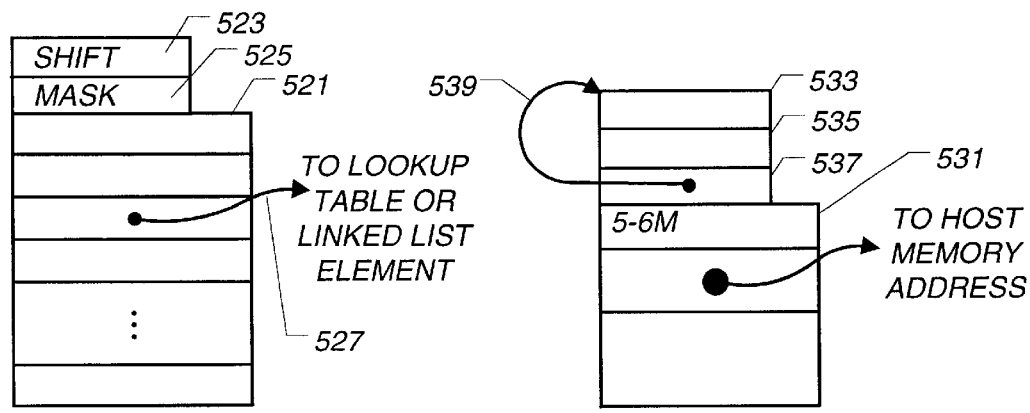
FIG. 5B
FIG. 5C

HARDWARE AND SOFTWARE CO-SIMULATION INCLUDING SIMULATING A TARGET PROCESSOR USING BINARY TRANSLATION

CROSS-REFERENCE TO RELATED APPLICATIONS

This is a continuation-in-part of U.S. patent application Ser. No. 09/852,972 filed May 9, 2001, entitled HARDWARE AND SOFTWARE CO-SIMULATION INCLUDING SIMULATING THE CACHE OF A TARGET PROCESSOR, the benefit of the filing of which is hereby claimed under 35 U.S.C. §120. U.S. patent application Ser. No. 09/852,972 is a continuation of U.S. patent application Ser. No. 09/491,390, filed on Jan. 26, 2000, now U.S. Pat. No. 6,263,302, that is a continuation-in-part of U.S. patent application Ser. No. 09/430,855, filed Oct. 29, 1999, now U.S. Pat. No. 6,230,114, and entitled HARDWARE AND SOFTWARE CO-SIMULATION INCLUDING EXECUTING AN ANALYZED USER PROGRAM. U.S. patent applications Ser. Nos. 09/852,972 and 09/430,855 are referred to as the "Parent Applications" herein and are both incorporated herein by reference.

FIELD OF THE INVENTION

The present invention relates to computer software and hardware simulators, and more specifically, to a system and method to simulate an electronic system that includes one or more target processors executing software and interacting with hardware.

BACKGROUND

Computer simulation of digital hardware systems has become a common technique to reduce the cost and time required for the design of such hardware systems. Simulating digital hardware allows a designer to predict the functioning and performance of the hardware prior to fabricating the hardware.

More and more digital systems incorporate a processor, including a microprocessor, a digital signal processor, or other special purpose computer processor. There has been increased effort to develop a simulation system that includes simulating the hardware and simulating the running of software on one or more processors that are included in the digital system. Having such a simulation system allows a designer to test the operation of software on the processor(s) before a physical processor is available. Thus, for example, a designer may be able to start designing a system incorporating a new microprocessor before the manufacturer actually releases physical samples of the microprocessor. In addition, a system designer designing an integrated circuit or a system on a printed circuit board that includes a processor can, for example, use the simulation system to test the integrated circuit or printed circuit board implementation, including operation of software on the processor part, and any testing interactions between the processor and the other digital circuit elements of the integrated circuit or board, before the integrated circuit or board is fabricated. This clearly can save time and money.

Nomenclature

A simulation system for simulating both the digital hardware that includes one or more target processors and the running of software on the processor(s) is called a co-simulation design system, a co-simulation system, or simply a design system herein, and the environment for operating such a co-simulation system is called a design environment. The processor is called a target processor and the computer system on which the environment operates is called the host computer system or simply the host. The host computer system includes one or more host processors. The hardware other than the target processor is called digital circuitry. The computer software program that is designed by a user to operate on the target processor is called the user program or the target code.

The target processor typically includes memory and one or more caches, for example a data cache (or D-cache) and an instruction cache (or I-cache). The target processor typically may also include a memory management unit (MMU) that converts virtual addresses into physical memory addresses and possibly physical I/O device addresses. The MMU may include a translation lookaside buffer (TLB) to improve address translation performance. A TLB is a hardware element that acts as a cache of recent translations and stores virtual memory page to physical memory page translations. Given a memory address (an instruction to fetch, or data to load or store), the target processor first looks in the TLB to determine if the mapping of virtual page to physical page is already known. If so (a "TLB Hit"), the translation can be done quickly. But if the mapping is not in the TLB (a "TLB Miss"), the correct translation needs to be determined.

The target processor may be a separate microprocessor with the digital circuitry being external to the microprocessor (e.g., on a printed circuit board or elsewhere in the system), or may be a processor embedded in an application specific integrated circuit (ASIC) or a custom integrated circuit (IC) such as a very large scale integrated (VLSI) device, with the digital circuitry including some components that are part of the ASIC or IC, and other components that are external to the ASIC or IC.

The host processor also includes memory, and the host memory is referred to as "host memory" herein. The physical address of the host memory is referred to as the "host address" herein. When the word "address" is used without specifying the host, then it refers to the target address.

Desirable Aspects for a Co-Simulation Design System

A design environment capable of co-simulation requires the capability of accurately simulating the digital circuitry, including timing, and the capability of accurately simulating the running of the user program (i.e., the target code) on the target processor, including the accurate timing of operation of the user program and of any software/hardware interaction. The first requirement is available today in a range of simulation environments using hardware description languages (HDLs) such as Verilog and VHDL. It also is available as a set of constructed libraries and classes that allows the modeling of hardware in a higher-level language such as 'C' or 'C++.' The second requirement pertains to a processor simulator using an executable processor model that both accurately simulates the execution of a user program on the target processor, and can interact with the digital circuitry simulation environment. Such a processor simulator should provide timing information, particularly at times of software/hardware interaction, i.e., at the software/hardware interface. A processor model that includes such accurate timing information is called a "quantifiable" model herein.

One known way of providing such processor simulation is to simulate the actual hardware design of the processor, for example by specifying a processor model in a hardware description language (HDL). The main but great disadvantage of so simulating the operation of the processor is the slow execution speed, typically in the range of 0.1–100 instructions per second.

Another known way of accurately simulating the execution of software on a processor for inclusion in a co-simulation environment is an instruction set simulator (ISS), wherein both the function and the sequencing of the microprocessor is mimicked in software. An instruction set simulator still executes relatively slowly, compared for example to how fast a program would be executing on the target processor. An ISS executes in the range of 1,000 to 50,000 instructions per second depending on the level of timing and operational detail provided by the model.

Real systems execute 50–1000 million instructions per second or more, so that the ISS or full hardware simulation techniques have a disparity of a factor between about 10,000 to 200,000 in performance; 3 to 60 hours of simulation may be needed to model 1 second of real-time target processor performance.

One solution to the slow speed of simulating a processor is to use a hardware processor model. This device includes a physical microprocessor and some circuitry for interfacing and interacting with the design environment simulating the digital circuitry. The memory for the target processor is simulated as part of the digital circuitry. Such an approach is fairly expensive. Another limitation is due to having two definitions of time operating on the same simulation system: simulation time of a hardware simulator, and processor time, which is real time for the hardware processor. Correlating these is difficult.

Another solution is to use an emulator as the target processor model. An emulator, like a hardware processor model, is a hardware device, typically the target processor, and usually includes some memory. The emulator is designed to emulate the operation of the microprocessor. Such a processor emulator when it includes memory can execute the user program directly, but again is expensive and may require the development of external circuitry to interact with the hardware simulator simulating the digital circuitry. U.S. Pat. No. 5,838,948 describes an environment that uses an emulator for speeding up the running of a user program in the design environment.

While sometimes it is desired to run a simulation with great precision at a high level of detail, at other times, less detail may suffice, enabling faster execution of the simulation. There therefore is a need in the art for an executable and quantifiable processor model that can be used in a co-simulation system and that models the operation of the target processor at an elected level of detail, including an elected level of detail at the hardware/software interface.

Computer networks are becoming ubiquitous, and it is desired to be able to operate a co-simulation design system on a computer network, with different elements of the design system running on different processors of the computer network to speed execution. Similarly, multiprocessor computers are also becoming commonplace, and it would be desirable to be able to operate a co-simulation design system on a multiprocessor computer, with different elements running on different processors of the multiprocessor computer.

Electronic systems nowadays may include more than one target processor. It is therefore desirable to have a co-simulation design system that provides for rapidly simulating such an electronic system, including simulating respective user programs executing on the target processors, such processor simulation providing timing detail that takes into account instruction timing and pipeline effects for target processors that include a pipeline.

The Parent Applications

The Parent Applications describe a method and system for rapidly simulating a target processor executing a user program. Described is a processor model for the target processor that operates up to the host processor speed on a host computer system and yet takes into account instruction timing and pipeline effects such as pipeline hazards and/or cache effects such as cache misses. The model can be incorporated into a design system that simulates an electronic circuit that includes the target processor and digital circuitry. The Parent Applications also describe using more than one such processor models in a design system that simulates an electronic circuit that includes more than one target processor and digital circuitry. A further feature described in the Parent Applications is how a user can modify the processor model to include more or less detail.

The Parent Applications' design system operates on a host computer system and simulates an electronic system that contains target digital circuitry and a target processor. The design system includes a hardware simulator simulating the target digital circuitry, a processor simulator simulating the target processor by executing a user program substantially on the host computer system, and an interface mechanism that couples the hardware simulator with the processor simulator including passing information between the hardware simulator and the processor simulator. The hardware processor provides a simulation time-frame for the design system.

In one version, at significant events including events that require the user program to interact with the target digital circuitry, the operation of the processor simulator is suspended and associated event information is passed from the processor simulator to the hardware simulator. The operation of the processor simulator then is resumed when the hardware simulator processes information and passes an event result back to the processor simulator.

The processor simulator described in the Parent Applications accumulates a simulation time delay when operating, the simulation time delay determined using timing information that accounts for instruction timing including pipeline effects and/or cache effects. A static analysis process is performed on the user program, i.e., a process obtained by analyzing the user program prior to running the analyzed version of the user program on the processor simulator, determines timing information in accordance to characteristics of the target processor including instruction timing characteristics and, in one aspect, pipeline characteristics. The static analysis process comprises decomposing the user program into linear blocks of one or more instructions; determining the time delay for each linear block of the user program using characteristics of the target processor; and combining the linear block timing information with the user program to determine the timing information for the processor simulator.

Any timing effects, such as cache misses in a D-cache or an I-cache, are dependent on the current state of the cache, and cannot be known until runtime. Static analysis cannot easily account for such timing. Another aspect of the Parent Applications is dynamic analysis by including code to simulate a cache or other dynamic components. In one aspect of the Parent Applications, the processor simulator includes a cache simulator that simulates operation of the cache to account for the effects of cache misses on timing.

The hardware simulator provides a simulation time-frame for the design system. In one version, at significant events, including events that require the user program to interact with the target digital circuitry, the operation of the processor simulator is suspended and associated event information is passed from the processor simulator to the hardware simulator. The operation of the processor simulator then is resumed when the hardware simulator processes information and passes an event result back to the processor simulator.

The static analysis process comprises decomposing the user program into linear blocks of one or more instructions; determining, using characteristics of the target processor, the time delay for each linear block of the user program that would be incurred by executing the linear block with no cache misses, and combining the linear block timing information with the user program to determine the timing information for the processor simulator. In the case that the processor model includes a cache simulator, the analysis process also includes determining those parts of the user program that include one or more references that might require a cache lookup, and inserting hooks into the analyzed user program to invoke, at run time, the cache simulator for the references that includes a memory reference that requires a cache lookup in order to account for cache misses in timing.

In one embodiment, the hardware simulator runs on a HDL and at least some of the digital circuitry is specified in the HDL. In another embodiment, all or some of the digital circuitry is described to the hardware simulator in a higher-level language such as such as 'C' or 'C++.' One implementation described in the Parent Applications is when the user program includes statements in a higher-level language. An alternate implementation for which the present invention is particularly applicable is the case that the user program is provided as executable (binary) code in the target processor's machine language.

Other features and aspects of the invention will become clear from the detailed description that follows.

SUMMARY

One aspect of the invention is a method and system for rapidly simulating on a host computer system an electronic system that includes both digital circuitry and one or more target processors each executing a user program, with the target processor including a cache or an MMU or both. One feature of the invention is providing a processor model for each target processor that operates fast—potentially even faster than the target processor speed—and yet takes into account instruction timing and cache effects when a cache is included and MMU effects when an MMU is included. As an additional feature, the processor model also takes into account pipeline effects such as pipeline hazards for target processors that have a pipeline. Another feature of the invention is providing such a processor model that is modifiable by a user to include more or less detail. Another feature of the invention is providing such a processor model that can be incorporated into a design system that simulates an electronic circuit that includes the target processor and digital circuitry.

Described herein is a co-simulation design system to simulate on a host processor an electronic system that includes target digital circuitry and a target processor with an accompanying user program. The system includes a processor simulator to simulate execution of the user program by executing host software that includes an analyzed version of the user program. The system includes a hardware simulator to simulate the target digital circuitry and an interface mechanism that couples the hardware simulator with the processor simulator including controlling communication between the processor simulator and the hardware simulator.

The user program is provided in binary form. Determining the analyzed version of the user program includes decomposing the user program into linear blocks, translating each linear block of the user program into host code that simulates the operations of the linear block, storing the host code of each linear block in a host code buffer for the linear block, and adding timing information into the code in the host code buffer on the time it would take for the target processor to execute the user program. The timing information incorporates target processor instruction timing. The adding of timing information includes inserting dynamic hooks into the corresponding host code that during execution invoke dynamic mechanisms that may effect timing and that cannot be determined ahead of execution such that while the processor simulator executes the analyzed version of the user program, the processor simulator accumulates simulation time according to a simulation time frame, the accumulated simulation time accounting for the target processor instruction timing as if the user program was executing on the target processor.

In one version, the target processor includes a cache and the processor simulator includes a cache simulator. Determining the analyzed version of the user program further includes, for each linear block, identifying those parts in the linear block of the user program that include one or more memory references that might require a cache lookup, and inserting hooks into the corresponding host code in the corresponding host code buffer to invoke, at run time, the cache simulator for any simulated memory reference that might require a cache lookup. Executing the analyzed version of the user program causes the cache simulator to be invoked for the memory references, the cache simulator accounting for the effect of cache lookups on timing, and accumulates simulation time as if the user program was executing on the target processor, the accumulated simulation time also accounting for cache lookup effects.

The cache simulator includes a simulated cache containing simulated cache entries, and a cache search mechanism for searching the simulated cache for an entry that matches an address. One embodiment of the cache search mechanism includes a multi-level lookup table search mechanism that requires the same (small) number of host processor operations independent of whether the lookup is successful or not. This avoids tests that might slow down the simulation in the host code that implements the search mechanism.

The cache simulator stores, at execution time, for an instruction that might require a cache lookup, a pointer to the simulated cache entry that results from a lookup of the simulated cache the first time the execution of the target instruction is simulated such that the cache simulator can avoid looking up the simulated cache the next time the target instruction is executed in simulation.

One version is for a target processor that includes an MMU for translating virtual addresses to physical addresses. For this version, the processor simulator includes an MMU simulator, and determining the analyzed version of the user program further includes, for each linear block, identifying those parts in the linear block of the user program that include one or more memory references that might require accessing the MMU, and inserting hooks into the corresponding host code in the corresponding host code buffer to invoke, at run time, the MMU simulator for any simulated memory reference that might require an MMU access. Executing the analyzed version of the user program causes the MMU simulator to be invoked for the memory references, the MMU simulator accounting for the effect of MMU accesses on timing, and accumulates simulation time as if the user program was executing on the target processor, the accumulated simulation time also accounting for MMU access effects.

The MMU includes a TLB and the MMU simulator includes a TLB simulator containing simulated TLB entries and a TLB search mechanism for searching the simulated TLB for an entry that matches a virtual address and a page size. The TLB search mechanism includes a multi-level lookup table search mechanism that requires the same number of table lookups, and thus host processor operations independent of whether the lookup is successful or not.

The TLB simulator stores at execution time, for an instruction that might include accessing the MMU, a pointer to the simulated TLB entry that results from a lookup of the simulated TLB the first time execution of the target instruction is simulated such that the TLB simulator can avoid looking up the simulated TLB the next time the target instruction is executed in simulation.

The attributes of a TLB entry are encoded in the corresponding simulated TLB entry such that the testing of whether or not a virtual address and a page size match an entry of the simulated TLB automatically also checks permission without a separate permissions check required. In one version, the simulated TLB entry is encoded such that the address and page size match test fails when there is no permission or the alignment is incorrect. The simulated TLB entry includes a set of versions of the TLB entry virtual address and TLB entry page size information, each version corresponding to a different mode, and wherein testing a virtual address and page size pair for a match in a simulated TLB entry automatically also includes indexing to the version of the TLB entry virtual address and TLB entry page according to the mode.

Running the processor simulator includes, for each host code buffer, looking up the next host code buffer to execute and executing the code in the next code buffers in sequence. The looking up the next host code buffer at the conclusion of processing the code in a present host code buffer includes searching for the next host code buffer the first time the present host code buffer is processed, and, after the next host code buffer is found or newly created, storing for the present host code buffer a pointer to the next host code buffer such that the search for the next host code buffer can be avoided the next time the present host code buffer is processed and its next host code buffer is looked up.

Other features and aspects of the invention will become clear from the detailed description that follows.

DESCRIPTION OF THE FIGURES

The present invention will be more fully understood from the detailed embodiments of the invention, which, however, should not be taken to limit the invention to any specific embodiment but are for explanation and better understanding only. The various embodiments in turn are explained with the aid of the following drawings:

FIG. 5A shows a three-level lookup table search mechanism to search a set of linked list elements representing the physical to host address mapping according to an embodiment of the invention.

FIG. 5B shows a lookup table embodiment for a multi-level lookup table search mechanism according to an embodiment of the invention.

FIG. 5C shows a linked list element that includes a replica lookup table according to an embodiment of the invention.

DETAILED DESCRIPTION OF THE EMBODIMENTS

Figure 1:
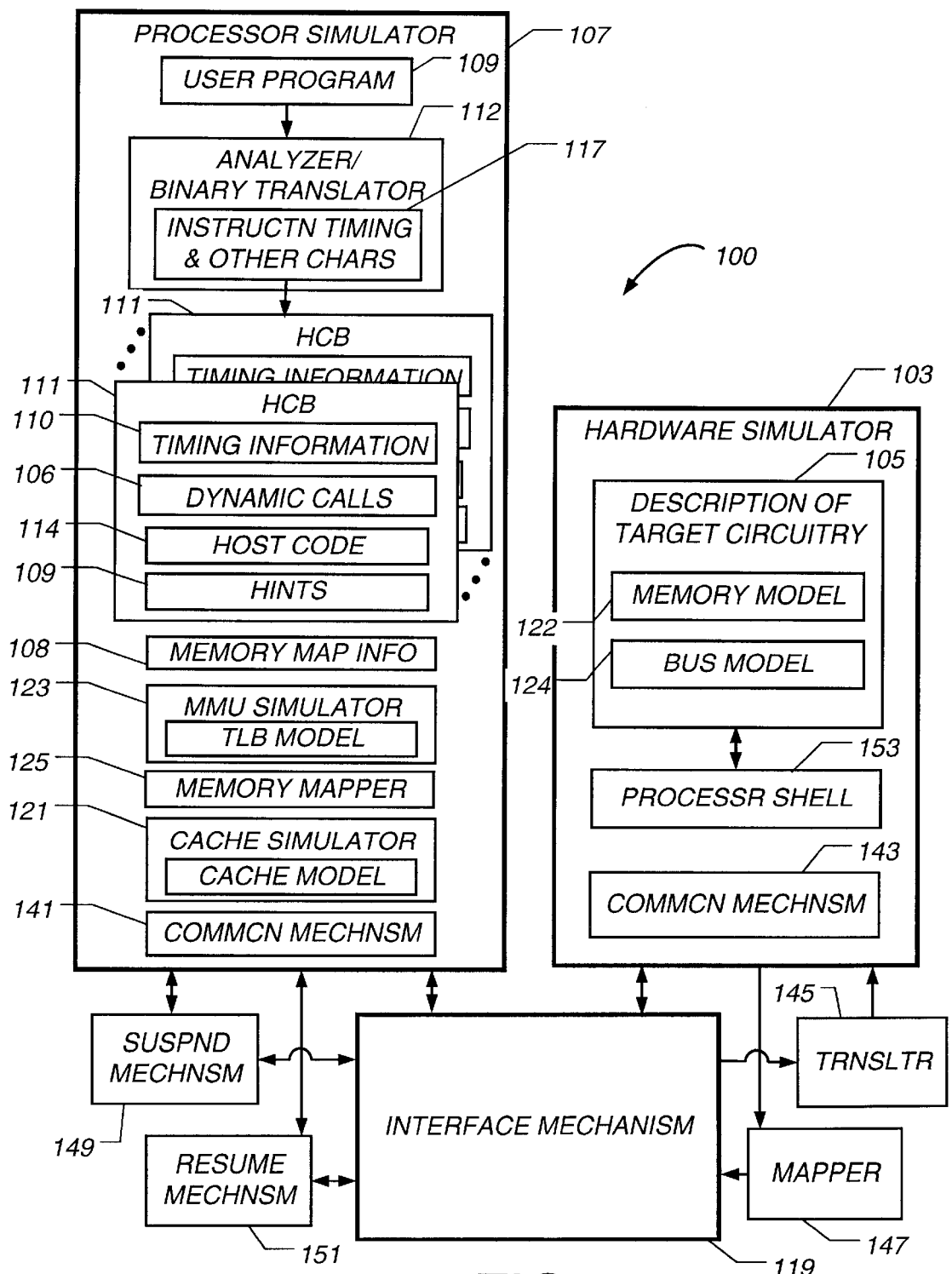
FIG. 1 shows a single processor embodiment of a co-simulation design system according to the invention. Multiple processor embodiments are similar but include more than one processor simulator.

The first one or two digits in a reference numeral indicate on which figure that reference numeral is first introduced. For example, any reference numerals between 100 and 199 are first introduced in FIG. 1, any between 200 and 299 are first introduced in FIG. 2, any between 1000 and 1099 are first introduced in FIG. 10, and so forth.

The method, processor model, and system embodiments of the invention include components that operate on a host computer system. The host computer system may be a single computer, for example, a computer workstation. Such workstations are readily available, and may operate under any operating system (OS) such as any variants of the UNIX operating system (including LINUX™), or any variants of Microsoft Windows® (e.g., Windows NT, Windows 98, or Windows 2000 from Microsoft Corporation, Redmond, Wash.), or the Mac OS® (Apple Computer, Cupertino, Calif.). Some embodiments operate under a computer network that includes a plurality of host processors interconnected as a network, while other embodiments run on a multiprocessor computer that includes a plurality of host processors. The term "host computer system" thus means a computer system with a single host processor, or a plurality of interconnected host processors that may be interconnected as a network, or a multiprocessor computer.

The Co-Simulation System

FIG. 1 shows a design system embodiment of the present invention. Design system 100 operates on a host computer system and simulates an electronic system that contains target digital circuitry and at least one target processor executing a user program. In one embodiment, the user program is provided as executable binary code for execution on the target processor. The target processor typically may or may not have a pipeline, and may or may not include a memory management unit (MMU), also called a virtual memory system, that accepts virtual addresses and determines physical addresses or a cache system, or both a cache system and an MMU. The cache system may be either a single cache or a separate data cache and instruction cache. For the remainder of this description, "instruction cache" or "I-cache" shall refer to the separate instruction cache when the target processor has a separate I-cache, or the cache when there is only one cache. Similarly, any reference to a "data cache" or "D-cache" shall refer to the appropriate target cache, depending, for example, on whether or not there is a separate D-cache.

A hardware simulator 103 simulates the target digital circuitry. In one embodiment, the hardware simulator operates in a hardware description language, in particular Verilog, and so the description 105 of the target digital circuitry is provided by the user in the form of Verilog code. The invention can also work with other hardware description languages such as VHDL, and with hardware descriptions in terms of libraries, or libraries and classes written in a higher-level language such as 'C,' or 'C++.' Thus, the invention does not depend on the particular hardware models used in the hardware simulator 103.

Co-simulation design system 100 also includes a processor simulator for each processor that simulates the target processor executing the user program, and one such processor simulator is shown as 107. The processor simulator 107 executes the user program substantially on the host computer system, which provides for extremely rapid simulation of the software. While only one processor is shown, the simulation system can accommodate is additional processor simulators of additional target processors to simulate a multiprocessor system.

Processor simulator 107 simulates execution of a user program 109 on the target processor by executing an analyzed version 111 of the user program 109. The analyzed version of the user program is thus a program derived from the user program by an analysis process carried out by block 112.

In one embodiment, determining the analyzed version includes performing dynamic binary translation of the target code (the user program in binary form) into host instructions that carry out the same operation. The dynamic binary translation is carried out linear block by linear block by an analyzer/binary translator 112. The translated code, i.e., host code 114 for each linear block, is stored in a buffer 111 called the host code buffer (HCB) for that block to provide for reusing that translated code if the same linear block of target code is encountered again during the simulation. Thus, the analysis and translation process carried out by block 112 produces a plurality of HCBs 111. The host code in each HCB 111 is executed, and then the next linear block of target code is either translated into an HCB prior to execution, or, if already available in a previously filled HCB, directly executed.

The dynamic binary translation aspects of the processor simulator are described in more detail below.

The analysis of analyzer/binary translator 112 includes adding timing information 110 for the code in each HCB on the time it would take for the target processor to execute the user program 109 such that while the host processor executes the analyzed/translated version 114 of the user program in HCB 111, the processor simulator 107 generates accurate execution timing information incorporating the target processor instruction timing as if the user program 109 was executing on the target processor. For processors that have a pipeline, the timing information incorporates pipeline effects. Furthermore, for a processor that includes a cache and an MMU, the processor simulator includes a cache simulator 121 executing a cache model, and an MMU simulator 123 that simulates the operation of the target MMU. In one implementation for a target processor that includes a translation lookaside buffer (TLB) in the MMU, the MMU simulator 123 includes a TLB simulator. One embodiment of the processor simulator 107 further includes a memory mapper 125 that translates between target memory addresses and host memory addresses and using memory mapping information 108 that relates target addresses to host addresses.

An interface mechanism 119 is coupled to both the processor simulator 107 and the hardware simulator 103 and enables communication between processor simulator 107 and hardware simulator 103. Processor simulator 107 includes a communication mechanism 141 to pass information to the hardware simulator 103 using the interface mechanism when an event requires interaction of user program 109 with the target digital circuitry. Such events include times when user program 109 encounters an input/output instruction, or when the program has an arithmetic exception during execution, and other significant events.

In one embodiment, the target digital circuitry includes a target memory for the target processor, and the hardware simulator provides for simulating at least some of the operations of the target memory by running a hardware model 122 of the target memory, with the contents of the simulated target memory stored in the host computer system. Typically, the user selects to simulate only some bus transactions that may occur in executing the user program by running bus hardware model 124 on the hardware simulator.

In another embodiment, the co-simulation design system 100 provides for accurately simulating bus transactions. In such an embodiment, the description 105 of the target digital circuitry includes a bus hardware model 124 of the bus of the target processor. At least some of the operations of the target processor bus may be simulated by running bus hardware model 124 on the hardware simulator. Typically, the user may select to simulate only some bus transactions that may occur in executing the target processor by running bus hardware model 124 on the hardware simulator.

When both the target processor bus and the target processor memory are simulated by target memory model 122 and target bus model 124, a significant event may include, for example, the cache simulator's determining that a cache miss has occurred that requires a number of bus cycles and memory accesses to be simulated in the bus model 124 and memory model 122 of the target digital circuitry. In such an example, the user may choose to simulate these bus and memory transactions using the target memory model 122 and target bus model 124. Note that the memory model 122 preferably does not store actual data but rather uses the memory of the host computer system for data storage. Similarly, the bus model 124 preferably does not move actual data but rather simulates the timing of the bus cycles required to move data.

The hardware simulator 103 also includes a communication mechanism 143 to pass information to processor simulator 107 using the interface mechanism at events significant to the hardware simulator 103 that need to be communicated to the processor simulator. Such an event includes when a signal in the target digital circuitry connected to the target processor is asserted, for example, an interrupt.

The interface mechanism 119 passes the information across the hardware/software boundaries. One interface mechanism embodiment 119 includes a message passing kernel. Thus, in one embodiment, both the processor simulator and the hardware simulator communication mechanisms 141 and 143 are included in interface mechanism 119. Also, the processor simulator and the hardware simulator are tasks under the kernel, and the kernel provides the mechanism for the tasks to communicate whenever one or the other task requires it. When several processor simulators operate, each runs independently as a task under the kernel.

Those in the art will appreciate that other types of interface mechanisms are possible, including using multiple threads, and using a complete or partial operating system.

The hardware simulator and the processor simulator each has its own definition of time, i.e., its own time domain (time frame), with the interface mechanism providing a mechanism to synchronize time whenever processor simulator 107 and hardware simulator 103 need to communicate. Similarly, when several processor simulators operate, each processor simulator has its own concept of time, i.e. each accumulates simulation time according to a time frame, as does the hardware simulator.

The analyzed/translated version of the user program is obtained linear-block by linear block by the analysis and binary translation process performed on the target code— user program 109—by analyzer/binary translator 112. The analysis/binary translation process includes dynamic binary translation of the target code into corresponding host code linear block by linear block and insertion of dynamic hooks 106 into the corresponding host code in each HCB that during execution invoke dynamic mechanisms that may effect timing and that cannot be determined ahead of execution. For example, dynamic hooks 106 may include invoking the cache simulator 121 when there are memory references in the user program 109 that may produce a cache miss. In the case the target processor includes an MMU and the processor simulator 107 includes an MMU simulator 123, analysis further includes identifying those parts in the linear block of the user program that include one or more memory references that might require accessing the MMU, and inserting hooks into the corresponding host code in the corresponding HCB to invoke the MMU simulator 123 during execution of the analyzed (host) program to simulate dynamic address translations that would occur if the user program was being executed on the target processor. The analysis/translation process of unit 112 may further include calculating for each linear block the time delay that would be incurred by executing that linear block on the target processor and adding host code to advance the simulation time.

The time calculating uses characteristics 117 of the particular target processor, including instruction timing and characteristics of the processor. Such processor characteristics may include pipeline characteristics for a target processor that includes a pipeline so that the result is the analyzed program which includes the instruction of user program 109, and timing information 110 that includes pipeline effects.

When an event occurs that requires the processor simulator to communicate to the hardware simulator, the processor simulator's communication mechanism 141 sends information to hardware simulator 103 associated with the event through the interface mechanism 119. The hardware processor receives the associated event information and processes it. Typically, the event may be an input/output instruction in the user program to send information or to poll a port or to execute a number of bus cycles, or otherwise to interact with the hardware simulator.

The associated event information preferably includes time delay information indicating an amount of simulated time since a previous event occurred, such as when the processor last started or resumed operation, or when the processor simulator last sent event information, or when the hardware simulator last received event information. The hardware simulator 103, upon receiving the time delay information, executes for an appropriate amount of hardware simulation time.

Typically, the processor simulator 107 operates much faster than the hardware simulator 103. That is, simulation time is consumed much faster (in real time) on a processor simulator than on a hardware simulator because hardware simulator 103 of design system 100 models the digital circuitry 105 in detail, while the processor simulator 107 does not model the architectural detail of the target processor, but rather runs the user program substantially on the host computer system. The timing detail comes as a result of the analysis process 113 and in accumulating the delay during processing using timing information 110.

In one embodiment, the hardware simulator provides a simulation time-frame for the design system. That is, simulation time is started and maintained by the hardware simulator, and whenever synchronization is required, all times are synchronized to the hardware simulation time, which is the simulation time for the system.

The design system also includes a suspend mechanism 149 and a resume mechanism 151 coupled to the processor simulator that allow the processor simulator to suspend and resume operation. In one embodiment, the suspend and resume mechanisms are in the interface mechanism 119 and provide for suspending and resuming operation of any task. In one embodiment, when the processor simulator sends associated event information which includes time delay information, it passes a message to the kernel in the interface mechanism that causes the processor simulator to be suspended. The resumption mechanism uses the interface mechanism to place events on an event queue in the hardware processor. Thus, when the processor simulator suspends, the kernel also restarts the hardware simulator and places instruction in the hardware simulator's event queue to resume the processor simulator at some later time. The hardware processor then continues until an event is reached which causes the processor simulator to resume, for example, a previously scheduled resumption of the processor simulator in its event queue.

Thus, in one embodiment, the suspend and resume mechanisms of the interface mechanism 119 use an event queue which is in the hardware simulator. Those in the art will appreciate that other interface mechanisms and resume and suspend mechanisms may be used. For example, in an alternate embodiment, the processor simulator and the hardware simulator are independent tasks running under the interface mechanism, and the interface mechanism schedules all tasks by maintaining its own one or more event queues.

Thus, in one embodiment, when associated event information including time delay information is sent by processor simulator 107 to hardware simulator 103, the suspend mechanism suspends operation of processor simulator 107 while hardware simulator 103, upon receiving the time delay information, executes for an appropriate amount of hardware simulation time. Once hardware simulator 103 processes the event information and produces an event result, such as a signal being asserted, or simply the time delay being consumed, it typically sends the event result to processor simulator 107. The resume mechanism 151 resumes operation of processor simulator 107 upon the processor simulator receiving the event result.

Note that if no time delay needs to be executed by the hardware simulator, such as when the processor simulator is already in time synchronization with the hardware simulator and does not have any internal events that need to be processed in that simulation time, the processor simulator need not suspend operation. As another example, the user program may encounter a command that asks only for the current hardware simulation time. Or the user program may encounter an input/output command before the processor simulator has accumulated any delay since the last access to the hardware simulator. There would not be any need to suspend operation under such circumstances.

With one embodiment of the suspend/resume mechanisms, when the processor simulator's execution is suspended, the delay time passed to the hardware simulator is used to schedule the resumption of the suspended task, by placing a delayed event on the hardware simulator queue to have the interface mechanism to resume executing the suspended user program task running on the processor simulator.

One event result may be an interrupt that occurs in the digital circuitry during the execution of the time delay. The interrupt is communicated to the processor simulator 107, and upon receipt of this event result, on resumption of the processor simulator, processes the interrupt by calling an interrupt handler.

The design system 100 also includes a processor shell 153 in hardware simulator 103 that simulates activity of at least some of the external hardware entities of the target processor, in particular, those signals that are connected to the digital circuitry of the target electronic system which affect a user program. Included are those hardware variables and other hardware entities the user program may access or that may generate asynchronous events such as interrupts. As an example, the hardware shell provides access to the reset line or the pause line of a processor. The processor shell normally would provide an interface to the hardware simulator in the hardware description language (e.g., Verilog). Note that by "signal" we mean a signal or a hardware variable or an event or any other general entity defined within the hardware simulator.

In one embodiment, the design system 100 also includes a hardware-to-software mapper 147 that translates information from the second format understandable in hardware simulator domain, such as a signal assertion to indicate some asynchronous event, or register contents, or simulation time, to the first data format understandable in the processor simulator domain, for example, to one or more software variables accessible to the user program.

Since simulation speed is extremely important, and since a single host processor can only process a single task at a time, the invention also provides for carrying out the simulation in a multiprocessor computer that includes several host processors. In such a system, the processor simulator operates on one or more of the host processors, while the hardware simulator operates on one or more other host processors. The interface mechanism is programmed to handle the communication between the processor simulator host processor, and the other host processors executing the processor simulator. How to implement such an arrangement would be clear to those in the art.

The invention also provides for carrying out the simulation in a host computer system that includes several host processors interconnected using a network connection. In such a system, the processor simulator operates on one or more of the host processors, while the hardware simulator operates on one or more other host processors. The mapper and the translator also may operate on a separate host processor of the network. That is, the processor simulator is coupled to the mapper and the translator by a first computer network connection, with the interface mechanism controlling communication between the processor simulator and the mapper and translator over the first network connection. Also the hardware simulator is coupled to the mapper and to the translator by a second network connection, with the interface mechanism controlling communication between the mapper and the translator, and the hardware simulator over the second network connection.

Note that the tasks of an individual processor simulator can be split across several host processors of the host computer system. Similarly, the tasks of the hardware simulator can be split across more than one host processors of the host computer system. Other networked or standalone multiprocessor combinations and permutations of operating the elements of the design system will be clear to those in the art.

Timing

Figure 2:
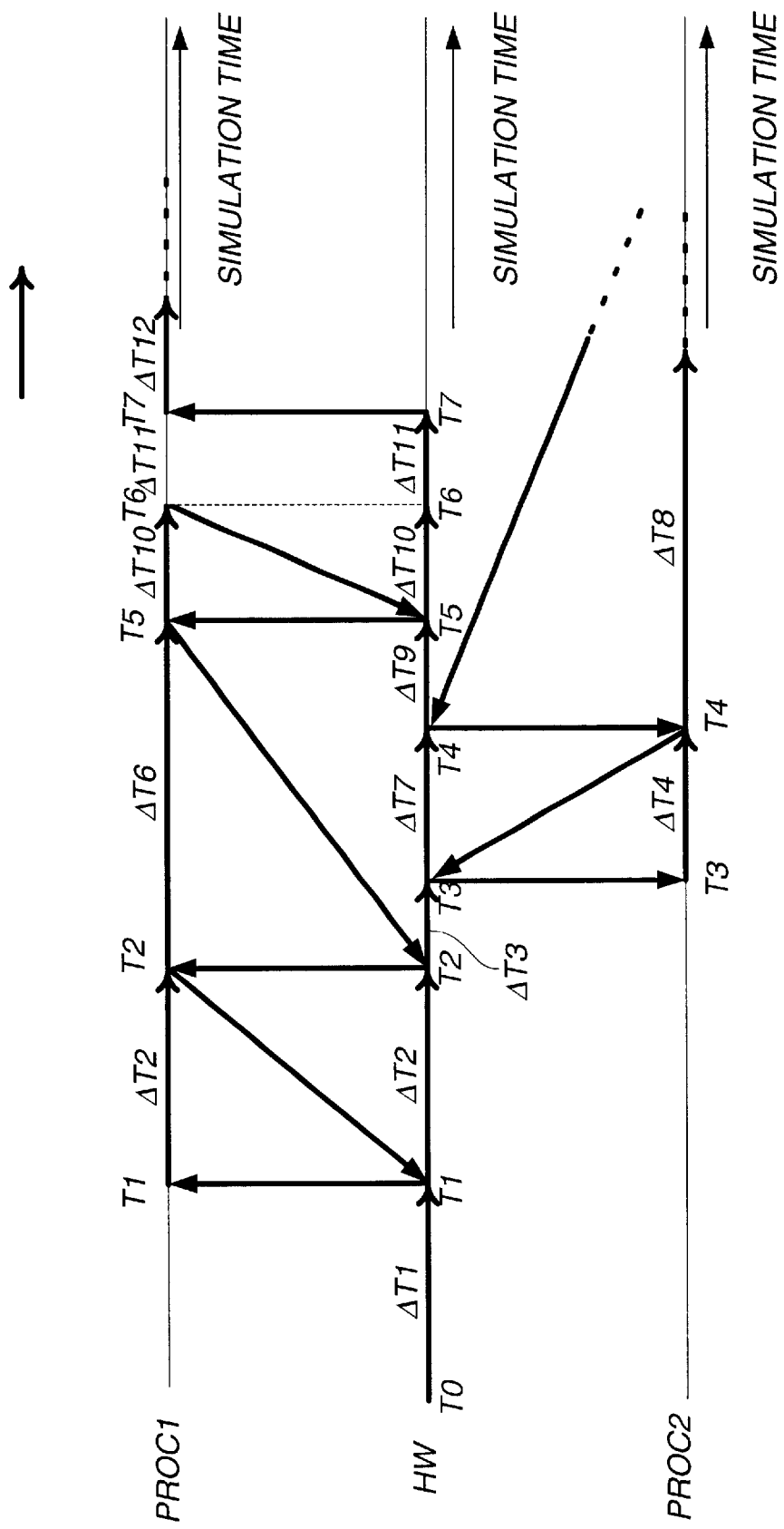
FIG. 2 shows a timing diagram of an example two-processor simulation according to an embodiment of the invention.

Typical operation will now be explained with the aid of FIG. 2 which shows an example of the timing of execution of a design system such as that of FIG. 1, but including two processor simulators, processor simulator 1 and processor simulator 2 simulating two processors, processor 1 and processor 2, respectively, and the hardware simulator. Each processor simulator is similar to the processor simulator 107 of FIG. 1

The hardware simulator provides the simulation timeframe. Any units of time may be used, and clock cycles will be assumed to be the unit of time. Each of processor 1 and processor 2 may have different speeds and thus its own simulation time. Assume that the first task is some execution for a time $\Delta T1$ until time T1. At this time, a start signal in the digital circuitry starts the processor simulator for processor 1. Processor 1 executes for a time $\Delta T2$ until time T2 (measured in processor simulator 1's simulation time). Suppose at this point, processor simulator 1 encounters a memory reference that causes the cache simulator to perform a cache lookup, and the cache lookup determines that there has been a cache miss. This cache miss event may cause processor simulator 1 to use its communication mechanism to send the event information to the hardware simulator. This is necessary if the memory being accessed is determined to be shared by the two processors. This in turn causes the suspend mechanism to suspend operation of processor simulator 1.

Note that while processor simulator 1 has consumed $\Delta T2$ of simulation time, the hardware simulator has barely moved because the processor simulator executes so much faster than the hardware simulator on the host computer system. Thus when the information is communicated to the hardware simulator, it is still at time T1, and constrained to be less than T2.

The hardware simulator now processes the associated event information, which in this example is to execute a required number of bus cycles on the target bus model of processor 1 included in the digital circuitry. The hardware simulator returns to processor simulator 1 when it has executed the required number of bus cycles, say time delay $\Delta T2$ at time T2.

Starting from T2, processor 1 executes for a time $\Delta T6$ until time T5 (measured in processor simulator 1's simulation time). Suppose at this point, processor simulator 1 encounters an interface function to send a signal to the digital circuitry. It now uses its communication mechanism to send the event information to the hardware simulator. This in turn causes the suspend mechanism to suspend operation of processor simulator 1. While processor simulator 1 has consumed $\Delta T6$ of simulation time, the hardware simulator again has hardly moved, so is still at time T2. The hardware simulator now processes the associated event information, which may be to determine a variable and return its value to processor simulator 1 when it has executed the time delay $\Delta T6$ at time T5. However, before reaching T5, after only $\Delta T3$ of simulation time has been consumed, at T3 (<T5), a signal in the digital circuitry causes the second processor simulator (processor simulator 2) to start executing. It processes for $\Delta T4$ and encounters an interface function at time T4, at which time it sends the information associated with the interface function encountering event (e.g., an input/output instruction) to the hardware simulator, which has not progressed much beyond T3, and is constrained to be less than T4 and T5.

The hardware simulator now continues to execute, including processing the new event information, until it reaches time T4, at which time the hardware simulator task in an event queue of the interface mechanism causes the resume mechanism to re-start the suspended process. Processor simulator 2 now processes for time $\Delta T8$ at which time another significant event occurs. This causes the hardware simulator to process until the next time in its queue. This occurs after $\Delta T9$ at time T5 when the processor simulator 1 recommences operation. The processor 1 continues operation until the next significant event, which occurs at time T6. The significant event is to wait $\Delta T11$ units of simulation time.

Note that one aspect of the invention is the capability of modeling processing to a selected level of accuracy, and in this instant, the user has selected to "behaviorally" model rather than accurately model hardware known to require $\Delta T11$ units of simulation time to operate as a means of saving host computer simulation time. So the software task is now suspended and the interface mechanism returns to the hardware simulator not long after T5 in the hardware simulator's time-frame.

Starting from T5, the hardware simulator executes for $\Delta T10$ until T6. The hardware simulator now reaches the time when the first processor simulator's operation was suspended (in hardware simulation time). Note that the hardware simulator does not pass control to the software task, but rather continues to process for the $\Delta T11$ delay requested. That is, the event queue information on the processor simulator 1 is to restart at time T7. When the hardware simulator reaches T7, the processor 1 simulator indeed resumes operation for $\Delta T$ 12, and so forth.

Dynamic Binary Translation

Instruction interpretation is known for running binary target code on a host processor. Each instruction is interpreted and run on the host processor. One embodiment of the processor simulator achieves high speed through the aggressive use of dynamic binary translation, i.e., on-the-fly binary translation. Rather than simulating the target processor by interpreting the binary instructions of the user program one-by-one, or by cross compiling the higher language user program, the analyzer/binary translator 112 of the processor simulator translates linear blocks of target binary code into host code 114 that, when executed, each simulates the execution of the linear block of target code. This use of binary translation allows the processor simulator to eliminate, for example, most of the overhead of instruction interpretation.

The processor model that operates in the processor simulator includes simulation models for the hardware components commonly present on modern computers including processors, memory subsystems, DMA and interrupt controllers, consoles, network interfaces, disks, frame buffers, mice, and keyboards. Each of these components may be simulated to any desired degree of accuracy. For example, an initial run may not include accurate time simulation, so that many of the hardware components may be simulated by using behavioral simulation. If more accuracy is required in any of the hardware components, the model may be modified to include more detail. For example, it may be desirable to run some of the target computer subsystem as a hardware model, for example the memory model 122 and the bus model 124.

Thus the invention provides for having a range of compatible simulation models of processors, memory systems, and I/O devices that vary greatly in simulation speed and detail. The user is able to select the simulator that provides the desired level of simulation detail with the greatest possible speed. For example, a processor pipeline study might use a processor model that includes pipeline effects.

In one embodiment, Dynamic binary translation is the main technique used to achieve speed. Dynamic binary translation is known and used for several applications. See for example Richard L. Sites, Anton Chernoff, Matthew B. Kerk, Maurice P. Marks, and Scott G. Robinson, "Binary Translation," Communications of the ACM, vol. 36, no. 2, pp. 69–81, February 1993, Bob Cmelik and David Keppel: "Shade: A Fast Instruction Set Simulator for Execution Profiling," Proceedings of the 1994 ACM SIGMETRICS Conference on the Measurement and Modeling of Computer Systems, pp. 128–137, Nashville, Tenn., 1994. See also Emmett Witchel and Mendel Rosenblum: "Embra: Fast and Flexible Machine Simulation," Proceedings of the 1996 ACM SIGMETRICS Conference on the Measurement and Modeling of Computer Systems, pp. 68–79, Philadelphia, Pa., 1996.

Adapting dynamic binary translation to implement the processor simulator 107 required extensions to the known dynamic binary translation techniques, for example, to include modeling the MMU of the target processor and the cache hardware of the target processor.

Processor simulator 107 operates in three phases:

1. Configuration phase: In this phase, the target processor simulator is configured according to the target processor being simulated. Configuration includes defining one or more registers of the host processor or one or more host memory locations or both to simulate the target processor registers, and assigning one or more host memory blocks to simulate the physical memory.
2. Translate phase: In this phase, the target code is analyzed and translated to produce host code to simulate the target code together with timing information and hooks for dynamic calls to determine time dynamically. The translated and analyzed code is stored in one or more host code buffers (HCBs).
3. Execution phase: During the run phase, the host code in an HCB is run to simulate the execution of the linear block of target code. The results of execution are stored in the simulated registers as appropriate.

The Configuration Phase

One embodiment simulates the MIPS R3000 and R4000 32-bit instruction set architecture (MIPS Technologies, Inc., Mountain View, Calif.). Another simulates an ARM processor (ARM Ltd., Cambridge, United Kingdom). The invention is easily adapted to other processors, for example CISC types, other RISC types, and DSP processors.

A physical model of the target processor system is created in the configuration phase including the processor's internal registers and its view of the MMU, cache, and memory subsystems. The level of accuracy is user determined. For example, for very high speed performance, one embodiment estimates rather than simulates each resulting bus transaction. The target processor may have several busses, e.g., one for the cache, coprocessor, memory, debug, etc. The configuration file—called the Target Information File (TIF) herein—includes a description of the system level timing interactions with the MMU, cache, and memory subsystems, and each of their respective busses. Alternate implementations might include a database for the configuration information and a graphical user interface.

Another embodiment includes one or more bus simulators as part of the digital circuitry simulated by the hardware simulator, so that when full bus level accuracy is required, actual bus cycles are simulated, and hooks are provided during the analysis/translation phase to invoke the relevant bus simulator to simulate the appropriate number of bus cycles.

The processor model set up in the configuration phase includes:

1. A model comprising one or more host registers and possibly one or more host memory of the target processor registers and any co-processor interfaces.
2. An MMU simulator that includes a fast TLB simulator that provides a fast means of target virtual to target physical address translation. In one embodiment, the MMU simulator also includes translation to host virtual addresses.
3. A model comprising host memory of the physical target memory that includes the memory containing the target binary code and any target data regions.

Target Memory Image Data

The processor simulator accepts target binary images of code and data, together with the TIF that includes information relating to the address mapping, performance and level of accuracy (e.g., high-speed bus model vs. full bus model) on accesses to particular address accesses.

Target registers.

The simulated target processor registers in the processor simulator include the target processor's registers. Also included are storage locations (host registers or host memory or both) that provide fast access to some other information, such as instruction and clock counters, at run time. The size of the host address space is dependent on the host virtual address space. An x86 host processor (e.g., INTEL Pentium) uses 32 bits and other hosts might use other sizes.

The program counter (PC): The program counter (PC) is also simulated, and in one embodiment is updated anytime its value can be observed by a user of the co-design system, either within the user program, or by a debugger. Most modern processors support multiple virtual address spaces in order to support multi-user operating systems and multi-process user programs. Furthermore, many modern processors support concurrent but disjoint virtual address spaces. Thus, in addition to the target PC, modern target CPUs may use additional information to generate a virtual address. For example, the ARM processor includes a "process ID" (PID) to modify the virtual address to generate a "modified virtual address." Other processors may use other information to generate a "complete" virtual address. In one embodiment, information such as the PID is used in addition to the PC to generate simulated virtual addresses in the processor simulator.

The Physical Memory Simulation

The physical memory of the target processor is specified in the TIF file. The configuration stage includes allocating blocks of host memory to model the blocks of target memory and building a mapping 125 from physical memory to host memory that provides for translating a target processor physical address to the location or locations in host memory where that target address is stored.

In one embodiment, the memory mapping information 108 is stored in the form of a memory allocation data structure, with each element of the memory allocation data structure representing a block of physical memory, whether allocated or not, i.e., a block of physical memory addresses, and each memory allocation data structure element representing allocated physical memory including a pointer to where in the memory space of the host processor that physical block of memory is stored. In one embodiment, the memory allocation data structure is an ordered linked list, with each element of the linked list representing a block of physical memory addresses that, if allocated, includes a pointer to where in the memory space of the host processor that physical block of memory is stored. Each element of the linked list is labeled by the physical address of the block of physical memory, and an indication of whether that block has or has not been allocated, i.e., is part of physical memory. In one implementation, physical address ranges that are not mapped to host memory (to simulate target memory) are mapped to either a function that is used to access the virtual bus or bus simulated in the hardware processor, or to a function that reports an attempted access to unallocated memory.

Thus in one embodiment, the linked list contains every possible physical address. Some of the linked list elements point to host memory, and some, including those blocks that are unallocated, do not.

Other data structures may be used for the memory allocation data structure. One alternate embodiment, for example, uses an array.

In the embodiment using the linked list, the linked list elements are ordered by their respective end addresses, so that a linked list element that represents a physical block that ends at address 3M, for example, appears earlier in the list than the linked list element that represents a block of memory that ends at address 4M. If the end addresses are the same, then the smaller linked list element comes first. In one embodiment, the last linked list element covers the full physical address space.

A lookup mechanism is used to look up a physical address to determine the corresponding host address using the linked list. The lookup mechanism searches for the linked list element that represents the physical address, and an element of the found linked list element points to the host address. In one embodiment, each linked list element represents (and describes) a physical block of target memory of length some power of 2, and also points to the allocation of host memory to represent that physical block of memory in the processor memory. The physical blocks that the linked list elements represent are partitioned in a naturally aligned manner, so that 1 MB long blocks, for example, must be aligned to a 1M natural boundary in the target address space.

In one embodiment, in the case of the target including a paged memory system, the smallest block size is the smallest page size. So for an MMU that allows page sizes from 4 KB to 4 MB, the smallest block is 4 KB.

Figure 4:
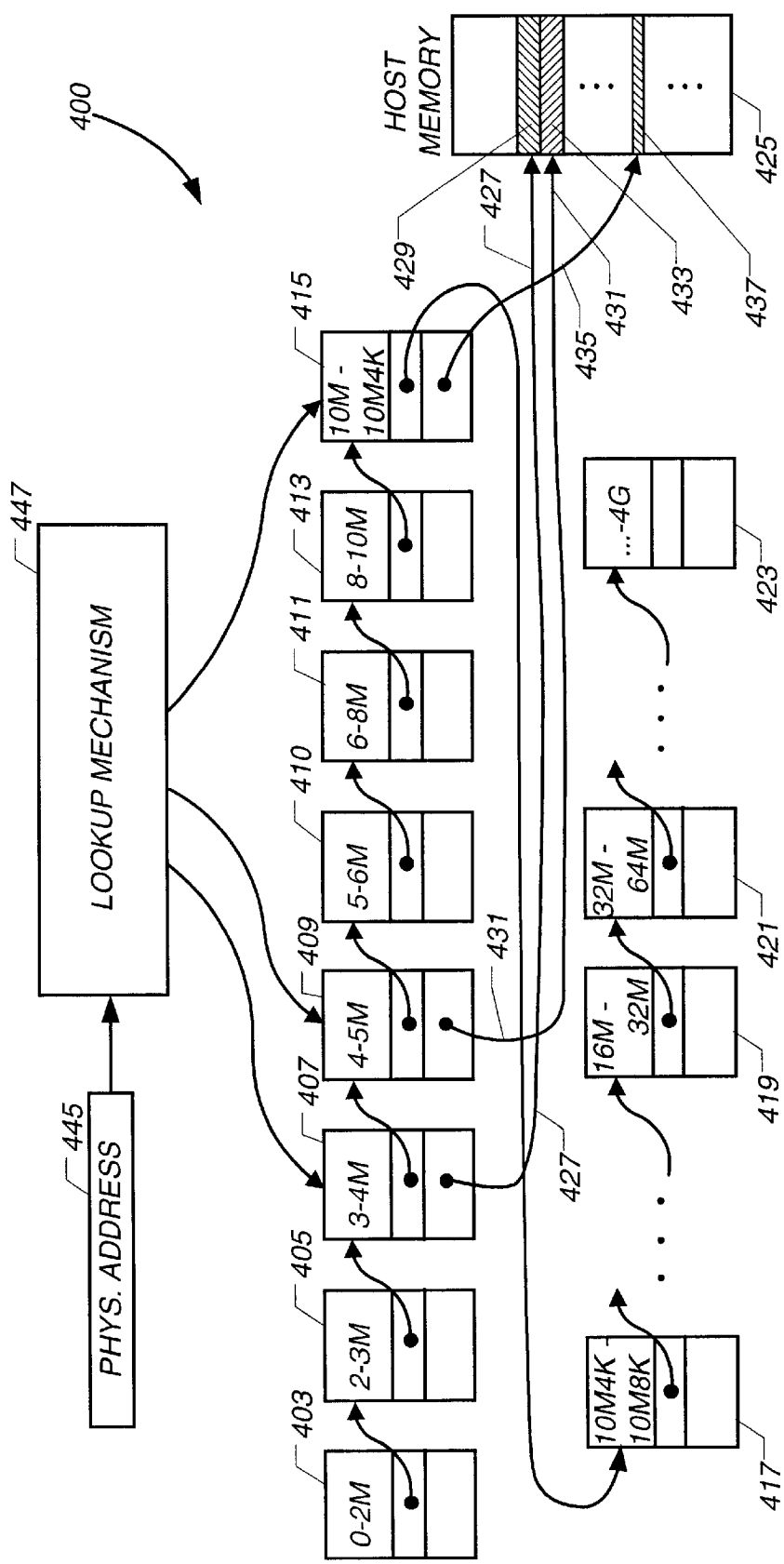
FIG. 4 shows an embodiment of a linked list to represent the physical address to host memory mapping and a search for the host address of a physical address according to an embodiment of the invention.

FIG. 4 shows by way of example a first implementation of the ordered linked list 400 for the memory map for a target processor that has the following two blocks of physical memory specified in the TIF:

At physical address 3M there is a block of 2 MB of memory

At physical address 10M there is a block of 4 KB of memory.

According to the first implementation, the linked list is of contiguous non-overlapping blocks of memory addresses. There are linked list elements for both allocated and unallocated memory blocks. The first unallocated space is from 0 to 3M physical address. Because a block cannot be 3 MB long, the first linked list element 403 represents physical addresses from 0 to 2M. The next linked list element 405 represents physical addresses from 2M to 3M. There now is a need to represent a 2 MB block of allocated memory. Because of the natural alignment requirement, a linked list element starting at address 3M cannot represent a block longer than 1 MB, so the next linked list element 407 represents physical addresses from 3M to 4M, and this is followed by another linked list element 409 representing physical addresses from 4M to 5M. The next linked list element 410 again represents a 1 MB block for physical addresses from 5M to 6M, and this is followed by a linked list element 411 representing a 2 MB block of physical addresses from 6M to 8M. The next block represented by linked list element 413 is 2 MB long for physical addresses from 8M to 10M. At physical address 10 MB, there is an allocated block of 4 KB, so the next linked list element 415 represents physical addresses from 10M to 10M4K. The next linked list element 417 is also 4 KB long representing physical addresses from 10M4K to 10M8K. There now follow a sequence of linked list elements that represent larger and larger blocks. Linked list element 419, for example, represents a 16 MB block of physical memory addresses from 16M to 32M, then linked list element 421 represents a block of addresses from 32M to 64M, and so forth until the last linked list element represents a block ending in the largest physical address, 4G in this example.

Those linked list elements that represent physical addresses that are allocated each includes a pointer to the block of host memory 425 that represents that allocated target memory in the processor simulator. Suppose, for example, that the 2 MB block of target memory is represented by the two contiguous blocks of host memory 429 and 433 in the host address space starting at a first host address and a second host code address, respectively. Suppose furthermore that the 4 KB block of target memory is simulated by a block of host code 437 starting at a third host code address. Then linked list element 407 includes a pointer 427 to the block 429 of host memory at the first host memory address, linked list element 409 includes a pointer 431 to the block 433 of host memory at the second host memory address, and linked list element 415 includes a pointer 435 to the block 437 of host memory at the third host memory address.

A lookup mechanism 447 searches for a match of a physical address 445 in the linked list 400. That is, given a physical address 445, the lookup mechanism 447 compares the address range of each linked list element to find the linked list element that represents the given physical address. In the invention, the lookup mechanism uses a speed-up technique for searching the linked list 400 for a physical address match.

The Search Mechanism

Many methods to look up an address 445 can be used in lookup mechanism 447 to find the linked list element that has an address 445, included sorted array methods, binary tree search techniques, and so forth. In one embodiment, a multi-level table lookup method is used. FIG. 5A shows one three-level table lookup method 500. The part of the address to be looked up is partitioned into three parts PART1, PART2, and PART3 in one embodiment. A three-level sequence of lookup tables is used to lookup the contents of PART1, PART2, and PART3, respectively. So ADD1 (503), the contents of PART1 is used to index TABLE1 513. The indexed element of TABLE 1 includes a pointer to the next level table—TABLE2 515—to use. ADD2 (505), the contents of PART2 is used to index TABLE2 515 and the indexed element of TABLE2 includes a pointer to the next level table—TABLE3 517—to use. Finally, ADD3 (507), the contents of PART3 is used to index TABLE3 517 and the indexed element of TABLE3 includes a pointer to the linked list element that contains the physical address 445. Thus each valid lookup table element points to the next lookup table to use; the last lookup table valid elements point to the linked list elements.

There may be a part—PART4 (509) of the address 445 containing the bits ADD4 that is never used for the address look up for the linked list element. Suppose, for example, that the minimum page size is 4K. The smallest allocation is then in blocks of 4 KB, so that no linked list element represents less than a 4 KB block of addresses. Looking up the linked list element of a physical address can then ignore the 11 lowest order bits of the address, shown as PART4 509 in FIG. 5A. The remaining bits of the address are then looked up in three steps, one for each partition of the address.

Suppose further that the largest possible block is 4 MB long. Then bits of address 445 from bit 11 to bit 21 (with the lowest order bit being bit 0) are sometimes used, depending of the block size, and the bits from bit 22 and higher are always used. In one embodiment, the lowest level table, TABLE3, is indexed by the contents 507 of PART3 of the address 445 that may or may not be used depending on the block (e.g., page) size. The part of the address that is always used is indexed in two steps by the first and second level tables. Thus, for a 4 BM block, all entries in the lowest-level table TABLE3 point to the same linked list element, while for 4 KB blocks, each entry in a lowest level tableTABLE3 point to different linked list elements. If each block is 2 MB, then half the entries in the lowest-level table point to one linked list element, and the other half point to another linked list element.

In one embodiment, each table lookup operation is carried out by a shift, mask, and indexing operation as follows:

shift right by number of bits corresponding to PART2, PART3and PART4.
  mask to give ADD1
  index TABLE1 with ADD1
  shift right by number of bits corresponding to PART3 and PART4.
  mask to give ADD2
  index TABLE2 with ADD2
  shift right by number of bits corresponding to PART4.
  mask to give ADD3
  index TABLE3 with ADD3

Thus thethree-level lookup operation may be carried out in about 9 instructions. Looking up the host address or determining that this is unallocated is provided by the link in the linked list element. The low order bits PART4 together with the linked list element link to host memory, for example, may then be used to access a particular host memory location corresponding to the physical memory address 445.

Note that while a three-level lookup mechanism is described herein, any number of levels may be used.

Conserving Lookup Table Space

The multi-level tables in the lookup mechanism embodiment described above are fully populated. That is, every entry in the set of lookup tables is populated, which potentially requires a huge amount of storage. Many lookup tables however are redundant. For example, in the case of 4 MB blocks, since every entry in the lowest level lookup table points to the same linked list element, that lookup table is not needed—it is redundant; the second-level lookup table can simply point directly to the linked list element.

This however introduces special cases; there would need to be a test to determine if the search has arrived at the linked list element, or is at a lookup table.

An improved embodiment provides for eliminating redundant lookup tables while eliminating the need for special cases. According to the improved embodiment, each lookup is identical, requiring three sets of shift-mask-lookup operations. FIG. 5B shows an improved embodiment lookup table 521. Each lookup table such as 521 includes, in addition to the pointer fields (one for each table entry) that each has a pointer such as pointer 527 to either a next level lookup table or a linked list element, two fields 523 and 525 that contain the shift and mask, respectively, to apply to the address field 445 prior to the lookup. Furthermore, a replica lookup table that includes the shift and mask fields together with a single pointer field included in each linked list element. See for example FIG. 5C which shows an improved version 531 of the 5M–6M linked list element of the example of FIG. 4 that includes a single entry replica lookup table with mask and shift fields (533 and 535 in this example) and a pointer field 537. The pointer in pointer field 537 includes a pointer 539 that points back to the linked list element 531. The mask and shift fields (533 and 535 in this example) are irrelevant, and in one embodiment are set to 0. Any address part indexing the replica lookup table in the linked list element finds the pointer 539 back to the linked list element.

For a second level lookup table, when the lookup tables are set up, in the case of the largest (e.g., 4 MB) page size, rather than the element pointing to a third-level lookup table that has every element pointing to the same linked list element, the second-level lookup table element points directly to the linked list element. This saves the storage for the third level lookup table. The lookup is still carried out with three sets of shift-mask-lookup operations as if there was a third-level lookup table. The replica lookup table in the linked list element acts as that third level lookup table.

Similarly, it may be that many of the first level lookup table elements all ultimately lead to the same linked list element. For example, consider the example of FIG. 4. Many of the first level lookup table elements may lead, after three table lookups, to the last linked list element 423. All the second- and third-level lookup tables that follow such a first lookup table may be eliminated by having the first level lookup table element point directly to the linked list element. The replica lookup table in the linked list element then acts first as the second level lookup table then as the third level lookup table in the three-step lookup process, without requiring any special tests.

Improved Linked List Representation

In the above-described implementation, the linked list includes blocks of physical memory addresses, each of a block size and that each starts and ends at a natural block boundary for that block size. Some linked list elements point to where in the host memory space that block of physical addresses is simulated in the processor simulator, and others are null, representing physical addresses that are not allocated in the target processor.

There typically, therefore, is a large number of blocks, and many of these blocks are null, i.e., represent unallocated addresses.

In an improved embodiment, a single linked list element is used to represent the whole address space. Every linked list element but the last represents a block of allocated physical addresses. A single—the last—linked list element replaces: 1) the set of linked list elements for addresses lower than the first block of allocated addresses, 2) the set of linked list elements for addresses higher than the highest allocated physical address, and 3) the sets of one or more linked list elements that represent addresses in between blocks of allocated physical addresses.

Figure 6:
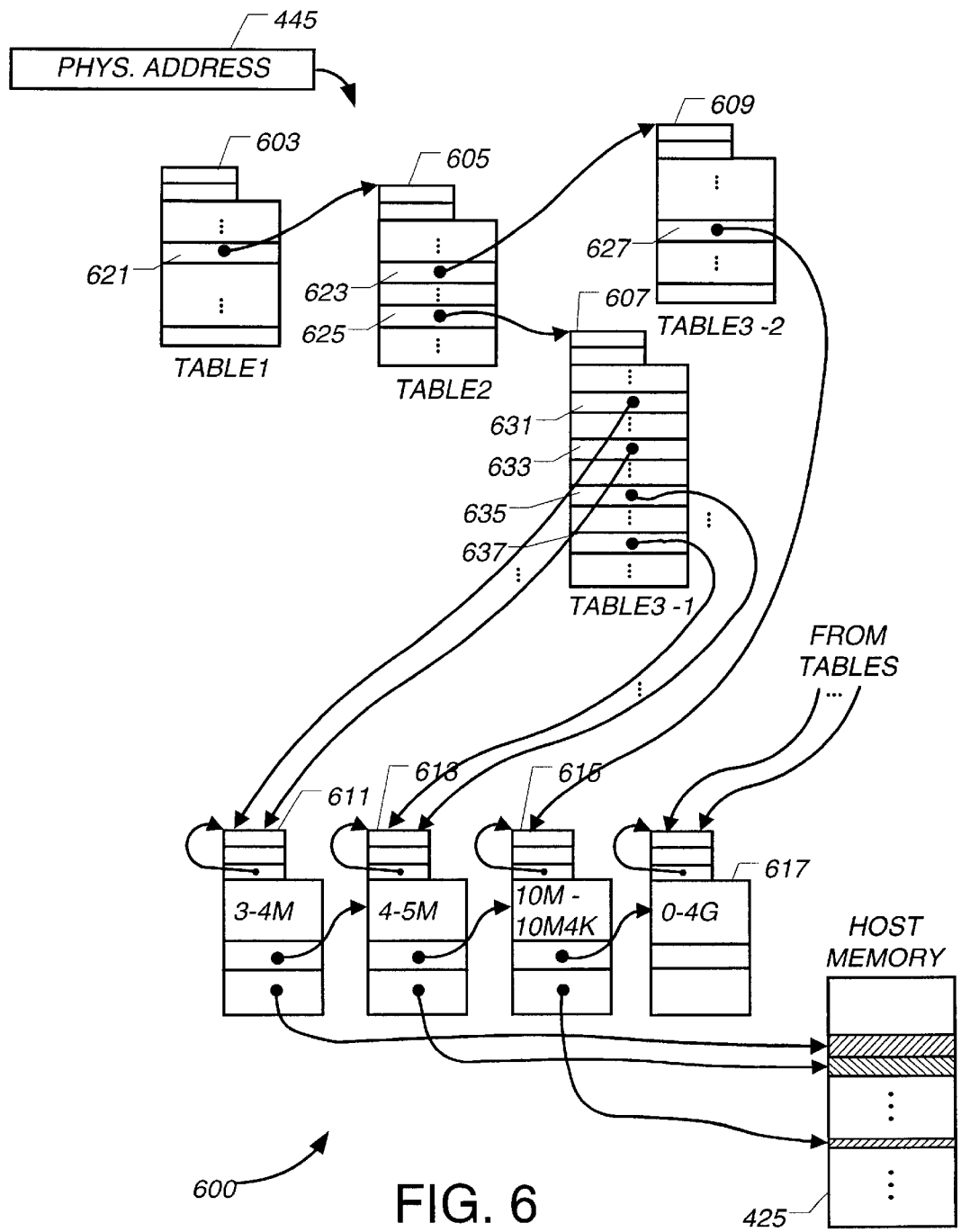
FIG. 6 shows another embodiment of a linked list to represent the physical to host address memory mapping together with a multi-level lookup table search mechanism according to an embodiment of the invention.

FIG. 6 shows the linked list 600 for the same example as FIG. 4, but using the compressed linked list representation and linked list elements that each includes a replica one-element lookup table. Linked list element 611 is for a 1M block of physical addresses from 3M to 4M and includes a pointer to the location in the host memory space 425 used to simulate this 1 MB block of physical memory. Linked list element 613 is also for a 1M block of physical addresses from 4M to 5M and includes a pointer to the location in the host memory space 425 used to simulate this 1 MB block of physical memory. Linked list element 615 is for the 1K block of physical addresses starting at address 10M and includes a pointer to the location in the host memory space 425 used to simulate this 4 KB block of physical memory. The linked list element 617 is for all unallocated physical addresses.

The linked list 600 is constructed during the configuration phase. Once constructed, the set of lookup tables 650 is constructed. One level 1 table, TABLE1 603, one level-2 table TABLE2 (605) and two level 3 tables, TABLE3-1 (607) and TABLE3-2 (609) are shown. Suppose in TABLE1 there is an entry 621 that points to TABLE2. Suppose further than in TABLE2, there is an entry (625) pointing to TABLE3-1. TABLE3-1 may contain one or more entries (all shown as 631) pointing to linked list element 611 and one or more entries (all shown as 635) pointing to linked list element 613. Suppose further that there is another element 623 in TABLE2 that points to TABLE3-2, and that there is an element 627 is TABLE3-2 that points at the linked list element 615. All other elements in TABLE3-1 and TABLE3-2 represent unallocated addresses so point at the linked list element 617. The links from these third level tables are not shown in the drawing.

To avoid having redundant level 3 tables, e.g., tables whose elements all point to linked list element 617, many of the TABLE2 elements point directly to linked list element 617. Similarly, many of the TABLE 1 elements may point to level-2 tables whose elements point to level-3 tables whose elements all point to linked list element 617. These level-2 and level-3 tables are redundant, and to avoid building such redundant tables, the links in TABLE1 point directly to linked list element 617.

There also may be other level-2 tables with an element pointing to a level-3 table whose elements all point to one of the linked list elements that represent allocated addresses. In such a case, the level-3 table is redundant, and the link to it is replaced with a link to link directly to the linked list element. The replica lookup table of that linked list element than acts as the lookup table for the third lookup.

In one embodiment, the linked list representing the physical memory and the physical memory-to-host relationship is used with the lookup mechanism to determine a host address from a virtual (target) address during simulation.

In an improved embodiment, the linked list representing the physical memory and the physical memory-to-host relationship is built during the configuration phase, and used in the MMU simulator so that the MMU simulator both translates virtual addresses to physical addresses during simulation, and automatically also provides the host address.

Modeled Memory State

In one embodiment, each allocated block of modeled target memory (i.e., host memory) is partitioned into sub-blocks called "chunks" herein, and an element of a sub-block state buffer is assigned to each sub-block of modeled target memory. Thus, during the configuration stage, a sub-block state buffer (or "chunk state buffer") is defined, with each element in the sub-block state buffer providing a state for the corresponding sub-block of the physical memory modeled in host memory. In one embodiment, each modeled target memory sub-block can have one of the states shown in the following table that also includes the code stored in the sub-block state buffer element in one embodiment.

| State | Code Value |
| --- | --- |
| uninitialized (U) | −1 |
| loaded (L) | −2 |
| modified (M) | −3 |
| translated by multiple | 0 |
| translated processor N (T:N) | N |

The state information provides for automatically ensuring that translated code that has subsequently been modified, for example by self-modifying target code, is not run again. The state information is further used to indicate the memory state in the case that the electronic system includes a plurality of target processors sharing the same memory.

In one embodiment, each modeled memory sub-block is the same size as an equivalent line of the instruction cache.

Initially, during the configuration stage, all the elements of the sub-block state buffer are set to uninitialized.

The Translate Phase

The translate phase is now described in more detail. In one embodiment, linear blocks are the unit of translation, and each translated linear code block is stored in an HCB. A linear block is a target code sequence that ends with a jump or branch instruction or any instruction that may change the mode of the target processor. In one embodiment, the linear block is selected have a maximum length equal to the length of a cache line of the cache used for instructions (the I-cache). This provides for fast execution because when executing the translated code, the processor simulator may assume all the target code of that linear block is in cache, and no instruction cache misses will occur. Furthermore, in one embodiment, the linear block ends at any end-of-page boundary in the case that an MMU with paged memory is included. That is, the target code is translated no further than where there is a change in address which might result in a change of permissions from the current location in memory. This further provides for fast execution because the translated host code of a linear block of code may be executed without requiring permissions check. Note that by definition a cache line cannot cross a page boundary.

The translated code is maintained in the HCB even after execution of the code in case that code is executed again. This avoids having to re-translate the same linear block of target code. That is, the HCB is used as a translated code cache.

A basic translation includes accessing the source registers of an instruction from the simulated registers, setting up the HCB data structure for an HCB, translating the linear block of target code into the HCB, and adding hooks for any required memory references, MMU lookups, and cache lookups. In the case that a full-accuracy bus modeling is used, the translate phase includes adding the hooks to invoke the appropriate number of bus cycles for the particular bus. The translate phase also includes adding host code to the HCB to accumulate simulation time according to the characteristics of the target processor instructions being simulated in the HCB.

Because the code in an HCB is guaranteed to be in the cache during execution of the linear block of the HCB, one of the hooks inserted in an HCB is to determine at run time whether or not the target code simulated by the HCB is in the I-cache, i.e., whether an instruction-cache miss will be generated. This I-cache lookup is only needed once. In one embodiment, the hooks to check the I-cache are inserted at the start of the HCB so that during execution of the code in the HCB, a check is first made to determine whether or not there is an I-cache miss generated.

Data references are identified and hooks inserted to simulate data cache lookups and also to check and as necessary modify the state of the chunk of target memory being modified to provide for automatically identifying self-modifying code. The state is defined in an element of the chunk state buffer.

The translation is carried out instruction by instruction until one of the following is reached: an instruction that may alter the program flow such as a jump or branch instruction; an instruction that may change the mode of the target processor; the end of a cache line of the I-cache, which may also indicate that an end of page is reached.

In alternate implementations, translation can occur beyond a cache line. Furthermore, in alternate implementations, the processor simulator may translate beyond linear block boundaries prior to commencing execution of the translated linear blocks.

In one embodiment, each HCB is identified by and indexed by the target physical address of the target code contained therein. In other embodiments, a virtual address may be used. In general, in one embodiment, each HCB is indexed the same way as the I-cache is "tagged." Thus, in a processor simulator simulating an ARM processor, the caches are indexed with virtual addresses and tagged with virtual addresses, so that in one ARM-simulating embodiment, the HCB lookup is carried out with virtual addresses. A MIPS processor cache is indexed with virtual addresses but tagged with physical addresses, so in one MIPS-simulating embodiment, the HCB lookup uses the physical address. Recall that each block of modeled target memory is partitioned into chunks and that each chunk has a state stored in an element of the chunk state buffer. During simulation of the loading of target code from a chunk of target memory into the I-cache, prior to the target code being translated, the state of the chunk is checked and changed as required. The state of a chunk of memory is also checked at execution time. The following table describes the actions:

| State | Code Value |
| --- | --- |
| uninitialized (U) | The processor simulator reports an attempt to execute uninitialized memory and exits |
| loaded (L) | The state is changed to T:N and the process continues. |
| modified (M) | Any existing translation is invalidated. The current block is retranslated, and the state is changed to (T:N). |
| translated by multiple (M) | The process continues |
| translated processor N (T:N) | If N is the same as the current processor ID, the process continues. If N is not the same as the current processor ID then the state is changed to M and the process continues. |

During translate time, there also is host code added at the end of the HCB code section to accumulate simulation time (static analysis), and code also is added to perform a significant event check, including a time check to see if the processor simulator has used up the time allocated to it. If such a significant event has occurred, the processor simulator communicates with the hardware simulator via its communication mechanism.

Simulation time is accumulated as a number of clock cycles, and so may be a large number. In one implementation, simulation time is accumulated in a 64-bit variable. The host code added checks if the variable is equal or not to the allocated time.

In another implementation, two variables are used: one for the start time, and a second for the number of cycles to go, i.e., remaining time. Simulation time is tracked during execution by decrementing the remaining time, and testing for 0. The decrementing and testing to determine if there is time to go can then be efficiently executed, for example by a single instruction on a x86 (e.g., INTEL Pentium) host processor. Maintaining the correct simulation time is then slightly more complex than when the simulation time is maintained in a single variable. However, the processor simulator always needs to test for whether there is simulation time left and rarely needs to determine the actual accumulated simulation time. A feature of the invention is carrying out efficiently those operations that are most frequently carried out at the expense of carrying out less efficiently those operations that are not carried out often, and allowing carrying out relatively inefficiently those operations that are relatively rare.

Execution Phase

One aspect of the invention is executing the simulation as fast as possible, reducing the frequency of breaking the host processor's pipeline. Thus, the invention reduces the incidence of branches and exceptions in the host code.

During execution, whenever the processor simulator carries out a write with a data reference, the data is written, and a check is made of the chunk state buffer element for the target address(es) being written to. If the state is "uninitialized" or "loaded," the state is changed to "modified." If there is only a target single processor in the electronic system, then if the state is "translated" it is also changed to "modified." If "translated" and the electronic system has multiple target processors, the processor simulator checks the state, and if the processor matches, then the state is changed to "modified." Finding of a different processor is a "significant event", in which case the processor simulator transmits the significant event information via communication mechanism 141 and interface mechanism 119. The information is ultimately transmitted to the processor simulator of that other processor.

Thus there is an indication whenever the simulated target memory is modified. The invention includes a method of automatically detecting code that has been modified.

When the HCB is run, it is first determined if there is an I-cache miss, and if not, execution of the translated target code in the HCB proceeds. Even if the target memory containing the target code simulated in the HCB was modified, the cache still contains the correct prior-to-modification code.

If there has been a cache miss, the state is checked of the chunk of modeled target memory wherein the target code translated in that HCB resides to determine if that memory has been modified and thus needs to be re-translated. This provides for simulating the execution of self modifying code. Thus, when there is a cache miss, the processor simulator checks the state of the chunk of modeled target memory of the HCB by examining the element of the chunk state buffer. The processor simulator proceeds to simulate loading the I-cache and checks the state of each of the simulated target locations whose translated code is being loaded. If "translated" then. If, on the other hand, the chunk is identified as "modified," then the translated code in the HCB needs to be invalidated, and the target code needs to be re-translated into the HCB. If the state is "uninitialized" then the processor simulator generates an exception because somehow an attempt is being made to execute meaningless binary data.

According to an alternate embodiment, an alternate method of checking for self-modifying code includes storing in the HCB when the translation is performed, the cache line used together with the translation. The alternate method includes, each time a line is loaded into the cache, searching for any existing translation for that cache line. If an existing translation is found then the new cache line is compared to that stored in the HCB, and all translation for that cache line is invalidated if the new cache line differs from that stored in the HCB.

The Main Loop

Figure 3:
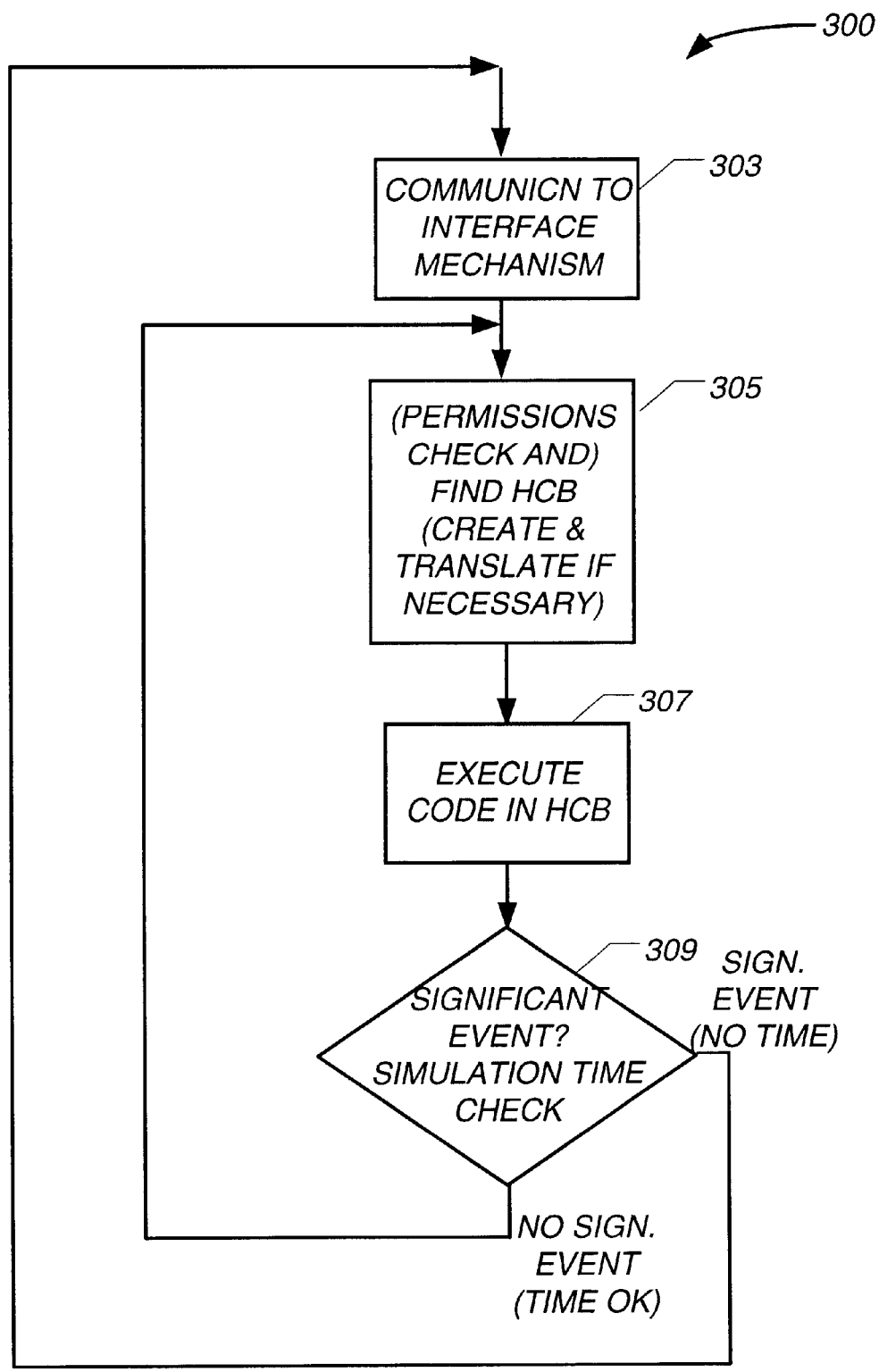
FIG. 3 shows the main loop of the processor simulator according to an embodiment of the invention.

The translation phase and execution phases occur linear block by linear block according to a main processor simulation loop 300 shown in FIG. 3. A translation phase is followed by the simulation phase for the same linear block.

In step 305, the loop checks to see if there is an existing HCB matching the current simulated program counter address. In one embodiment, the existing HCB check in step 305 is preceded by a permissions check for the memory in the current program counter address. For some target processors, a TLB lookup also is included. If the HCB is present, the translated linear block in the HCB is executed in step 307. If it is not, the analyzer/translator 112 is used to translate the linear block of target code and to build a new HCB for the block. That HCB is now executed in step 307. In step 309, a simulation time check is made to see if there has been a significant event, for example, no simulation time left, that requires the processor simulator to communicate with the hardware simulator via its communication mechanism 141. Is so, the processor simulator in step 303 uses its communication mechanism to send event information to the hardware simulator via the interface mechanism. This may in turn cause the suspend mechanism to suspend operation of processor simulator. If it is determined at time check step 309 that there is no significant event, e.g., if there is simulation time remaining for the processor simulator, the next HCB is searched for.

Searching for and Chaining the HCBs

Step 305 of searching for an existing HCB is now described in more detail. Each HCB is identified by the full target address of the target code translated in the HCB. Depending on the target processor, in one embodiment, a virtual program counter (VPC) is generated for from the PC and whatever else is used by the target CPU to generate virtual addresses, e.g., the PID in an ARM processor to generate the modified virtual address.

Each HCB is identified its full virtual address. One ARM processor simulator implementation uses the modified virtual address. One MIPS processor implementation uses the PC converted to physical address. A search mechanism is used to find an HCB that matches the address. If no existing HCB is found, the processor simulator branches to a translate process that creates the HCB for the target code starting at the address.

Any rapid search mechanism may be used to search for an existing HCB. For example, sparse arrays and sorted binary trees may be used. In one embodiment, a multi-level set of lookup tables is used similar to the search mechanism described above and in FIG. 5 for searching the linked list data structure used to represent the physical to host memory mapping.

One difference is that in the linked list, there are elements for each and every possible physical address. In the case of searching HCBs, there are relatively few HCBs, so the lookup tables are sparse. Most of the entries do not lead to HCBs.

One aspect of the invention is rapidly searching for sparse matches in a manner that avoids tests so that the processor simulator always processes a search rapidly with no exceptions. One prior art multi-level table searching method includes initializing the tables with null pointers, and then setting up valid pointers to the required HCBs. If a null pointer is reached at any level of the lookup, then the search process stops with a non-match. This requires testing pointers to determine if null, i.e., if valid or not.

Figure 7:
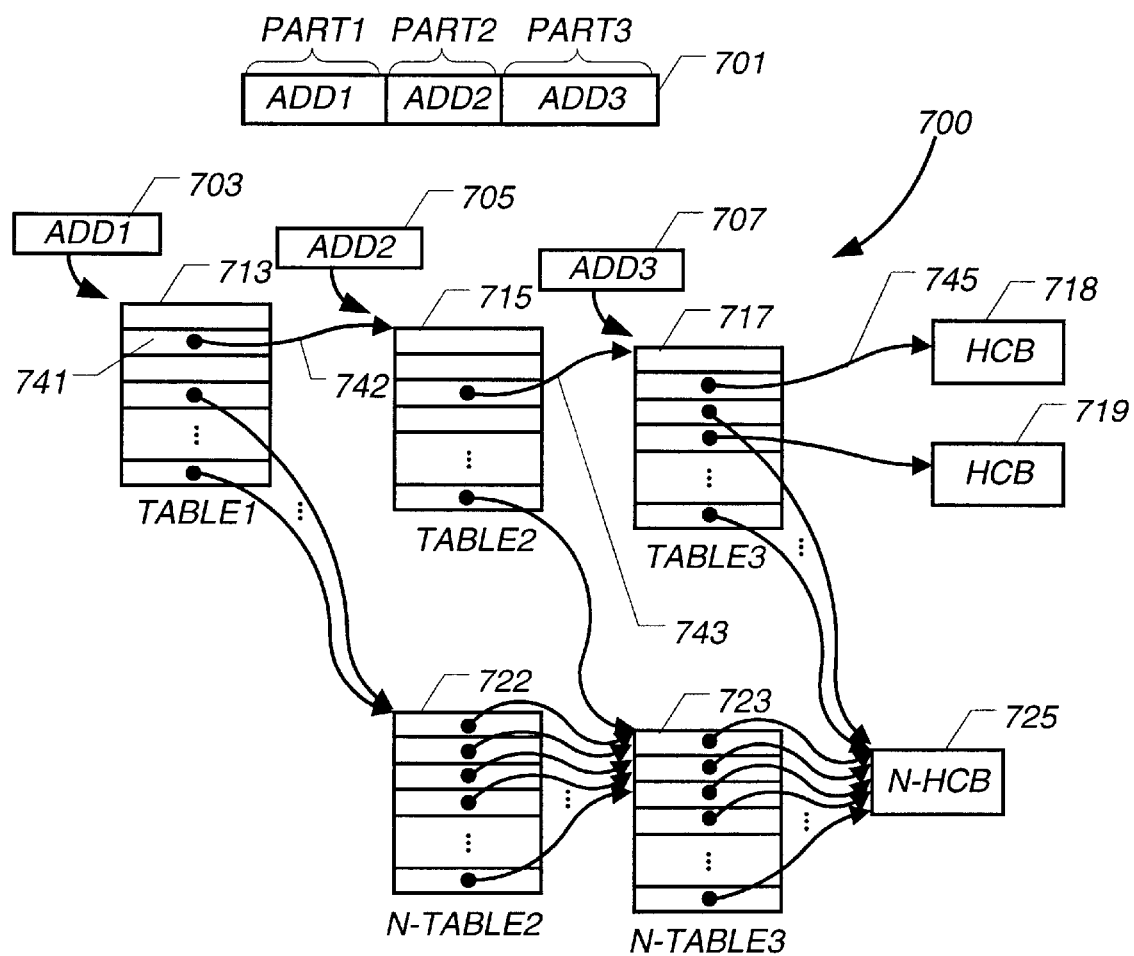
FIG. 7 shows a search mechanism to search for the next host code buffer (HCB) according to an embodiment of the invention.

In one embodiment, rather than the tables having null pointers or equivalent entries that may or may not be valid, the set of multi-level lookup tables includes a "null lookup table" at each level but the highest, each null table entry pointing to the next level null table, the last null lookup table elements pointing to a "null HCB" whose address will never match a real address of target code, so that the validity or not of any lookup table entry never needs to be tested. This is illustrated FIG. 7 that shows a search mechanism 700 with a non-null level-1 lookup table 713, a non-null level-2 lookup table 715 and a non-null level-3 lookup table 717. The address 701 to be searched for a matching HCB is partitioned into three parts and the contents of each part, shown as ADD1 (703), ADD2 (705) and ADD3 (707) in order of significance of the bits, are used to index a level-1, a level-2, and a level-3 lookup table, respectively. For example, ADD1 may index an element (741) of TABLE 1 that has a pointer (742) to TABLE2 (715). ADD2 is used to index into lookup table TABLE2 (715). Suppose there is an element in lookup table 715 that ADD2 indexes to and that has a pointer 743 to the lookup table 717. ADD3 is used to index into lookup table TABLE3 (717). Suppose there is an element in lookup table 717 that ADD3 indexes and that has a pointer 745 to an HCB 718. The required HCB that matches the address is then found. Suppose that ADD3 indexes a different element in table 717 that points to a different HCB 719. In that case, the required HCB is HCB 719 and the search is successful.

The search mechanism 700 also includes level-2 lookup table N-TABLE2 (722) and level-3 lookup table N-TABLE3. These are the "null tables." Each element of N-TABLE2 points to N-TABLE3, and the elements in N-TABLE3 point to a "null" HCB N-HCB (725) that has an address guaranteed to never match an actual target code address. The search mechanism 700 is initialized during the configuration phase to have all level-1 lookup table pointers point to N-TABLE2 and all level-2 lookup table pointers point to N-TABLE3. During translate time, whenever a new HCB is set up, the pointers in search mechanism 700 are set up to correctly lead to that HCB when the HCB address is searched for.

Thus, every search requires the same number of table lookups and thus the same number of host processor operations no matter at what level of the lookup a mismatch occurs. No pointers ever need to be tested. Any search for an address that does not have a matching HCB will eventually lead to N-HCB. The path may be via N-TABLE2 and N-TABLE3 when no HCBs that match PART1 of the address exist, or via N- N-TABLE3 when no HCBs that match PART2 of the address exist, but some that match Part1 do exist. Or, when PARTS1 and PART2 are matched, but no HCB matching PART3 of the address exists, the level-3 table lookup leads to N-HCB. This improves performance by not requiring checking for null pointers; most look-ups target HCBs that already exist.

Note that in one implementation, the address, or "address part" is stored in the in the table which is pointed to, and in another implementation, no address is stored, just the pointer to the next table or HCB, and the address part is used only as an index into the table to load a pointer to the next table or HCB.

Chaining the HCBs

Another aspect of the invention is how the host code buffers are chained together to provide for fast execution of the processor simulator. The general principle is to avoid any tests or jumps for the operations that are performed frequently so that the host processor runs rapidly most of the time, for example only rarely needing to break its pipeline.

When the code of the HCB is completed, a look up for the next host code buffer is carried out. The "looking up" may be trivial, e.g., jumping to a known location, or may require a search that, if unsuccessful, may further require creating a new HCB. On aspect of the invention is avoiding unnecessary searching for the next HCB, i.e., avoiding block 305 of the main loop 300. In one embodiment, at the conclusion of processing the code in a present HCB, the first time the present HCB is processed, a search for the next HCB is carried out. After the next HCB is found or newly created, the embodiment stores for the present HCB pointer to the next HCB, i.e., some information with associated instructions directing the host to the next HCB, such that the search for the next HCB can be avoided the next time the present HCB is processed. The next HCB information may be stored as part of the HCB or elsewhere associated with, i.e., "for" the HCB.

In one embodiment, the second and subsequent time the first HCB is executed, the next HCB pointer is checked to determine if the next HCB is still the correct next HCB. If the HCB pointer fails, the next HCB is searched for.

In an improved embodiment, each HCB includes multiple next HCB pointers that point to different next HCBs depending on one or more conditions being met. For example, the final target instruction translated in the first HCB may be a conditional branch. In such a case, the next HCB information includes a first pointer to a first next HCB in the case that the branch is taken, and a second pointer to a second next HCB in the case that the branch is not taken.

While having the next HCB information improves performance by avoiding unnecessary searches for existing HCBs, there is still a need for a comparison to determine if a next HCB pointer points to a correct existing HCB.

Furthermore, there is a need to efficiently jump to the find next HCB block 305 of the next loop when the next HCP pointer fails.

According to another embodiment, the execution is speeded up even more by assuming that the HCB pointer is correct and immediately jumping to it. The present HCB includes an instruction to jump to the location pointed to by the next pointer stored for the next HCB, and the next HCB pointer initially points to a process to search for the next HCB, so that executing the code in an HCB of a sequence of HCBs always ends in an unconditional jump to the next location. A mechanism is provided for storing return addresses in the case that the next HCB pointer did not in fact point to the correct next HCB. According to this improved embodiment, the HCB includes a HINT data structure that includes a set of pointers to the next HCBs. A next HCB pointer is also sometimes referred to as a "Next HCB Hint" and sometimes as a "CodeHint" herein. Note that a CodeHint as used herein includes the Cache Hint for the I-cache. A DataHint refers to the hints for data references, e.g., the TLB Hint and the Cache Hint for the D-cache.

Figure 8:
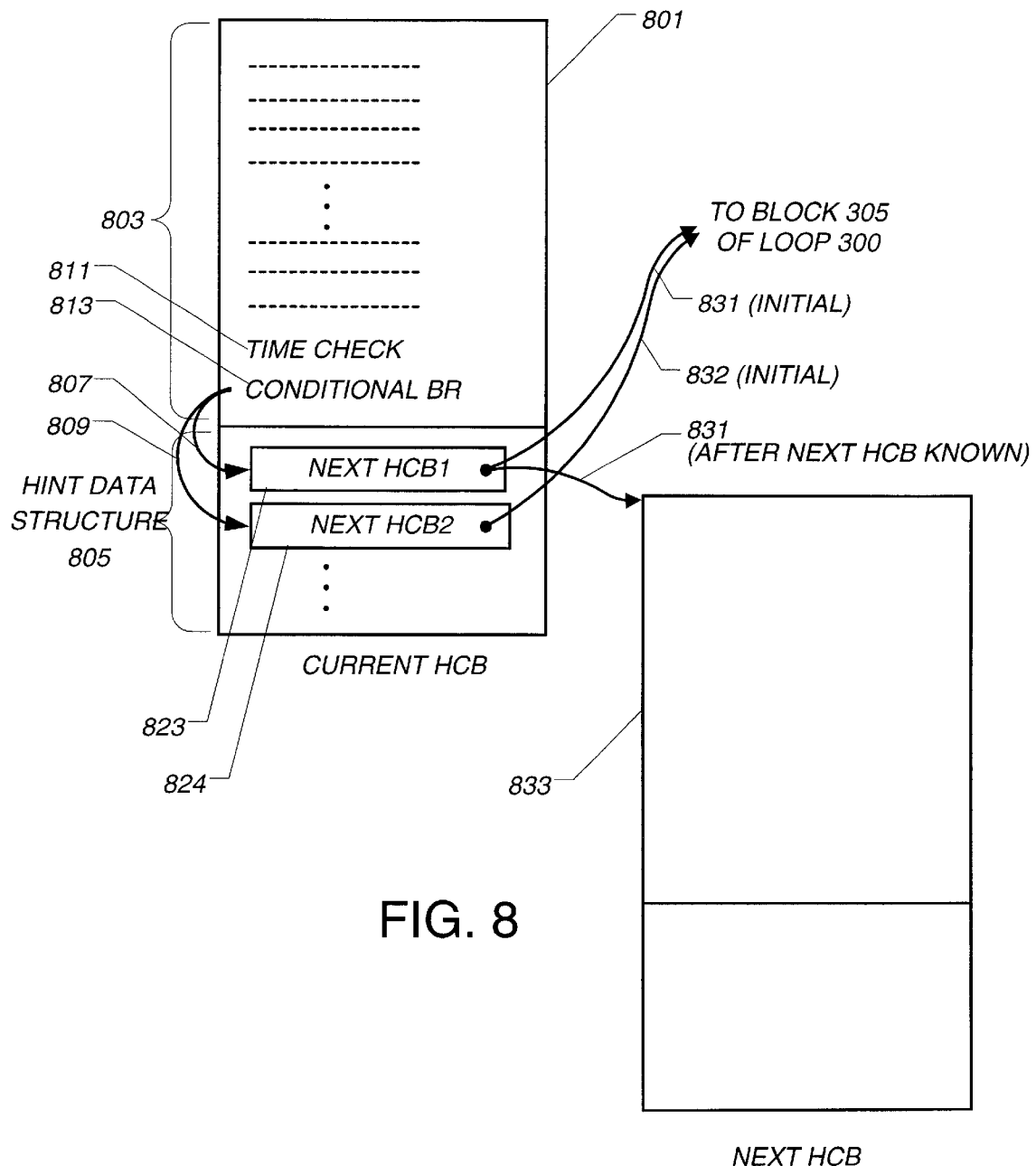
FIG. 8 shows a simple example of the structure of an HCB and the mechanism for chaining HCBs according to an embodiment of the invention.

FIG. 8 shows a simple example of the chaining using the next HCB pointers of the HINT data structure. HCB 801 includes a host code section 803 that contains the translated target code of a linear block of the user program 109 together with the hooks inserted by analyzer/translator 112. The HINT data structure 805 includes two next HCB elements 823 and 824 that include pointers 831 and 832, respectively, that initially point to block 305 of main loop 300, and ultimately point to the next HCB. The host code section 803 includes the time check 811 that checks for a significant event such as the processor simulator running out of simulation time, and, in this example, a translated conditional branch instruction 813 that ends the linear block. During translate phase, when the HCB is formed, the next HCB pointers 831 and 832 point to the find next HCB block 305 of the main loop (FIG. 3). During translate time, one or more pointers to the next HCB pointer or pointers of the HINT data structure are inserted, for example two pointers 831 and 832 in the case of a conditional branch. Again when there is conditional branch 813, the branch instruction is set up to point to the HINT data structure 805's next HCB information, in particular, via pointers 807 and 809 to the two next HCB elements 823 and 824, respectively.

During execution time, any time the HCB code in HCB 801 is processed, control is passed to the address pointed in one of the next HCB pointer(s) 831 and 832 in the HINT data structure 805. The first time the HCB code is processed, control is thus passed to the find next HCB block 305. Either the HCB exists or a new HCB is built by translating the next linear block of target code. In either case, the next HCB pointer in the HINT data structure 801 is changed to point to the found or new HCB, as the case may be. Suppose, for example, that the result of the conditional branch 813 leads to Next HCB Hint element 823. The next HCB is now searched for in block 305. When the next HCB, shown as HCB 833, is either found or newly created, the pointer 831 in Next HCB Hint 823 is now set to this next HCB 833. The next time HCB 801 is processed, and the conditional branch leads to Next HCB Hint 823, the next HCB 833 is automatically processed with no tests, providing for rapid execution of chained HCBs.

During execution, a host register or memory location (the EDI register on one implementation for an x86 host processor) is used to store a pointer to the previous HCB's HINT data structure so that when the next HCB is searched for or newly created, the HINT data structure 801 may be addressed by the host processor.

Thus, at the end of executing the code in an HCB, there is always a jump to a location pointed to in the HINT data structure. There are no special cases or tests carried out prior to the jump, for example to determine if there is a next HCB. The location pointed to in the HINT data structure automatically pre-set to point to the next HCB when one exists or to the find next HCB block 305 of the main loop. It is also re-set back to block 305 if the target HCB is invalidated for any reason, such as self-modifying code.

Note also that there is also code added in the code section of the HCB to carry out a simulation time check. This is shown as TIME CHECK 811 in the example of FIG. 8. If it is determined that there is no simulation time remaining, then the host processor jumps to the simulation time check block 309 of the main loop (300).

When checking for a next HCB according to the next HCB pointer, the processor simulator needs to be sure that the memory permissions have not changed. If the first HCB and the first and second next HCBs are in the same page of memory, as seen from the addresses of the HCBs, then the processor simulator assumes that the instructions of the three HCBs are in the same linked list element in the linked list of physical memories, and no further checking is required.

Thus, in one embodiment, when a next HCB is created, e.g., in the translate phase, a check is made to ensure that the next HCB is in the same page of memory as the previous HCB. This ensures that the same protection mechanisms and mappings apply to the code translated in a chain of HCBs without a need to carry out a protections and mappings check that would otherwise need to be carried out at the find next HCB block 305 of the main loop 300.

If it is determined from the check that the next HCB is not in the same page, then the process returns to the main loop where, in one embodiment, step 305 includes a permissions check and possibly a TLB check depending on how the HCB is indexed. For a MIPS target processor, for example, the HCB is indexed with a physical address, so a TLB lookup is included in step 305.

The Memory Management Unit Simulator

Most modern processors contain a memory management unit (MMU) that translates the virtual addresses used by the user program into physical addresses used to access the memory and I/O devices of the processor. The MMU is used by every instruction fetch and every load and store. Thus, in one embodiment, the processor simulator 107 includes an MMU simulator 123. The MMU simulator 123 includes support for multiple virtual address spaces in order to support multi-user operating systems and multi-process user programs. Furthermore, in one embodiment, the processor simulator supports concurrent but disjoint virtual address spaces.

Because the hardware MMU of a modern target processor relocates every instruction fetch and data address generated by the target CPU in a real machine, efficient modeling of the MMU is important for an efficient processor simulator. In one embodiment, the MMU includes a TLB and the MMU simulator includes a TLB simulator containing simulated TLB entries and a TLB search mechanism for searching the simulated TLB for an entry that matches a virtual address and a page size. One aspect of the invention is that the TLB simulator stores at execution time, for an instruction that might include accessing the MMU, a pointer to the simulated TLB entry that results from a lookup of the simulated TLB the first time execution of the target instruction is simulated such that the TLB simulator can avoid looking up the simulated TLB the next time the target instruction is executed in simulation.

One exemplary embodiment models the MMU of a MIPS R4000 series microprocessor, and how to adapt it for other target processors would be straightforward to one skilled in the art. The R4000 translates 32 bit virtual addresses to 32 bit physical addresses using a 48-entry translation table—a TLB—that acts as an N-way fully associative cache. Each TLB entry contains the virtual addresses of a pair of virtual memory pages and the corresponding physical memory addresses of the pages along with some protection bits ("attributes," "permissions"). Virtual pages of sizes between 4 KB and 16M are supported. MIPS processors support multiple virtual address spaces using an "address space identifier" (ASID). The ASID information is part of the TLB. There can be many TLB entries with the same virtual address, but with different ASIDs. To match an entry in the MMU, the virtual address must match and, in addition, either the ASID must match or a bit in the MMU entry called the "global" (G) bit must be set.

In one embodiment applicable to simulating a MIPS processor, the TLB simulator does not compare the ASID. Simulated TLB entries are instead enabled or disabled any time the ASID is changed so that the simulated TLB is matched to the current ASID.

Many target processors include a software reloaded hardware TLB. When the CPU issues a virtual address that is not found in the hardware TLB, the target processor generates a TLBmiss exception that normally is handled by a software service routine, e.g., in the operating system, that fills in a TLB entry using information from the page table.

One embodiment of the TLB simulator 123 includes host code to model the TLB's fully-associative lookup every time an address translation is needed. However, the simulated TLB lookup consumes tens or several tens of host instructions, making the processor simulator potentially several orders of magnitude slower than the target processor in running the user program. In simulating the execution of the target code, every load and store instruction simulated must first translate the virtual address generated by the instruction into a physical address. The frequency of address translations necessitates an efficient solution.

One aspect of the invention is an MMU simulator that simulates a TLB lookup relatively efficiently. Another aspect of the invention is avoiding simulating a TLB lookup relatively frequently when an address translation is needed.

Consider a lookup of a typical target TLB. A virtual address is generated and searched for in the TLB. The hardware TLB in parallel checks all entries for a match of both part of the address (the "tag bits") and the page size. Once there is a match, the TLB provides the corresponding physical address and a set of attributes for different target processor modes—read (R), write (W), fetch, monitor, etc.—that provide for carrying out a permissions check.

Figure 9A:
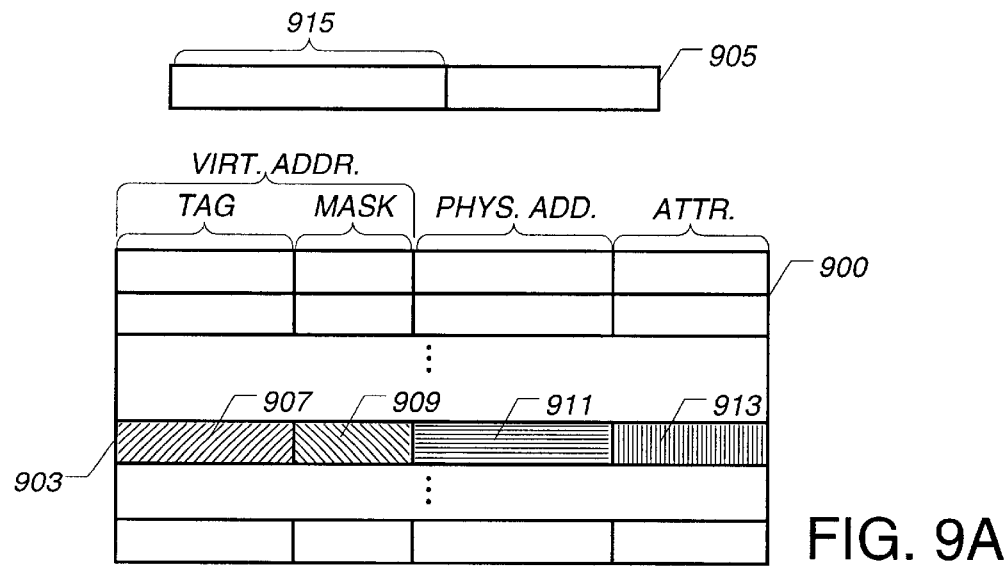
FIG. 9A shows one representation of a translation lookaside buffer (TLB) according to an embodiment of the invention.

A target TLB may thus be represented as a table such as table 900 shown in FIG. 9A. The page size and tag bits may be represented as a variable mask that depends on the page size to apply to the virtual address to give the tag bits that are matched in the TLB. Thus there are entries in TLB 900 for different tags and masks. Entry 903, for example, provides the physical address 911 and the attributes 913 for a page of physical memory that are allocated for all virtual addresses that, if one masks out all bits except the tag bits of the virtual address such as the shown virtual address 905 using mask 909, match the tag bits 907 in the TLB entry 903.

The TLB Simulator

One aspect of the invention is simulating by software the operation of a TLB in MMU simulator 123. Three aspects are how the TLB information is represented and stored in the simulated TLB, how the simulated TLB is searched in MMU simulator 123, and how the permissions are obtained for a TLB entry. Because during the processor simulation, not only physical addresses and permissions are required, but also the host memory location, another aspect is including the physical address to host address translation in the simulated TLB. Yet another aspect is how to speed up operation of the TLB simulator such that often no search for a TLB entry is carried out.

During the translate phase, hooks are included in the host code in an HCB to invoke is the TLB simulator 123 during execution. The hooks are introduced for any target instruction that requires translation from a virtual address to a physical address.

The TLB Simulator Search Mechanism

Assume for the moment that there is some way of representing the TLB information in processor simulator 107, for example as a table such as TLB table 900, or in some other manner as will be described below.

Figure 9B:
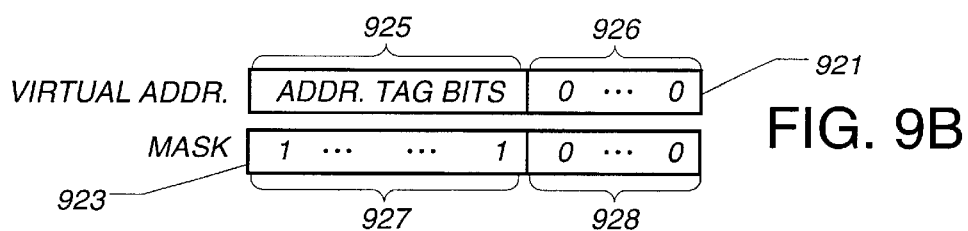
FIG. 9B shows how the virtual address and the page size information may be encoded in a simulated TLB entry according to an embodiment of the invention.

While there are many ways to represent the page size information and the virtual address tag bits to match in a simulated TLB, in one embodiment, referring to FIG. 9B, the page size information is represented by a mask entry 923 in the TLB entry, and the tag parts of the virtual address to match are represented by a virtual address entry 921 in the TLB entry. The virtual address TLB entry 921 has the tag bits 925 and also 0's in the part 926 that indicate the location within a page. The TLB mask entry 923 has 1's in a part 927 that corresponds to the tag bits of a virtual address to be matched, and 0s' in the part not to be matched.

Consider some virtual address. To compare the virtual address with a simulated TLB entry, the mask 923 is applied to the virtual address, and the resulting address compared to the virtual address TLB entry 921.

The searching of a match with the tag bits of a virtual address and a page size (i.e., mask) could be very slow. The information is sparse, i.e., not all possible entries are in a typical TLB. Thus, as described above for the searching of an HCB, a search speed up technique is used to search for a matching simulated TLB entry. Any speed-up technique may be used, and in one embodiment, multi-level lookup tables are used, and in particular, three levels are used. Another embodiment uses two levels. Thus one aspect of the invention is TLB simulation including rapidly searching for sparse matches in a manner that avoids tests so that the TLB simulator of the processor simulator always processes a search rapidly with no "exceptions." One multi-level table searching method includes initializing the tables with null pointers, and then sets up valid pointers to the required simulated cache entries. If a null pointer is reached at any level of the lookup, then the search process stops with a non-match. This requires testing pointers to determine if null.

Figure 9C:
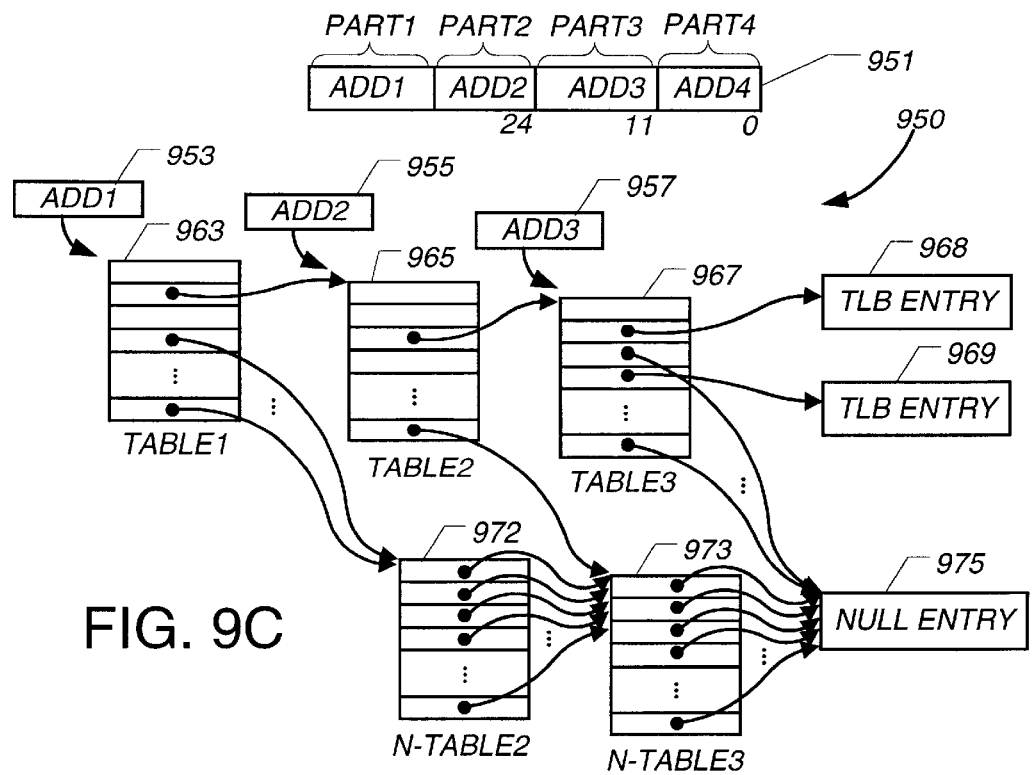
FIG. 9C shows a search mechanism to search for a simulated TLB entry in a TLB simulator according to an embodiment of the invention.

In one embodiment of the inventive TLB simulator, rather than having null pointers or equivalent in the tables, "null lookup tables" are introduced all of whose entries point to a next level table that is also "null lookup tables", all of whose entries point to a "null simulated TLB entry" whose virtual address will never match a real virtual address of target code. This is illustrated in FIG. 9C which shows a search mechanism 950 with a non-null level-1 lookup table 963, a non-null level-2 lookup table 965 and a non-null level-3 lookup table 967. The tag bits of the virtual address 951 to be searched for a matching simulated TLB entry are partitioned into three parts and the contents of each part, shown as ADD1 (953), ADD2 (955) and ADD3 (957) in order of significance of the bits are used to index a level-1, a level-2, and a level-3 lookup table, respectively. The search mechanism 950 of FIG. 9C is similar to the next HCB search mechanism illustrated in FIG. 7. For example, ADD1 may index an element (741) of TABLE1 that has a pointer to TABLE2 (965). ADD2 is used to index into lookup table TABLE2 (965), and suppose an element in lookup table 965 is indexed by ADD2 and has a pointer to the lookup table 967. ADD3 is used to index into lookup table TABLE3 (967). Suppose lookup table 967 includes an element that is indexed by ADD3 that has a pointer 951 to a simulated TLB entry 968. The required simulated TLB entry for the address is then found. Suppose that ADD3 indexes a different element in table 967 that points to a different simulated TLB entry 969. In that case, the required simulated TLB entry is simulated TLB entry 969 and the search for a TLB entry is successful.

The TLB entry search mechanism 950 also includes level-2 "null" lookup table N-TABLE2 (972) and level-3 "null" lookup table N-TABLE3 (973) that are "null tables." Each element of N-TABLE2 points to N-TABLE3, and element in N-TABLE3 points to a "null" TLB entry (975) that has an address and mask guaranteed to never match an actual target code address. In one embodiment, this is done by setting to '1' one or more of the bits of the "masked out" area 926 of the virtual address entry 921 (FIG. 9B) of the null TLB entry 975. The search mechanism 950 is initialized during the configuration phase to have all level-1 lookup table pointers point to N-TABLE2 and all level-2 lookup table pointers point to N—TABLE3. During execution time, whenever generating a new TLB entry is simulated by generating a new simulated TLB entry, the pointers in search mechanism 950 are set up to correctly lead to that new simulated TLB entry when the simulated TLB entry address is searched for.

Thus, every TLB entry in the TLB simulator requires the same number of lookups and thus host processor operations no matter at what level of the lookup a mismatch occurs. No pointers ever need to be tested. This improves the performance of the most common case of finding an active TLB entry; most TLB lookups are successful. Any search for an address that does not have a matching simulated TLB entry will eventually lead to the null TLB entry. The path may be via N-TABLE2 and N-TABLE3 when no simulated cache entries exist that are indexed by PART1 of the address, or via N-TABLE3 when no simulated cache entries exist that are indexed by PART2 of the address, but some that PART1 indexes do exist. Or, when PARTS1 and PART2 index table elements, but no simulated TLB entry is indexed by PART3 of the address, the level-3 table lookup leads to the null TLB entry.

A part—PART4 of the address 951 is never used for the address look up to search for the TLB entry because of the minimum page size. Suppose, for example, that the minimum page size is 4K. Matching the tag of any TLB entry does not include matching the 11 lowest order bits of the address, shown as PART4 in FIG. 9B. The remaining bits of the address are then indexed in three steps, one for each partition of the address. Suppose further that the largest possible block is 16 MB long. For a 16 MB page, the bits of a virtual address from bit positions 11 to 23 are then not used to match the tag in the TLB entry. Thus the bits of a virtual address from bit 11 to bit 23 are sometimes used, depending on the page size, and the bits from bit 24 and higher are always used. In one embodiment, the lowest level table, TABLE3, is indexed by the contents 957 of PART3 of the virtual address 951 that may or may not be used depending on the page size. The part of the address that is always used is indexed in two steps by the first- and second-level tables.

Thus, for a 16 MB page simulated TLB entry, all entries in the lowest-level table TABLE3 point to the same simulated TLB entry, while for 4 KB page size cache entries, each entry in a lowest level tableTABLE3 point to different simulated cache entries.

In one embodiment applicable to simulating a MIPS processor, the lookup of the simulated TLB entry does not include comparing the ASID. Rather, each time the ASID changes—an infrequent event compared to lookups—any simulated TLB entry that does not have the G bit set is enabled or disabled. Entries that match the new ASID are enabled, and entries that do not match the ASID and do not have the G bit set are disabled.

The TLB Hint

One aspect of the inventive TLB simulator is the TLB simulator's frequently avoiding a simulated TLB lookup by storing, for each instruction that might require a TLB lookup, a TLB Hint that points to the last found TLB entry for that instruction. Initially the TLB Hint is set up, during translate time, in the HINT data structure of the HCB to have a null value that will always produce a permissions check failure, for example by setting the pointer to the "null" TLB entry 975 that always fails. The first time the translated host code for that instruction is executed at execution time, the simulated TLB is looked up and the TLB Hint in the HINT data structure is set up to point to the found simulated TLB entry. The next time that instruction is executed in simulation, instead of looking up the simulated TLB, the TLB Hint is used to immediately perform the required check in the simulated TLB entry pointed to by the TLB Hint. If the permissions check succeeds, then the simulated TLB simulates the correct TLB entry and a simulated TLB lookup has been avoided. If the permissions check fails, then a search for the correct simulated TLB entry is carried out by the TLB simulator to find the correct simulated TLB entry. If a correct TLB is found, then the TLB Hint is now reset to the newly found simulated TLB entry. If no correct TLB is found, then this is a TLB-miss exception. Simulating a TLB miss exception is a rare event.

The Simulated TLB Data Structure

One aspect of the invention is that the simulated TLB information is encoded such that the host memory location corresponding to the virtual address is automatically available. Another aspect of the invention is that the simulated TLB information is encoded such that no testing is required to do a permissions check.

Referring again to FIG. 6, linked list 600 represents the complete physical address space and includes information on physical memory allocation and for each block of physical memory, the allocated host memory. In one aspect of the invention, each entry in the simulated TLB that simulated a target TLB entry is represented by a linked list structure that includes a linked list element for each allocated block of physical memory in the page of the TLB entry being simulated. Each such linked list element is called a "runTLB" herein. Note that each target TLB entry represents a region of the virtual address space, and therefore may include one or more allocated blocks of physical memory and one or more blocks of the physical address space that have been unallocated. That is, the blocks of allocated memory in a TLB entry may be disjoint. Thus, each target TLB entry in general represents a subset of the linked list 600 that represents the whole physical memory space. In one embodiment, there is a corresponding runTLB in the linked list of runTLBs of a simulated TLB entry for each and every each linked list element in the subset of the linked list 600 that corresponds to the region of the virtual address space of that target TLB entry being simulated. The linked list representing the physical-to-host memory mapping that is built during configuration time is used to build the entries of the simulated TLB such that the simulated TLB automatically produces the host memory location of any virtual address looked up.

Figure 10A:
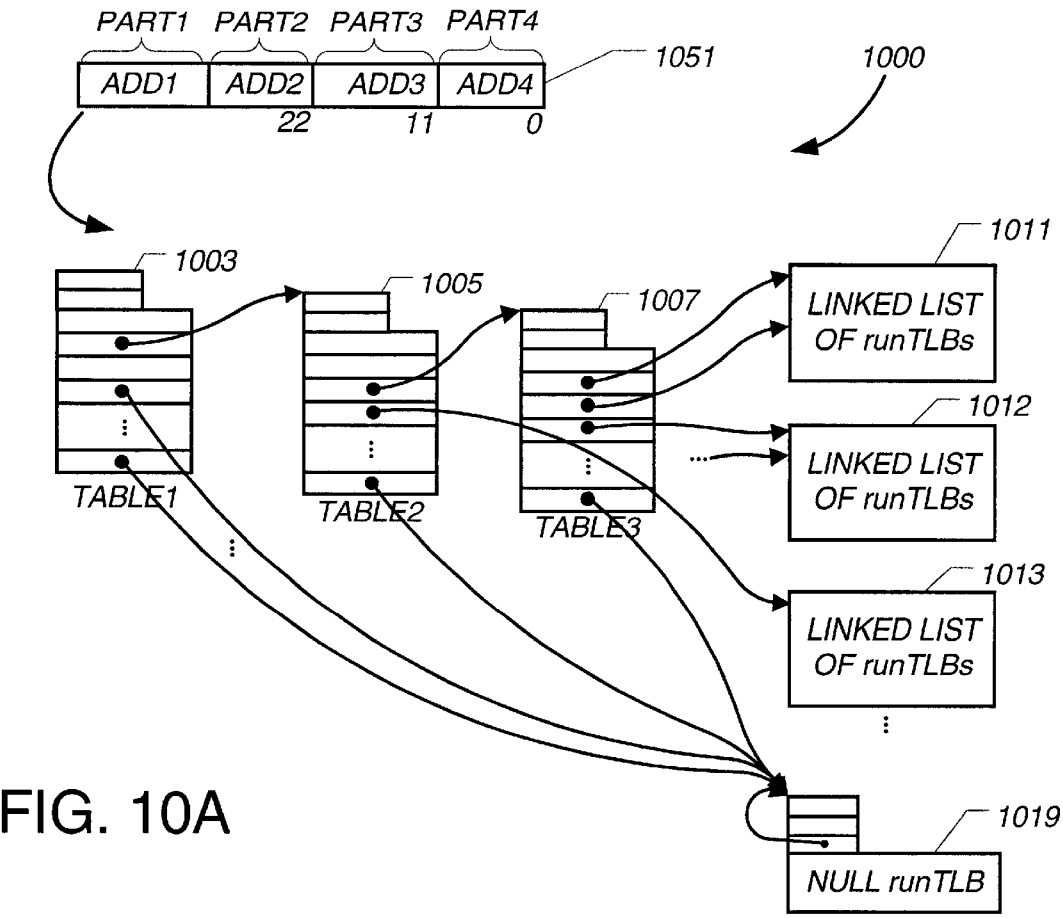
FIG. 10A shows an embodiment of a TLB simulator that includes a search mechanism according to an embodiment of the invention.
Figure 10B:
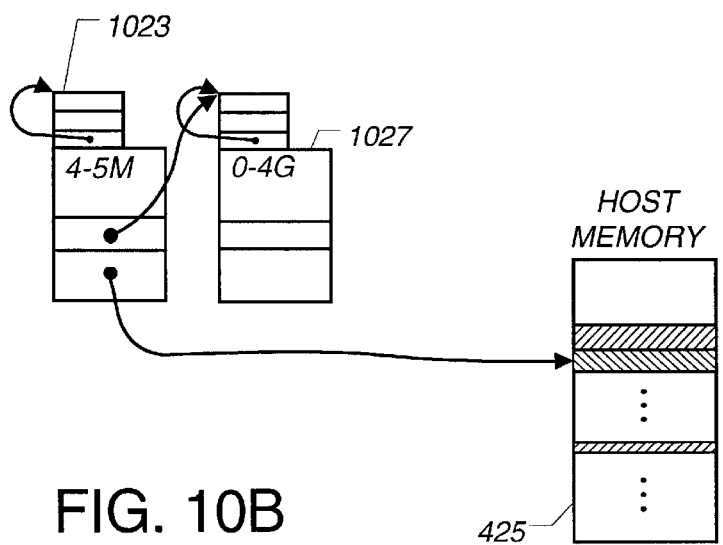
FIG. 10B shows an element representing one or more blocks of physical memory together with a physical to host address mapping for use in a TLB simulator according to an embodiment of the invention.

FIG. 10A shows in simplified form an improved embodiment of the search mechanism and simulated TLB shown in simplified form in FIG. 10C. Search mechanism 1000 includes a level-1 lookup table 1003, a level-2 lookup table 1005 and a level-3 lookup table 1007. Each target TLB entry is represented by a set of runTLBs, e.g., sets of run TLBs 1011, 1012, and 1013. The pointers in the lookup tables are to individual runTLBs. For example, the simulated TLB entry shown as TLB entry 1068 that was shown in FIG. 10C to have a single pointer in TABLE3 1067, may now have two or more pointers from the equivalent TABLE3 1007 to the runTLBs in the equivalent set 1011 of runTLBs representing the TLB entry. Furthermore, as shown in FIG. 5B and described above, each lookup table includes, in addition to the pointer fields, two fields that contain the shift and mask, respectively, to apply to the virtual address field prior to the lookup. Furthermore, to reduce the number of tables required, each pointer in any level table may point directly to a runTLB. Furthermore, as shown in FIG. SC for the linked list element and explained above, each runTLB includes a replica lookup table that includes the shift and mask fields together with a single pointer field set to point back to the runTLB, so that the runTLB may itself act as a lookup table. This ensures that all searches take the same number of host instructions so that no special cases are processed. Furthermore, while null lookup tables may still be used, in one embodiment, a null TLB entry 1019 that also includes the single entry replica lookup table and that is guaranteed to fail a search is included.

Thus, each runTLB in the TLB simulator represents a part or all of a TLB entry and the physical to host mapping for a physical block of memory. The simulated cache entries that include one or more runTLBs are set up at runtime whenever the Simulated TLB is modified. The runTLBs are initially copied from the physical to host mapping structure, and then modified by adding the information required in the simulated TLB.

In one embodiment, each runTLB includes the following information:
1. The virtual address.
2. A mask or other mechanism to determine page size or for the virtual address for the runTLB.
3. The physical address base.
4. The host address base.
5. The attributes for the block of physical memory from the corresponding TLB entry.

In one embodiment, the attributes from the TLB entry are encoded into the runTLB in a manner that provides the permission and alignment automatically upon testing a virtual address and mask for a match. In particular, the runTLB is encoded so that the address and mask match fails when there is no permission, so that no separate permissions check is required. That is, one aspect of the invention is that the testing of whether a virtual address and a page size (e.g., in the form of a mask) match an entry of the simulated TLB automatically also checks permissions without additional overhead. Similarly, one aspect of the invention is that the testing of whether a virtual address and a page size match an entry of the simulated TLB automatically also checks alignment without additional overhead. No separate permissions check or alignment check is required.

Each runTLB includes not a single virtual address and mask pair, but a plurality of virtual address and mask pairs. There is a virtual address in the plurality for each mode/attribute (read, write, supervisor, and so forth) and there is a mask for each alignment requirement (byte aligned, word aligned, half-word aligned, and so forth).

For those modes that have permission, the correct virtual address is entered in the runTLB. For those modes that do not have permission, a virtual address guaranteed to fail is entered. Similarly, the masks are encoded to fail for the wrong alignment(s). The encoding is entered at the time the one or more runTLBs are built to simulate a target TLB entry.

Whenever a runTLB is known to apply to a particular instruction, e.g., when a simulated TLB lookup when simulating execution of an instruction successfully ends at a runTLB, a pointer to that runTLB is placed at a location in the HINT data structure associated with that instruction. The next time that instruction is encountered during the execution phase, no TLB search is performed. Rather, the runTLB pointed to by the TLB Hint for that instruction is checked. This avoids TLB lookups much of the time.

During the execution phase, suppose an instruction is decoded and it is determined that a simulated TLB lookup is needed. From the decoding of the instruction, the virtual address is determined, as is the mode (read, write, supervisor, and so forth) and required alignment. The processor simulator first checks the runTLB pointed to by the TLB Hint for that data structure. If there is no match, e.g., the "null runTLB" is reached because this is the first time this instruction is being executed, a simulated TLB lookup is carried out using the multi-level lookup tables to arrive at the correct runTLB. To check a runTLB, arrived at either via the TLB Hint or by a lookup, using the mode and required alignment, the TLB simulator indexes to the virtual address-mask pair for that mode. An AND operation of the virtual address with the mask is carried out. A compare operation is now carried out comparing the result of the masking with the stored virtual address in the runTLB. If there is a match, the processor simulator knows that there is permission and that the virtual address is correctly aligned. The physical address and the host address are also known from information in the runTLB.

Figure 11A:
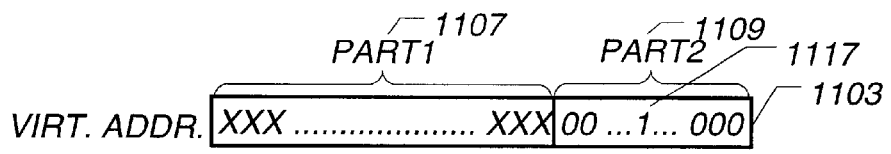
FIGS. 11A–D show how information may be encoded in a simulated TLB entry so that no separate permissions and alignment check are needed according to one embodiment of the invention.
Figure 11A:
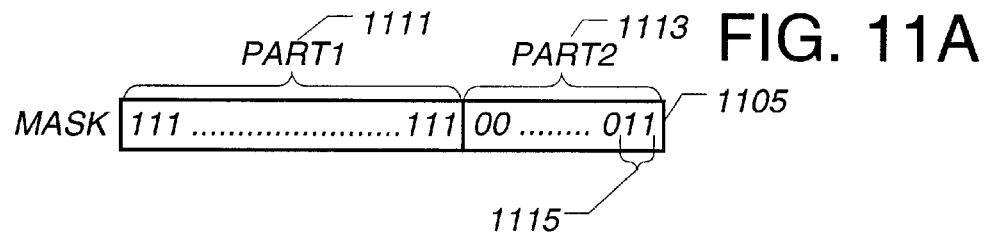

FIG. 11A shows a typical virtual address-mask pair 1100 in a runTLB. The runTLB includes such a pair 1100 for each mode and required alignment. The way the alignment is checked is part of the normal checking process. There is a mask field for each access size. For the ARM this is byte, half-word, word and double word, that is 1-byte, 2-byte, 4-byte and 8-byte. Byte accesses require no alignment, half-word accesses must have bit 0 of the address equal to zero, word accesses must have the least two significant bits 1 and 0 both be equal to zero, and double word accesses must have the three least significant bits be zero. The mask has all the high order bits set to one and the low order bits set to zero, except the last three bits that are set to one if required for alignment checking. ANDing the virtual address with the mask results in the bottom bits other than those required for alignment being removed. The result is then compared to the page field, which has all the bottom bits set to zero. Note that for an ARM target processor, each runTLB has four mask fields, one used for byte accesses, another used for half-word accesses, and so forth. For example the word access mask field has the bottom two bits equal 1s so that when the virtual address is ANDed with this field if the bottom two bits of the address are not zeros they will not much the page field which always has the bottom bits zero. An ARM processor may have alignment checking turned off, in which case the bottom bits are mostly ignored. For this case, all the mask fields have their three least significant bits set to zero.

The pairs are stored in a form convenient for indexing, e.g., as an array. The virtual address 1103 includes the part (PART1 1107) that is to be matched during a search, and the part, PART2 1109, not matched. The number of bits in PART2 is a function of the page size for the TLB entry being simulated, and is specified by the mask 1105 that has a corresponding PART2 1113 that masks out that part of the virtual address using an AND operation.

If the non-TAG bits part (PART2 1109) of the address part of the pair 1100 includes all zeros, there may or may not be a match depending on the results of the AND operation of the mask with the virtual address being looked up. Any non-zero bits in the non-TAG bits part 1109 of the address part of the pair guarantees failure. Thus, in one embodiment, for modes that do not have permission in the TLB entry being simulated, the non-TAG bits part 1109 of the address part 1113 of the pair 1100 has a "1" shown as 1117 in FIG. 1A entered. The location of the "1" in the non-TAG bits part 1109 in one embodiment encodes reasons for failures, e.g., no write allowed for this mode. Thus, the non-TAG bits part 1109 of the address entry is encoded to not match when there is no permission for the mode, and in one embodiment, also encoded to indicate why a lookup failed.

Figure 11B:
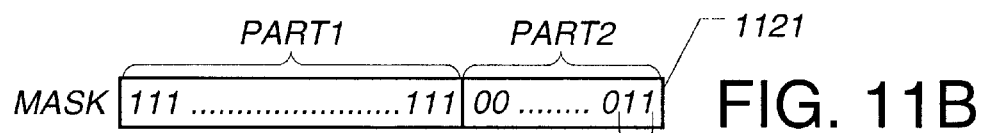
Figure 11C:
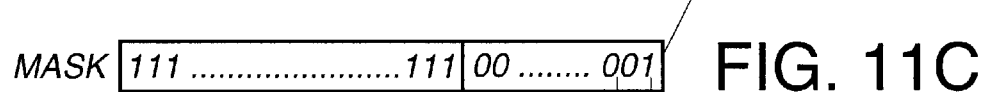
Figure 11D:
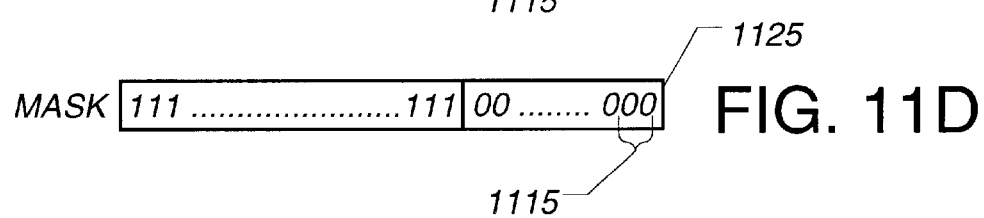

The to-be-masked-out part 1113 of the mask entry 1105 is encoded such that a successful masking will occur only when the alignment is correct. FIGS. 11B, 11C, and 11D illustrate a mask 1121 for a target processor that has either word aligned addresses, half-word aligned addresses, or byte aligned addresses, so that only the two least significant bits are involved (compared to an ARM, for example, in which the three least significant bits of an address are involved). FIGS. 11B, 11C, and 11D thus illustrate a mask 1121 for word aligned addresses, a mask 1123 for half-word aligned addresses, and a mask 1125 for byte aligned addresses, respectively. Thus, any address that does not have 00 as the lowest two bits is guaranteed to generate a result that cannot match the address part of the address/mask pair when ANDed with the word-aligned mask 1121, while any address might match the address part when ANDed with the byte aligned mask 1125.

To summarize, in one embodiment, the attributes from the TLB entry are encoded into the runTLB in a manner that provides the permission and alignment automatically upon testing a virtual address and mask for a match. In one embodiment, the simulated TLB entry, i.e., the set of runTLBs includes a set of versions of the TLB entry virtual address and TLB entry page size (mask) information, each version corresponding to a different mode. Testing a virtual address and page size pair for a match in a simulated TLB entry includes indexing to the version of the TLB entry virtual address and TLB entry page according to the mode. A simulated TLB lookup succeeds for the correct permission and fails when there is no permission.

Thus, at run time, any simulated TLB check includes a search for a match to the part of the virtual address for the page size. The search includes the permissions and alignment check such that succeeding in finding a matching entry indicates that permission and alignment are satisfied without a separate permissions or alignment check required.

Whenever a TLB lookup succeeds for a translated instruction, a pointer to the runTLB is placed in the HINT data structure as the TLB Hint for that instruction. The next time the instruction is encountered, no TLB lookup is typically carried out. The runTLB pointed to in the TLB Hint is checked, and if there is a match, the required TLB entry is found and permission and alignment are known to be satisfied without a separate permissions or alignment check required.

The Cache Simulator

One embodiment of the processor simulator includes a cache simulator 121 (FIG. 1). In that embodiment, the translator/analyzer 112 that translates the target code of user program 109 into host code to generate analyzed code in HCB 111 includes a data access analyzer to insert hooks to invoke the cache simulator 121 during execution of the HCB 111. The cache simulator 121 simulates the target processor's cache behavior during execution of the analyzed user program on the host computer system. The cache simulator includes a simulated cache containing simulated cache entries and a cache search mechanism for searching the simulated cache for an entry that matches an address. As described below, in one embodiment, the cache simulator stores, at execution time, a pointer to the simulated cache entry that results from a lookup of the simulated cache the first time execution of the target instruction is simulated such that the cache simulator can avoid looking up the simulated cache the next time the target instruction is executed in simulation. A pointer in this context includes any mechanism that directs the cache simulator to the last simulated cache entry.

In one embodiment, cache simulator 121 also stores trace data to provide for reporting the run-time statistics, such as the number of cache references and misses, the hit ratio, and the types of cache misses. In one embodiment, this not only provides global statistics, but also provides statistics at individual linear target code blocks, and thus is capable of identifying the location of any bottle-necks (i.e., high miss-ratio regions) of the user program 109. The trace data in one embodiment is a set of counters updated for each cache miss. The cache simulator 121 is useful for tuning the user program 109 and for evaluating processor architectures, including providing dynamic instruction level timing information.

The cache simulator 121 can simulate several types of well known cache structures using a generic cache model that uses a list of parameters to describe both the structure of a particular cache and the policies governing its operations. A cache configuration file (a text file in one implementation) is used to specify the values of these parameters for a particular processor cache model. In one embodiment, the parameters include the number of sets, number of ways, number of bytes in a cache line, and number of dirty bits in a line. Other implementations can include different information. Another embodiment includes as parameters the number of cache lines, the number of sub-blocks within a block, the number of byte in each sub-block, the number of bytes in a word, the replacement policy (e.g., least recently used—LRU—or random, etc.), the write policy, the refilling policy, etc. The processor simulator can include a single cache simulator for a target processor that has a single cache, or can include more than one cache simulator in the case that the target processor includes, for example, a separate D-cache and I-cache, and so forth. The configuration file may also include the memory read cycle time and the memory write cycle time. The cache model can simulate many types of caches, including direct mapped caches and set associative caches.

The cache simulator 121 can operate by simple simulations wherein the cache simulator 121 returns the time penalty for a cache miss. One embodiment of the invention includes a cache simulator that simulates the complete operation of the target cache simulating the processes that occur when there is a cache miss.

One embodiment of the cache simulator 121 includes host code to model the cache's lookup every time a cache lookup is needed. However, the simulated cache lookup consumes tens or several tens of host instructions, making the processor simulator potentially several orders of magnitude slower than the target processor in running the user program. In simulating the execution of the target code, every load and store instruction simulated, for example, must determine if the data is in the D-cache. The frequency of cache lookups necessitates an efficient solution.

One aspect of the invention is a cache simulator 121 that simulates a cache lookup relatively efficiently. Another aspect of the invention is avoiding simulating a cache lookup relatively frequently when a cache lookup simulation is needed. Consider a lookup of a typical target cache (I-cache or D-cache). An address is generated, for example via the memory management unit (MMU), and part or all of the address searched for in the cache. The hardware cache in a target processor checks all entries in parallel for a match of the part of the address (the "tag bits"). Once there is a match, the cache provides the corresponding data.

Figure 12A:
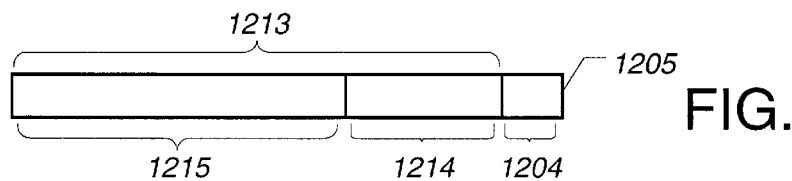
FIG. 12A shows a typical target address that may need to be searched in a cache.
Figure 12B:
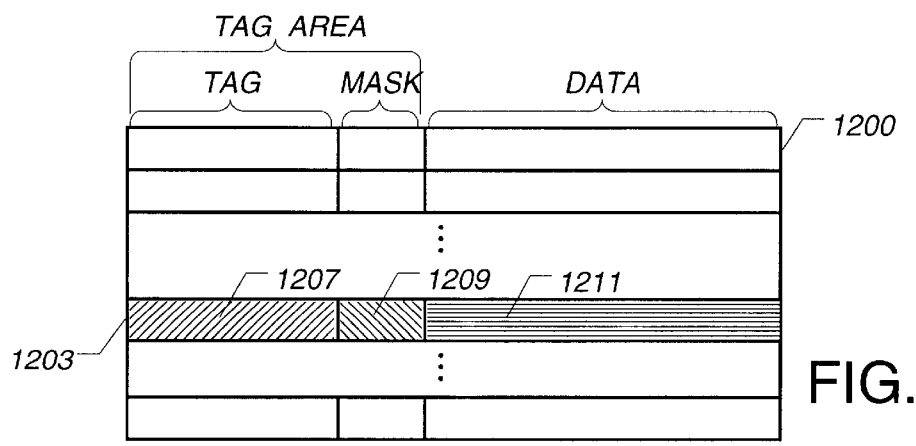
FIG. 12B shows one representation of a cache according to an embodiment of the invention, including how a cache entry may be encoded in a simulated cache according to an embodiment of the invention.

A typical address to be searched is shown in FIG. 12A. A cache may be represented in the processor simulation as a table such as table 1200 shown in FIG. 12B. Each entry of cache 1200 has a tag area and the data. Cache entry 1203, for example, provides the data 1211 for an address that matches the tag bits 1207 in the tag area of the entry.

One aspect of the invention is simulating by software the operation of a cache in cache simulator 121. One aspect is how the simulated cache is searched. Yet another aspect is how to speed up operation of the cache simulator such that often no search for a cache entry is carried out.

During the translate phase, hooks are included in the host code in an HCB to invoke the cache simulator 121 during execution. The hooks in introduced for any target instruction that requires a cache lookup and also whenever the loading of instructions is simulated. See the sections above describing host code buffers for a description of when an I-cache lookup is simulated.

The Cache Simulator Search Mechanism

Consider some address (FIG. 12A). IN a hardware cache, some bits, e.g., the bits in the area 1204 in address 1205 are never used, and a group of bits 1214 within the rest of the address 1213 is used to index into the cache 1200. The area 1204 selects the byte within a cache line. The number of bits in area 1204 sets the line length for the cache, e.g., 5-bits for a 32-byte cache line. A field 1215 of the address 1205 is used to compare with the tag bits of the cache entry. If the bits match, a cache hit has occurred and the data may be read out.

One implementation of the cache simulator 121 includes simulating the cache contents by a table of entries such as table 1200. While there are many ways to represent the cache entries in a simulated cache, in one embodiment, each entry, e.g., entry 1203 includes a tag area and a data area 1211. The tag area contains the complete address, i.e., the tag bits 1207. An area 1209 corresponds to the parts 1204 and 1214 of an address that are not matched. The part 1209 is "masked out" of the address. Thus, a valid entry has 00 . . . 0 stored in area 1209.

In one embodiment, the cache simulator searches the simulated cache 1200 in the cache simulator is a fully associative cache for the purpose of searching for an entry. The searching of a match of an address could be very slow. Furthermore, the information is sparse, i.e., far fewer than all possible addresses have a match in a typical cache. Thus, as described above for the searching of a TLB and of an HCB, a search speed up technique is used to search for a matching simulated cache entry. Any speed-up technique may be used, and in one embodiment, multi-level lookup tables are used, and in particular, three levels are used. Thus one aspect of the invention is cache simulation including rapidly searching for sparse matches in a manner that avoids tests so that the cache simulator of the processor simulator always processes a search rapidly with no "exceptions." One multi-level table searching method includes initializing the tables with null pointers, and then sets up valid pointers to the required simulated cache entries. If a null pointer is reached at any level of the lookup, then the search process stops with a non-match. This requires testing pointers to determine if null.

Figure 12C:
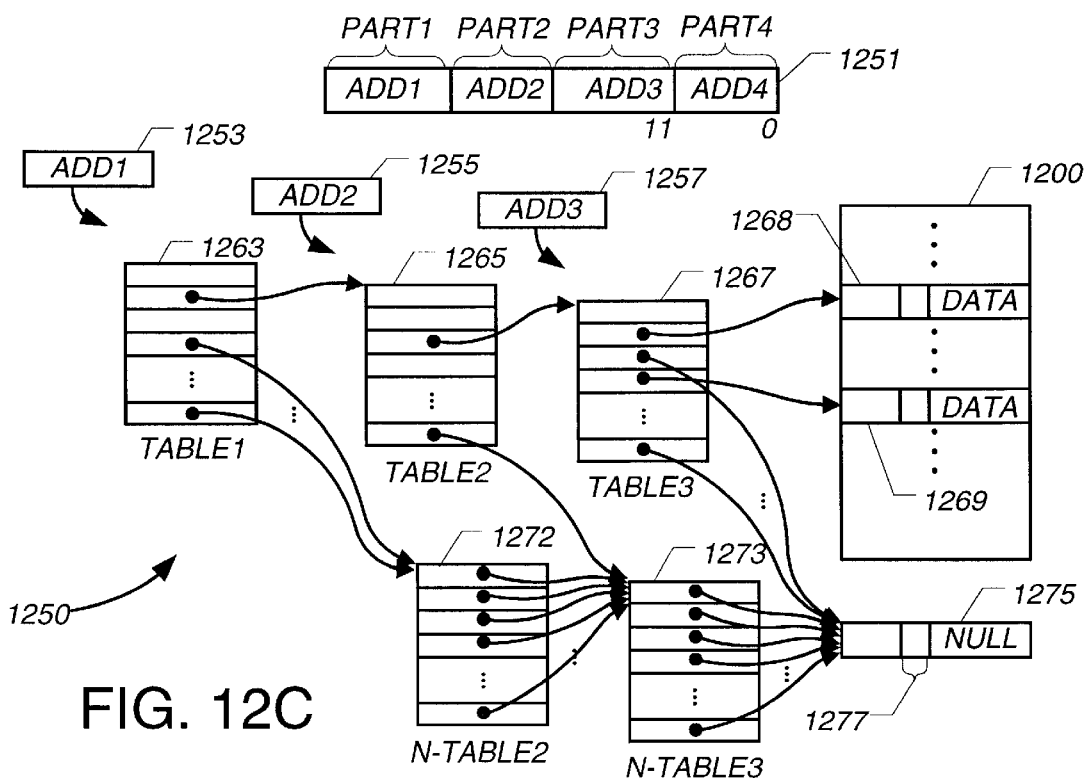
FIG. 12C shows a search mechanism to search for a simulated cache entry in a cache simulator according to an embodiment of the invention.

In one embodiment, rather than the tables having null pointers or equivalent entries that may or may not be valid, the set of multi-level lookup tables includes a "null lookup table" at each level but the highest, each null table entry pointing to the next level null table, the last null lookup table elements pointing to a "null simulated cache entry " whose tag will never match a real address, so that the validity or not of any lookup table entry never needs to be tested. This is illustrated FIG. 12C that shows a search mechanism 1250 with a non-null level-1 lookup table 1263, a non-null level-2 lookup table 1265 and a non-null level-3 lookup table 1267. The complete address except for some lower order bits is looked up. The region of address 1251 to be lookup up in the cache for a matching simulated cache entry is partitioned into three parts and the contents of each part, shown as ADD1 (1253), ADD2 (1255) and ADD3 (1257) in order of significance of the bits are used to index a level-1, a level-2, and a level-3 lookup table, respectively. The search mechanism 1250 of FIG. 12C is similar to the TLB entry search mechanism illustrated in FIG. 9C. Note that in one embodiment, a different number of levels may be used, e.g. three levels for a cache lookup and two levels for TLB lookups.

As an example of a search for a cache entry, ADD1 may index an element of TABLE 1 that has a pointer to TABLE2 (1265). ADD2 is used to index into lookup table TABLE2 (1265). Suppose an element in lookup table 1265 is indexed by ADD2 and has a pointer to the lookup table 1267. ADD3 is used to index into lookup table TABLE3 (1267). Suppose lookup table 1267 includes an element that is indexed by ADD3 that has a pointer 1251 to a simulated cache entry 1268. The required simulated cache entry that is indexed by the address part is then found. Suppose that ADD3 indexes a different element in table 1267 that points to a different simulated cache entry 1269. In that case, the required simulated cache entry is simulated cache entry 1269 and the search is successful.

The cache entry search mechanism 1250 also includes level-2 "null" lookup table N-TABLE2 (1272) and level-3 "null" lookup table N-TABLE3 (1273) that are "null tables." Each element of N-TABLE2 points to N-TABLE3, and each element in N-TABLE3 points to a "null" cache entry (1275) that has a tag area guaranteed to never match an actual address. In one embodiment, this is done by setting to '1' one or more of the bits in the area 1277 of the tag area of null entry 1275 that corresponds to the "masked out" area (regions 1204 and 1214 of the address 1205 of FIG. 12A). The search mechanism 1250 is initialized during the configuration phase to have all level-1 lookup table pointers point to N-TABLE2 and all level-2 lookup table pointers point to N-TABLE3. During execution time, whenever generating a new cache entry is simulated by generating a new simulated cache entry, the pointers in search mechanism 1250 are set up to correctly lead to that new simulated cache entry when the simulated cache entry address is searched for.

Thus, every cache entry in the cache simulator requires the same number of lookups and thus host processor operations no matter at what level of the lookup a mismatch occurs. No pointers ever need to be tested. Any search for an address that does not have a matching simulated cache entry will eventually lead to null cache entry. The path may be via N-TABLE2 and N-TABLE3 when no simulated cache entries that are indexed by PART1 of the address exist, or via N- N-TABLE3 when no simulated cache entries that are indexed by PART2 of the address exist, but some that are indexed by PART1 do exist. Or, when there are tables indexed by PARTS1 and PART2, but no simulated cache entry that is indexed by PART3 of the address exists, the level-3 table lookup leads to the null cache entry.

The Cache Hint

One aspect of the inventive cache simulator is the cache simulator frequently avoiding a simulated cache lookup by storing, for each instruction that might require a cache lookup, a Cache Hint that points to the last found cache entry for that instruction. In one embodiment, the Cache Hint is part of the HINT data structure in each HCB. Initially the Cache Hint is set up, during translate time, to have a null value that will always produce a cache lookup failure, for example by setting the pointer to the "null" cache entry 1275 that always fails. The first time the translated host code for that instruction is executed at execution time, the simulated cache is looked up and the Cache Hint is set up to point to the found simulated cache entry. The next time that instruction is executed in simulation, instead of looking up the simulated cache, the Cache Hint is used to immediately perform the required check in the simulated cache entry pointed to by the Cache Hint. If the cache lookup succeeds, i.e., there is a match with the tag bits, then the simulated cache simulates the correct cache entry and a simulated cache lookup has been avoided. If the lookup fails, then a search for the correct simulated cache entry is carried out by the cache simulator to find the correct simulated cache entry. If a correct cache is found, then the Cache Hint is now reset to the newly found simulated cache entry. If no correct cache is found, then this is a cache-miss exception. In one embodiment, the process that the target would carry out when there is a cache miss is simulated exactly.

Note that because TLB lookups in a target processor succeed most of the time, TLB Hints provide a very significant boost in performance. A cache, e.g., a D-cache, may change between execution of the same target instruction, so using Cache Hints provides a boost in performance that typically is less spectacular than that provided by using TLB Hints.

Hint Failures

When a hint fails, in one embodiment, the processor simulator branches out to a service routine that performs the required service. For example, when a translated memory reference instruction is encountered in the execution phase, the TLB Hint is used to determine permissions and obtain the required physical and host address. The address in turn is checked to see if it is in-cache by using the Cache Hint.

Most of the time, the TLB Hint is correct and permissions are OK, so that the processor simulator continues processing the code in the HCB. When a TLB Hint fails. The processor simulator branches to a service task that carries out a lookup of the simulated TLB using a multi-level table lookup (see, for example, the search described in FIG. 10A). Most often, the search succeeds and the processor simulator returns from the TLB lookup service task and continues. If the TLB lookup itself fails, and the processor simulator now branches to a service task that may need to carry out a table walk, and may include deleting a TLB entry and building and inserting a new TLB entry in the simulated TLB.

Similarly, the Cache Hint may occasionally fail, in which case, the processor simulator branches to a service task that carries out a lookup of the simulated cache using a multi-level table lookup (see, for example, the search described in FIG. 12C). This may lead to a cache miss, in which case the processor simulator branches to a service task that simulates a cache miss, e.g., a task that loads the simulated cache with data from the host memory locations corresponding to the line of cache at the physical memory location. Note that while the cache lookup is simulated using a fully associative simulated cache, the processing of a cache miss takes into account the properties of the cache being simulated, e.g., any set associatively.

Note that the processor simulator stores in the simulated cache all the data that the target processor would store. Before each cache access, a permission check needs to be performed. In the case of the target processor being a MIPS processor, a virtual to physical translation also is required as the cache is tagged with the physical address. For an ARM target processor, each cache entry is for a virtual address but the data is loaded from a physical memory. In one embodiment, in addition to the data a target cache would store, each simulated cache entry includes additional data such as the cache hint for the entry and a pointer to the RunTLB for the memory location. The processor simulator may then rapidly access this additional information.

One aspect of the invention is a method of branching out when a hint fails—e.g., a TLB HINT or a Cache Hint fails—in a manner that is efficient. By an efficient manner is meant, for example, in a manner that for those situations that occur most often does not lead to a break in the host processor pipeline (assuming the host processor has a pipeline).

In one implementation, the object is to implement a conditional subroutine call on the host processor, e.g., a host instruction such as call NE lookup that calls a service called "lookup" when the condition "not equal" is met. Many host processors, e.g., processors conforming to the x86 architecture, do not have such an instruction, while even those processors that do may implement the instruction in a manner inefficient for the purposes of this invention, e.g., the case that occurs most frequently in the invention may be inefficiently implemented.

One way of implementing the above "conditional subroutine call" may be

JMP EQ 1
call lookup.
1:

The jump instruction however is the one that occurs most frequently, and a jump typically breaks the pipeline.

In one embodiment of the invention, the HINT data structure stored in an auxiliary area in each HCB includes, for each memory reference instruction, auxiliary code that includes a call to the related lookup service routine, and a jump to the return address following the memory reference instruction in the code part of the HCB. During translate time, the auxiliary code is first placed in a temporary buffer, and then, when the final HCB is built, the auxiliary code is included in an auxiliary part of the HCB.

```
ADD A, B            ; a memory reference instruction
AND addr1, MASK     ; the Hint lookup at some address
CMP addr2, VADDR
JMP NE X            ; Hint fails: jump to service at X
Z:  ...             ; the next instruction (addr. Z)
``` and a auxiliary area in the HCB has for this instruction the following host code:

```
X:  PUSH &Z         ; push return address on to stack
    JMP lookup      ; a call to the service routine
```

The return address is thus pushed onto the stack.

The HINT Data Structure

In one embodiment, the HINT data structure includes, for each translated target instruction, the Cache Hint, the TLB Hint, and state information that any exception handlers may need, such as how many translated target instructions have been executed from the beginning of the linear block to this instruction, the static time accumulated from the beginning of the linear block to this instruction, offset from the beginning of the linear block to this instruction to provide for processing the PC is required, and so forth. Thus, in one embodiment, the HINT data structure is a data structure that includes more than just the hints.

The code calling to the service routines for a TLB and a cache lookup are in auxiliary areas of the HCB; return addresses are pushed onto the stack.

The following shows one HINT data structure embodiment to operate in a processor simulator that runs on a x86 host processor. This embodiment contains the structures described above together with various other structures used to make the processor simulator run efficiently on a x86 host processor. Those skilled in the art will recognize that some of the details in this HINT data structure are extraneous to the main aspects of the invention described elsewhere herein.

```
/* The info in the DataHint (the HINT data structure for the TLB Hints
and D-cache Hints) is created at translate time, The pRunTLB and
pCacheEntry are the TLB and Cache Hints, respectively that are changed
when needed */
struct sDataHint
{
tRunTLB    *pRunTLB;      /* This is a TLB Hint */
tCacheEntry *pCacheEntry;  /* This is a Cache Hint */
tHadr    RetAdr[4];
tHadr    ExitBlkJmp;      /* Ptr to just past the end of the x86 code for
                             target memory ref, (exit when end of blk) */
tWord16  TickCnt;         /* Static ticks used in this block upto inst
                             that "own's" this block */
tWord16  Spare1;          /* Vector Offset */
tWord8   InstMode;        /* Bit 0 == DelaySlot, Bit 1 == ExtInst */
tWord8   InstType;        /* See above */
tWord8   InstCnt;         /* Number of Inst in this block so far - Used to
```

-continued

```
                    profile number of inst executed */
tInt8    InstOffset;    /* Offset from PC for value to load int EPC,
                           may be -ve */
/* Following is Info on the Type of memory transfer requested */
// tWord32   RWcmd;    /* Type of cycle requested */
tHadr    RegAdr;    /* Host Adr of the Target's register */
tHadr    pRW_func;    /* Func to do the RW */
tWord32    ScoreBoardMask;    /* ScoreBoard Bit Mask for this Register
                                  (Only if Read) */
tInt8    Mnemonic[40];    /* Inst Mnemonic of current Inst */
};
/* The codehint is part of the HCB structure, and provide the
"Next HCB Hint" for the HCB. There is one for the 'taken' path
and one for the untaken path */
struct sCodeHint
{
tHCB    *pSelf;    /* NOT a HINT - Ptr to HCB that was lasted Executed
                      - eg HCB containing this CodeHint */
tHadr    EntryPtr;    /* NOT a HINT - Entry Ptr of Nxt HCB - Must be
                         set to valid code */
tHadr    DefaultEntryPtr;    /* If above Entry Ptr is no longer valid
                                replace with this value */
tCodeHint    *pCaller;    /* Chain of CodeHints that have made direct
                             jmp to HCB */
tBoolean    DirectJmpOK;    /* True if Direct Jmp Allowed */
tWord32    Incomplete;    /* Set None Zero if inst in This HCB is
                             incomplete AND next HCB is for different
                             PAGE */
tRunTLB    *pHintRunTLB;    /* Hint ptr for Nxt RunTLB */
tHCB    *pHintHCB;    /* Hint ptr for Nxt HCB */
};
struct sHCB
{
/* this structure defines the start of each block */
tWord32    Size;    /* size (in bytes) of this block */
/* Tag this blk */
tWord32    ISA;    /* ISA number for this block - eg Index number of
                      AdrTag */
tHCB    *pFwdHCB;    /* Link to 'other' HCB with same tag but for
                       different ISA */
tHCB    *pBackHCB;    /* Back link to make above a double link */
tHCB    *pHeadHCB;    /* Ptr to Head HCB in FlowThru seq, used to
                        invalidate seq */
tHCB    *PNxtHCB;    /* Ptr to next HCB in this sequence */
tCodeHint    *pCaller;    /* Ptr to CodeHint (chain) that made direct Jmp
                            to this HCB - Used when this HCB is to
                            be invalidated */
#if MIPS
tPadr    AdrTag;    /* Tag */
tBoolean    SubHCB;    /* This blk contains the continuation of inst
                          started in previous blk AND page boundary
                          was crossed */
#else
tVadr    AdrTag;    /* Tag */
#endif
tCtag    CacheTag;    /* Bits 35:5 of Phy/Vir Adr shifted left */
/* Hints for this blk, Used to chk and reload cache */
tCacheEntry    *pCacheEntry;    /* ptr to CacheEntry for this blk (hint) */
/* Translate time Variables - Pass from Translate blk containing
   Jump Inst to Delay slot Blk */
tJmpType    JmpType;    /* NoJmp, CondJump, LikelyJmp, Abs26Jmp
                          or RegJmp */
tWord32    JmpInst;    /* The Inst from the Jmp Inst */
tWord32    JmpOffset;    /* Offset value */
tWord32    JmpReg;    /* Reg Number */
tWord32    JmpCC;    /* TRUE if xEQ otherwise FALSE */
/* tWord32    JmpLink;    Set reg number of Link register - Zero = no
   link */
/* RunTime Hint Records */
tCodeHint Taken;    /* ptr to next HCB for taken branch */
tCodeHint UnTaken;    /* ptr to next HCB for Untaken (flowthur) */
/* Make sure there is space for the Cache Chk code */
tWord8    CallInst [MaxHCBCodeSpace];  /* space for call inst, will not
                                          be here ??? */
};    /* Translated code follow this header - after it is aligned to
       Host Cache */
```

Note that different embodiments may place different parts of the HINT data structure at different parts of the HCB, or alternatively, stored elsewhere and associated with the code in the HCB. In one embodiment, CodeHints, i.e., hints on how to find the next HCB and I-cache, are stored at the beginning of an HCB. In one embodiment, there are always two sets of CodeHints, one for taken and one for untaken branches, even if both are not required. There can be one DataHint component (the HINT data structure component for the TLB Hints and D-cache Hints) per instruction. The DataHint part thus is larger than CodeHints, and how many are required is not known until the end of the translation. Hence, in one embodiment, the DataHints are stored at the end of the HCB.

Operation of the Invention

Operating the invention will now be described. One embodiment provides a view of the simulation environment using a debugger, and other embodiments do not necessarily use a debugger. A waveform viewer also is provided for viewing any of a set of desired hardware variables. In particular, the Gnu GDB debugger is used (Free Software Foundation, Boston, Mass., also available on the World Wide Web at http://www.gnu.org), and other debuggers may be used instead. While the invention does not require use of a HDL for the hardware simulator, the description will be provided using Verilog, and using the Super FinSim™ Verilog simulator from Fintronic USA (Menlo Park, Calif.).

Thus, in one embodiment, the debugger starts the simulation, and in one embodiment the debugger first starts the kernel in the interface mechanism. The kernel thus starts the hardware simulation as a task. As the hardware simulation progresses, it invokes one or more processor simulators by passing a message to the interface mechanism that then starts the processor simulators as tasks under the message-passing kernel.

A tool is provided for setting up all the files required. The user programs may need to be modified for operation in the co-simulation design system by replacing some of the input/output commands that interact with hardware with the equivalent calls that are available in the system (See under "Interface Functions" herein below). In addition, some of the operating system calls may have to be changed to those of the particular operating system used in the simulation when the simulation environment and the final target system are to be run under different operating systems. These changes are to account for differences between the simulation-included operating system and the final target operating system.

In one embodiment, the hardware simulator is first invoked and any processor simulators are then started later by the hardware simulator (via the interface mechanism). In an alternate embodiment, the interface mechanism could include all control, so that the software tasks such as the processor simulators are not started by a mechanism in the hardware simulator, which then leads the interface mechanism to start the processor simulator, but rather the interface mechanism would control the processor simulator and the hardware simulator using one or more event queues in the interface mechanism. In yet another alternate embodiment, the processor simulator can initiate the hardware simulator.

Prior to execution, the user may elect to operate a target debugger on the user program. This is a separate and independent debugger from the simulation system debugger. Accordingly, breakpoints in the user programs for each processor simulator can be inserted using the debugger for each target processor. The user can enable or disable the breakpoints in the user program using the target debugger.

The user can also enable or disable breakpoints in the model of the target circuitry using the simulation system debugger. As the simulation is run under control of these debuggers, whenever a breakpoint is encountered, the respective debugger stops execution. At this point, any simulated processor registers and any software variable in any of the processor simulators can be examined through the respective target debugger and any hardware variables in the hardware model of the target circuitry may be examined through the simulation system debugger. The particular implementation of the invention provides a window on the viewer screen for each of the processor simulator's target debugger and for the simulation system debugger. When the systems stops at a breakpoint, the current instruction is highlighted. In addition, the implementation provides a "voltmeter"—like "value watch" window, at user option, to examine any hardware entities as the simulation proceeds. The environment also provides for single stepping both the processor simulators one instruction at a time, and the hardware simulator any number of time units at a time.

One embodiment of the environment provides, at user option, both a command line operating mode, and an interactive mode under a graphical user interface.

The Interface Functions

In one embodiment, a library of functions is provided that span the target/host system interface to facilitate communication between the user program and the host processing system, e.g., the host operating system, and to affect synchronizations. These calls allow for information to be passed between the processor simulator executing the user code and the host operating system. For example, these calls enable accessing the host processing system, e.g., a file therein, from the user program during execution of the user program on the processor simulator. Provided for this purpose is a library of functions that can be linked with the target code (the user program). The functions invoke features embodied within the processor model to allow access to the host processing system. In one embodiment this is achieved by sequences of target instructions that would not usually be present in a user program but that are recognized by the processor simulator at translation time to invoke system functions. Another mechanism is the use of opcodes that normally would be illegal but that herein are used at execution time to signal the processor simulator that a system function may be being made.

These target functions also provide access to performance and statistical data gathering and reporting functions that are instrumented inside the processor simulator or in the model of the target circuitry.

In one embodiment, the configuration file—called the Target Information File (TIF) herein—includes a description of the system level timing interactions with the respective target circuitry. This description is used by the processor simulator to determine which physical address accesses are to be re-directed to access through the common mechanism to the target circuitry being modeled by the hardware simulator. This re-direction, through use of the common mechanism includes access to the translator when the information is passing to the hardware simulator, and the mapper when the information is passing from the hardware simulator to the processor simulator. That is, the processor simulator provides interfaces to memory and or I/O mapped devices through an automatic re-direction mechanism which translates event information from the first data format of the processor simulator to the second data format of the hardware simulator, while some of the other input functions of the processor simulator, such as those dealing with asynchronous events, deal at least in part with translating a hardware variable in the second data format to the first data format of the processor simulator including the signaling of such events to the processor simulator.

Thus, in general, the re-direction mechanism through use of the common mechanism makes use of the general callback mechanisms in the hardware simulator to implement a bi-directional flow of information and control between the hardware simulator and processor simulator. Some processor model shell functionality, for example, is carried out in Verilog using the programming language Interface (PLI) mechanism, and in VHDL using the foreign attribute mechanism, which works differently from the Verilog PLI. This translates a hardware signal variable in the HDL environment to a software variable accessible to the processor simulator and affects the user program accordingly.

Thus, interface functions, both explicitly called from the user program or implicitly called from the processor simulator, form a software shell to provide the user program access to the processor signals coupled to the digital circuitry in the electronic system as well as access to facilities available through the underlying host operating system as well as performance and statistical data gathered by the processor simulators and the hardware simulator. Those interface functions are implemented in the Verilog version using the low level IEEE standard Verilog PLI 1.0 and PLI 2.0 functions such as Verilog's 'tf' and 'acc' functions, and in C/C++ using Windows API calls. These are difficult-to-use low-level functions that allow for scheduling of events, etc., in Verilog and signaling, message passing and file I/O in C/C++. One Verilog implementation of the invention is implemented using these functions to build software shell interface functions that are much easier to use in a higher-level language user program to provide access to the hardware simulation from the user program running on the processor simulator. For example, the Verilog environment has a general registration mechanism that allows a user to register a callback function (e.g., a 'C' function) that is associated with a hardware variable, that causes the function to be invoked whenever that variable changes state. One embodiment implementation of the interface mechanism uses this general call back mechanism. For example, those interface functions that wait for hardware variable changes use these functions.

The preferred embodiment also allows for automatically reading or writing to memory mapped devices, that is, devices that have target addresses. Such devices and their target addresses are defined, for example, in the configuration file (TIF). During run time, prior to any data accesses (read or write), a determination is made as to whether an address is the address of a device or memory. If a device, then the read or write to the device is executed using the interface functions. For example, a write is executed by implementing the necessary interface functions to cause the data written out to the device, including executing the required number of bus cycles on a hardware model 124 of the bus when included in the description 105 of the digital circuitry.

Note that while the interface functions are used in the invention for interactions between the hardware simulator and the processor simulator, a user can take advantage of the availability of these functions and use them in a hardware simulation to behaviorally simulate part of the digital circuitry.

A sampling of interface functions is described in above-mentioned incorporated by reference U.S. patent application Ser. No. 09/430,855. Clearly different functions may be provided in different implementations, and certainly the form of any of these functions is not meant to be limiting. Other forms may be used.

Selecting the Level of Detail

One additional aspect of the invention is providing for simulating a processor at a user-selected level of detail. Thus where greater timing accuracy is required or desired than provided by running the user program completely on the host computer system, those aspects of the target processor's execution where greater accuracy is required may be modeled in hardware. Such hardware is then included in the digital circuitry simulated by the hardware simulator. In addition, the operation of the processor simulator with respect to varying degrees of timing accuracy, such as correctly modeling pipeline timing, can be selectively enabled either through the configuration file (TIF) prior to run time or at run time through either the interface functions or from the hardware simulated target circuitry. Thus a user can begin with a simple processor model to start off the design process. At some stage of the design process, the user may need more detail in one or another aspects of the design, and the user selected level of detail feature of the invention provides for that. Thus, the processor model can operate at a selected level of detail. Selected parts of the model can be modeled as hardware.

One example of modifying the level of detail in order to speed up execution of the user program is not inserting host code into the HCBs which is responsible for the modeling and timing calculations associated with the processor pipeline stalls which may occur as a consequence of cache misses. As the translation mechanism is itself dynamic, this feature can be disabled at the start of simulation to improve simulation performance, and then selectively enabled at points at run time when the additional accuracy is required.

The Virtual Processor Model

We call the model of the target processor that runs on the co-simulation design system a virtual processor model. One aspect of the invention is a method for creating such a virtual processor model, the method comprising creating a processor model shell for operation on the hardware simulator of the design system to simulate activity of one or more signals of the target processor accessible to digital circuitry external to the target processor, creating a software shell to provide the user program access to the processor signals coupled to the digital circuitry in the electronic system, and creating target processor specific information for use in analyzing a user program to determine user program timing information such that when the user program is run on a processor simulator operating on the host computer system, the processor simulator accurately simulates execution, including providing timing, as if the user program was executing on the target processor, with the timing taking into account instruction timing.

The processor model shell provides the hardware simulator the ability to access in hardware entities that affect variables defined in the user program. The processor shell includes a mapper from the data format of the hardware simulator to the data format of the processor simulator. When the hardware simulator simulates hardware described in a hardware description language, the processor model shell includes access to code in the hardware description language. For example, the mechanism that relates a hardware variable interrupt signal to causing the processor simulator to run an interrupt handler in the user program is part of the processor software shell.

The software shell comprises functions accessible to a higher-level language code when the user program includes instructions in such a language. The software shell thus includes the translator of event information from the data format of the processor simulator to the data format of the hardware simulator. In the particular embodiment, the software shell includes the interface functions described herein above that provide the user program access to the hardware simulator.

The level of detail of any processor model is user selectable. Thus, different features of the target processor may be selected for modeling in hardware on the hardware simulator as a processor model or as a combination of hardware on the hardware simulator and software on the processor simulator, that is, as a processor hardware model and a processor software model. Analysis of the user code then includes inserting dynamic hooks into the user program to access such hardware-modeled features or combines software/hardware modeled features. During execution, these hardware features are modeled on the hardware simulator. For example, the processor bus may be modeled in hardware as bus model 124. In such a case the bus model 124 is included in the description of the target digital circuitry simulated by the hardware simulator.

The level of detail in a processor model can be modified from simulation run to simulation run depending on the needs.

Generalizations

While the analyzed program 111 of one embodiment includes the timing information in the form of host code in the HCB that accumulate a simulation time delay while the user program is executed, in alternate embodiments, the timing information may be included in the analyzed version in the form of a timing information data structure, such as an array of timing delays for each block. In such a case, the processor simulator would include instructions external to the analyzed version of the program to accumulate the delay while the user program is executing on the host computer system. Similarly, while the dynamic hooks inserted, for example, for invoking the cache simulator are in the form of additional programming instructions that call functions that during run time invoke the required dynamic part, data structures may be used to refer to programming instructions that are external to the analyzed version of the user program. Such alternatives also are envisaged in the invention.

Furthermore, while the description has concentrated on a co-design system and simulation method that simulates an electronic system that has one target processor, the system and method are applicable to having more than one target processor, and each can be a different processor.

Furthermore, while the physical to host memory mapping is represented by a linked list, other memory allocation data structures such as an array may be used.

Note that the HINT data structure in one embodiment is part of the HCB. In another embodiment, the HINT data structure, or the contents thereof, can be stored elsewhere, but associated with the HCB or the relevant part thereof. Furthermore, different parts of the HINT data structure may be stored at different locations.

The description uses the term "pointer." A pointer in this context includes any mechanism that directs the simulator to a location.

Therefore, although the present invention has been described in terms of the presently preferred embodiments, it is to be understood that the disclosure is not to be interpreted as limiting. Various alterations and modifications will no doubt become apparent to those of ordinary skill in the art after having read the above disclosure. Accordingly, it is intended that the appended claims be interpreted as covering all alterations and modifications as fall within the true spirit and scope of the invention.

What is claimed is:

1. A co-simulation design system for testing by simulation an electronic system on a host computer system, the electronic system including target digital circuitry, and at least one target processor each with an accompanying user program to be executed on its target processor, the design system comprising:

a processor simulator for each target processor using software executing on the host computer system for simulating execution of the user program by the target processor, the software including an analyzed version of the user program;

a hardware simulator to simulate the target digital circuitry using software executing on the host computer system; and an interface mechanism that couples the hardware simulator with the processor simulator including controlling communication between the processor simulator and the hardware simulator, wherein the processor simulator includes a communication mechanism to communicate with the hardware simulator using the interface mechanism when an event requires interaction of the user program with the target digital circuitry, wherein the user program is provided in binary form, and wherein determining the analyzed version of the user program includes:

decomposing the user program into linear blocks, translating each linear block of the user program into host code that simulate the operations of the linear block, storing the host code of each linear block in a host code buffer for the linear block, and adding timing information into the code in the host code buffer on the time it would take for the target processor to execute the user program, the timing information incorporating target processor instruction timing, the adding of timing information including inserting of dynamic hooks into the corresponding host code in the host code buffer that during execution invoke dynamic mechanisms that may effect timing and that cannot be determined ahead of execution, such that while the processor simulator executes the analyzed version of the user program, the processor simulator accumulates simulation time according to a simulation time frame, the accumulated simulation time accounting for the target processor instruction timing as if the user program was executing on the target processor.

2. The design system of claim 1, wherein a target processor includes a cache, the processor simulator for the target processor with the cache includes a cache simulator, and determining the analyzed version of the user program further includes, for each linear block, identifying those parts in the linear block of the user program that include one or more memory references that might require a cache lookup, and inserting hooks into the corresponding host code in the corresponding host code buffer to invoke, at run time, the cache simulator for any simulated memory reference that might require a cache lookup;

such that executing the analyzed version of the user program:

causes the cache simulator to be invoked for the memory references, the cache simulator accounting for the effect of cache lookups on timing, and accumulates simulation time as if the user program was executing on the target processor, the accumulated simulation time also accounting for cache lookup effects.

3. The design system of claim 2, wherein the cache simulator includes a simulated cache containing simulated cache entries, and a cache search mechanism for searching the simulated cache for an entry that matches an address.

4. The design system of claim 3, wherein the cache search mechanism includes a multi-level lookup table search mechanism.

5. The design system of claim 4, wherein the multi-level lookup table search mechanism requires the same number of table lookups independent of whether the cache lookup is successful or not.

6. The design system of claim 3, wherein the cache simulator stores, at execution time, for an instruction that might require a cache lookup, a pointer to the simulated cache entry that results from a lookup of the simulated cache the first time execution of the target instruction is simulated such that the cache simulator can avoid looking up the simulated cache the next time the target instruction is executed in simulation.

7. The design system of claim 2, wherein a linear block has a maximum length equal to the length of a cache line of the cache used for instructions such that when the processor simulator executes the host code in the host code buffer for the linear block, the processor simulator can operate under that assumption that all the target code of that linear block is in cache so that no instruction cache misses will occur.

8. The design system of claim 7, wherein determining the analyzed version of the user program further includes, for each linear block, inserting a hook to determine once at executing time whether or not the linear block of target code simulated is in cache.

9. The design system of claim 8, wherein the processor simulator simulates allocated blocks of target memory, wherein each allocated block of simulated target memory is partitioned into sub-blocks equal to the length of a cache line of the cache used for instructions, and wherein state information is defined for each sub-block to automatically ensure that executing the analyzed code avoids re-executing analyzed code that in simulation has subsequently been modified.

10. The design system of claim 1, wherein a target processor includes a memory management unit (MMU) for translating virtual addresses to physical addresses, the processor simulator for the target processor with the MMU includes an MMU simulator, and determining the analyzed version of the user program further includes, for each linear block, identifying those parts in the linear block of the user program that include one or more memory references that might require accessing the MMU, and inserting hooks into the corresponding host code in the corresponding host code buffer to invoke, at run time, the MMU simulator for any simulated memory reference that might require an MMU access;

such that executing the analyzed version of the user program:

causes the MMU simulator to be invoked for the memory references, the MMU simulator accounting for the effect of MMU accesses on timing, and accumulates simulation time as if the user program was executing on the target processor, the accumulated simulation time also accounting for MMU access effects.

11. The design system of claim 10, wherein the MMU includes a TLB and the MMU simulator includes a TLB simulator containing simulated TLB entries and a TLB search mechanism for searching the simulated TLB for an entry that matches a virtual address and a page size.

12. The design system of claim 11, wherein the TLB search mechanism includes a multi-level lookup table search mechanism.

13. The design system of claim 12, wherein the multi-level lookup table search mechanism requires the same number of table lookups independent of whether the TLB lookup is successful or not.

14. The design system of claim 11, wherein the TLB simulator stores at execution time, for an instruction that might include accessing the MMU, a pointer to the simulated TLB entry that results from a lookup of the simulated TLB the first time execution of the target instruction is simulated such that the TLB simulator can avoid looking up the simulated TLB the next time the target instruction is executed in simulation.

15. The design system of claim 10,
wherein a target processor includes a cache, the processor simulator for the target processor with the cache includes a cache simulator, and determining the analyzed version of the user program further includes, for each linear block,
identifying those parts in the linear block of the user program that include one or more memory references that might require a cache lookup, and inserting hooks into the corresponding host code in the corresponding host code buffer to invoke, at run time, the cache simulator for any simulated memory reference that might require a cache lookup;
such that executing the analyzed version of the user program:
causes the cache simulator to be invoked for the memory references, the cache simulator accounting for the effect of cache lookups on timing, and
accumulates simulation time as if the user program was executing on the target processor, the accumulated simulation time also accounting for cache lookup effects.

16. The design system of claim 15, wherein the cache simulator includes a simulated cache containing simulated cache entries, and a cache search mechanism for searching the simulated cache for an entry that matches an address, and wherein the cache simulator stores, at execution time, for an instruction that might require a cache lookup, a pointer to the simulated cache entry that results from a lookup of the simulated cache the first time execution of the target instruction is simulated such that the cache simulator can avoid looking up the simulated cache the next time the target instruction is executed in simulation.

17. The design system of claim 10,
wherein the target processor includes a pipeline, and wherein the timing information added into the host code in the host code buffer incorporates pipeline effects, such that the simulation time accumulated during execution of the analyzed version of the user program also accounts for pipeline effects.

18. The design system of claim 11,
wherein the processor simulator further includes a memory mapper that translates between target memory addresses and host memory addresses, the translation using memory mapping information.

19. The design system of claim 18,
wherein invoking the TLB simulator for a memory reference further includes invoking the memory mapper to translate the target memory address for the memory reference to a host memory address for the memory reference.

20. The design system of claim 18,
wherein parts of the memory mapper are incorporated in the simulated TLB entries such that the MMU simulator both translates a virtual address to a physical address during simulation, and automatically also provides the host address for the physical address.

21. The design system of claim 18,
wherein the target digital circuitry including one or more devices coupled to the target processor, each device having a target address,
wherein the memory mapper also translates addresses to the target addresses of each of the devices,
wherein the identifying step of determining the analyzed version of the user program includes identifying those parts of the user program that include one or more references that each is either a memory reference or a reference that require a read or write to a device, and inserting hooks in the user program to invoke, at run time, a reference process for each of the references, the reference process including: determining if the reference is a memory reference or a device reference, and if a device reference, determining the physical address of the device, and causing the processor simulator to communicate with the hardware simulator via the communication mechanism to cause the device to be written to or read from, and if a memory reference, invoking the cache simulator for the memory reference.

22. The design system of claim 10, wherein determining the analyzed version of the user program further includes inserting one or more instructions into the host code buffer for accumulating the simulation time for the code translated in the host code buffer.

23. The design system of claim 10,
wherein the processor simulator simulates allocated blocks of target memory, wherein each allocated block of simulated target memory is partitioned into sub-blocks, and wherein state information is defined for each sub-block to automatically ensure that executing the analyzed code avoids re-executing analyzed code that in simulation has subsequently been modified.

24. The design system of claim 23,
wherein the state information is further to indicate the memory state in the case that the electronic system includes a plurality of target processors sharing the same memory.

25. The design system of claim 1,
wherein the processor simulator and the hardware simulator process independently of each other.

26. The design system of claim 1,
wherein the processor simulator communication mechanism communicates information associated with the event to the hardware simulator, and
wherein the hardware simulator receives the associated event information.

27. The design system of claim 26,
wherein the hardware simulator processes the associated event information.

28. The design system of claim 27,
wherein the event information includes time delay information indicating an amount of simulated time since a previous event, and
wherein, upon receiving the time delay information, the hardware simulator executes an appropriate amount of hardware simulation time.

29. The design system of claim 1,
wherein the host computer system includes a computer network containing a first and a second host computer,
wherein the processor simulator operates on the first host computer,
wherein the hardware simulator operates on the second host computer, and
wherein the processor simulator is coupled to the hardware simulator by a computer network connection of the computer network, and
wherein the interface mechanism controls communications over the network connection.

30. The design system of claim 27, further comprising
a suspend mechanism coupled to the processor simulator that temporarily halts execution of the user program on the processor simulator while the hardware simulator processes the event information.

31. The design system of claim 30, wherein the interface mechanism includes the suspend mechanism.

32. The design system of claim 27,
wherein the hardware simulator processing the event information produces an event result, and,
wherein the hardware simulator includes a mechanism to communicate the event result to the processor simulator using the interface mechanism.

33. The design system of claim 32, wherein the event result is an interrupt, and is processed upon receipt of the event result by the processor simulator.

34. The design system of claim 32, further including
a resumption mechanism coupled to the processor simulator to resume execution of the user program upon receipt of the event result.

35. The design system of claim 1, wherein the event requiring the user program to interact with the target digital circuitry is an input/output instruction to the hardware simulator.

36. The design system of claim 1, wherein the processor simulator uses a first data format and the hardware simulator uses a second data format, the system further including a translator to convert the associated event information from the first data format to the second data format.

37. The design system of claim 32,
wherein the hardware simulator contains a processor model shell to access at least some of the external hardware signals of the target processor connected to the digital circuitry in the electronic system, and
wherein the processor simulator uses a first data format and the hardware simulator uses a second data format, the design system further including a mapper to map an event result in the second data format to the first data format.

38. The design system of claim 1, wherein the hardware simulator operates in a hardware description language, and at least some of the digital circuitry is specified in the hardware description language.

39. The design system of claim 1, wherein the interface mechanism includes a message passing kernel.

40. The design system of claim 39, wherein the processor simulator and the hardware simulators are tasks under the kernel.

41. A method of simulating an electronic system that includes target digital circuitry and one or more target processors, each with an accompanying user program to be executed on its target processor, the simulation on a host computer system including one or more host processors, the method comprising:
for each target processor, providing the user program in binary form, and executing a processor simulation process including determining an analyzed version of the user program, and simulating execution of the target processor's user program by executing the analyzed version of the user program on a host processor, determining the analyzed version of the user program including:
decomposing the user program into linear blocks,
translating each linear block of the user program into host code that simulate the operations of the linear block,
storing the host code of each linear block in a host code buffer for the linear block,
adding timing information into the code in the host code buffer on the time it would take for the target processor to execute the user program, the timing information incorporating target processor instruction timing, the adding of timing information including inserting of dynamic hooks into the corresponding host code in the host code buffer that during execution invoke dynamic mechanisms that may effect timing and that cannot be determined ahead of execution,
such that while the processor simulation process executes the analyzed version of the user program, the processor simulator accumulates simulation time according to a simulation time frame, the accumulated simulation time accounting for the target processor instruction timing as if the user program was executing on the target processor;
simulating the target digital circuitry on a hardware simulator operating on the host computer system, the simulating of the target digital circuitry including accumulating timing information; and
passing communication between the processor simulation process and the hardware simulator at significant events, including events that require interaction between the user program and the target digital circuitry.

42. The method of claim 41,
wherein a target processor includes a cache, wherein the processor simulation process of the target processor with the cache includes storing a simulated cache containing simulated cache entries, and wherein determining the analyzed version of the user program further includes, for each linear block,
identifying those parts in the linear block of the user program that include one or more memory references that might require a cache lookup, and inserting hooks into the corresponding host code in the corresponding host code buffer to lookup, at run time, the simulated cache for any simulated memory reference that might require a cache lookup;
such that executing the analyzed version of the user program:
causes simulating the cache for the memory references to account for the effect of cache lookups on timing, and
accumulates simulation time as if the user program was executing on the target processor, the accumulated simulation time also accounting for cache lookup effects.

43. The method of claim 42, wherein looking up the cache for at least one of the memory references includes searching the simulated cache for an entry that matches an address.

44. The method of claim 43, wherein searching the simulated cache includes partitioning the address to be lookup up into a set of address parts, and sequentially looking up the address parts in a set of multi-level lookup tables wherein each valid lookup table element points to the next lower-level lookup table to look up, valid last lookup table elements pointing to the simulated cache entries of the simulated cache.

45. The method of claim 44, wherein looking up the address parts in the set of multi-level lookup tables requires the same number of table lookups independent of whether the cache lookup is successful or not.

46. The method of claim 45, wherein the set of multi-level lookup tables includes a null table at each level but the highest, each null table element pointing to the next level null table, the last null lookup table elements pointing to a null simulated cache entry guaranteed never to match an address, so that the validity or not of any lookup table entry never needs to be tested.

47. The method of claim 43, the processor simulation process of the target processor with the cache further includes storing, at execution time, for an instruction that might require a cache lookup, a pointer to the simulated cache entry that results from a lookup of the simulated cache the first time execution of the target instruction is simulated such that searching the simulated cache can be avoided the next time the target instruction is executed in simulation.

48. The method of claim 42, wherein a linear block of the user program of the target processor having a cache has a maximum length equal to the length of a cache line of the cache used for instructions such that executing the host code in the host code buffer for the linear block can operate under that assumption that all the target code of that linear block is in cache so that no instruction cache misses will occur.

49. The method of claim 48, wherein determining the analyzed version of the user program further includes, for each linear block, inserting a hook to determine once at executing time whether or not the linear block of target code simulated is in cache.

50. The method of claim 41,
wherein a target processor includes a memory management unit (MMU) having a TLB for translating virtual addresses to physical addresses, wherein the processor simulation process of the target processor with the MMU includes storing a simulated TLB having simulated TLB entries, and wherein determining the analyzed version of the user program further includes, for each linear block,
identifying those parts in the linear block of the user program that include one or more memory references that might require accessing the MMU, and inserting hooks into the corresponding host code in the corresponding host code buffer to lookup, at run time, the simulated TLB for the TLB entry that matches any simulated memory reference that might require an MMU access;
such that executing the analyzed version of the user program:
causes looking up the simulated TLB to find an entry that matches a virtual address and a page size for the memory references to account for the effect of MMU accesses on timing, and
accumulates simulation time as if the user program was executing on the target processor, the accumulated simulation time also accounting for MMU access effects.

51. The method of claim 50, wherein looking up the simulated TLB for at least one of the memory references includes searching the simulated TLB for an entry that matches an address.

52. The method of claim 51, wherein searching the simulated TLB includes partitioning the address to be lookup up into a set of address parts, and sequentially looking up the address parts in a set of multi-level lookup tables wherein each valid lookup table element points to the next lower-level lookup table to look up, valid last lookup table elements pointing to the simulated TLB entries of the simulated TLB.

53. The method of claim 52, wherein looking up the address parts in the set of multi-level lookup tables requires the same number of table lookups independent of whether the TLB lookup is successful or not.

54. The method of claim 53,
wherein the simulated TLB entries include memory mapping information for mapping physical addresses to host addresses, such that looking up the simulated TLB both translates a virtual address to a physical address during the execution simulation, and automatically also provides the host address for the physical address.

55. The method of claim 54,
wherein the one or more entries of the simulated TLB simulating each TLB entry are represented by memory allocation data structure that represents memory mapping information for mapping physical addresses to host addresses, each element of the memory allocation data structure for a simulated TLB entry representing a block of physical memory addresses, and each element of the memory allocation data structure for a simulated TLB entry representing allocated physical memory including a pointer to where in the memory space of the host processor that physical block of memory is stored, such that looking up the simulated TLB both translates a virtual address to a physical address during the execution simulation, and automatically also provides the host address for the physical address.

56. The method of claim 55,
wherein the memory allocation data structure is a linked list.

57. The method of claim 53, wherein the set of multi-level lookup tables includes a null table at each level but the highest, each null table element pointing to the next level null table, the last null lookup table elements pointing to a null simulated TLB entry guaranteed never to match an address, so that the validity or not of any lookup table entry never needs to be tested.

58. The method of claim 53,
wherein the entries of the simulated TLB include a replica lookup table having an element pointing back to the simulated TLB entry, such that a simulated TLB entry is able to act as one of the lookup tables,
wherein a lookup table at any level may include an element pointing to a simulated TLB entry, and
wherein the simulated TLB includes a null simulated TLB entry guaranteed never to match an address, so that the validity or not of any lookup table entry never needs to be tested.

59. The method of claim 51, wherein the processor simulation process of the target processor with the TLB further includes storing, at execution time, for an instruction that might require a TLB lookup, a pointer to the simulated TLB entry that results from a lookup of the simulated TLB the first time execution of the target instruction is simulated such that searching the simulated TLB can be avoided the next time the target instruction is executed in simulation.

60. The method of claim 50,
wherein the processor simulation process of the target processor with the MMU further includes storing memory mapping information for translating between target memory addresses and host memory addresses.

61. The method of claim 60,
wherein the memory mapping information is in the form of a memory allocation data structure, each element of the memory allocation data structure representing a block of physical memory addresses that includes, in the case that the block of physical addresses is allocated, a pointer to where in the memory space of the host processor that physical block of memory is stored.

62. The method of claim 61,
wherein the memory allocation data structure is in the form of an ordered linked list, each element of the linked list representing a block of physical memory addresses, and each linked list element representing allocated physical memory including a pointer to where in the memory space of the host processor that physical block of memory is stored.

63. The method of claim 60,
wherein looking up the simulated TLB for a TLB entry matching a memory reference further includes searching the memory mapping information to translate the target memory address for the memory reference to a host memory address for the memory reference.

64. The method of claim 62,
wherein looking up the simulated TLB for a memory reference further includes searching the set of linked list elements for a matching address to translate the physical address of the TLB entry matching the memory reference to a host memory address for the memory reference.

65. The method of claim 62,
wherein the one or more entries of the simulated TLB simulating each TLB entry are represented by an ordered linked list that is a subset of the ordered linked list representing the memory mapping information, each element of the simulated TLB linked list representing a block of physical memory addresses, and each simulated TLB linked list element representing allocated physical memory including a pointer to where in the memory space of the host processor that physical block of memory is stored, such that looking up the simulated TLB both translates a virtual address to a physical address during the execution simulation, and automatically also provides the host address for the physical address.

66. The method of claim 50, wherein determining the analyzed version of the user program further includes inserting one or more instructions into the host code buffer for accumulating the simulation time for the code translated in the host code buffer.

67. The method of claim 41,
wherein the passing communication communicates information associated with the event to the hardware simulator, and
wherein the hardware simulator receives the associated event information.

68. The method of claim 67,
wherein the hardware simulator processes the associated event information.

69. The method of claim 68,
wherein the event information includes time delay information indicating an amount of simulated time since a previous event, and
wherein, upon receiving the time delay information, the hardware simulator executes an appropriate amount of hardware simulation time.

70. The method of claim 68, further comprising
a suspend mechanism coupled to the processor simulation process that temporarily halts the processor simulation process while the hardware simulator processes the event information.

71. The method of claim 68,
wherein the hardware simulator processing the event information produces an event result, and,
wherein the hardware simulator includes a mechanism to communicate the event result to the processor simulation process.

72. The method of claim 71, further including
a resumption mechanism coupled to the processor simulation process to resume execution of the user program upon receipt of the event result.

73. A method of simulating on a host computer system the execution of a user program on a target processor having a TLB, the method comprising:
decomposing the user program into linear blocks of target code;
translating each linear block into host code that simulates the operations of the linear block;
storing the host code of each linear block in a host code buffer for the linear block;
for each linear block, inserting dynamic hooks into the host code in the host code buffer that during execution invoke dynamic mechanisms that may effect timing and that cannot be determined ahead of execution, the inserting of dynamic hooks including inserting hooks into the user program to invoke a TLB simulation process for any reference that includes a memory reference that might require a TLB lookup, the TLB simulation process including looking up a simulated TLB having simulated TLB entries;
for each linear block, adding timing information into the code in the host code buffer on the time it would take for the target processor to execute the user program, the timing information incorporating target processor instruction timing and TLB effects;
executing the code in the host code buffers; and
accumulating simulation time according to a simulation time frame, the accumulated simulation time accounting for the target processor instruction timing and TLB effects as if the user program was executing on the target processor,
the TLB simulation process including storing, at execution time, for a target instruction that might require a TLB lookup, a pointer to the simulated TLB entry that results from a lookup of the simulated TLB the first time execution of the target instruction is simulated such that searching the simulated TLB can be avoided the next time the target instruction is executed in simulation.

74. The method of claim 73, further including:
simulating target digital circuitry on a hardware simulator running on the host computer system,
wherein executing the code in the host code buffers includes communicating with the hardware simulator when an event requires interaction of the user program with the target digital circuitry.

75. A method of simulating on a host computer system the execution of a user program on a target processor having a TLB, the method comprising:

decomposing the user program into linear blocks of target code;

translating each linear block into host code that simulates the operations of the linear block;

storing the host code of each linear block in a host code buffer for the linear block;

for each linear block, inserting dynamic hooks into the host code in the host code buffer that during execution invoke dynamic mechanisms that may effect timing and that cannot be determined ahead of execution, the inserting of dynamic hooks including inserting hooks into the user program to invoke a TLB simulation process for any reference that includes a memory reference that might require a TLB lookup, the TLB simulation process including looking up a simulated TLB having simulated TLB entries;

for each linear block, adding timing information into the code in the host code buffer on the time it would take for the target processor to execute the user program, the timing information incorporating target processor instruction timing and TLB effects;

executing the code in the host code buffers; and accumulating simulation time according to a simulation time frame, the accumulated simulation time accounting for the target processor instruction timing and TLB effects as if the user program was executing on the target processor, wherein the attributes of a TLB entry are encoded in the corresponding simulated TLB entry such that the testing of whether or not a virtual address and a page size match an entry of the simulated TLB automatically also checks permission without a separate permissions check required.

76. The method of claim 75, wherein the attributes of a TLB entry are encoded in the corresponding simulated TLB entry such that the testing of whether or not a virtual address and a page size match an entry of the simulated TLB automatically also checks alignment without a separate alignment check required.

77. The method of claim 76, wherein the simulated TLB entry is encoded such that the address and page size match test fails when there is no permission or the alignment is incorrect.

78. The method of claim 77, wherein the simulated TLB entry includes a set of versions of the TLB entry virtual address and TLB entry page size information, each version corresponding to a different mode, and wherein testing a virtual address and page size pair for a match in a simulated TLB entry also includes indexing to the version of the of the TLB entry virtual address and TLB entry page according to the mode.

79. A method of simulating on a host computer system the execution of a user program on a target processor having a cache, the method comprising:

decomposing the user program into linear blocks of target code;

translating each linear block into host code that simulates the operations of the linear block;

storing the host code of each linear block in a host code buffer for the linear block;

for each linear block, inserting dynamic hooks into the host code in the host code buffer that during execution invoke dynamic mechanisms that may effect timing and that cannot be determined ahead of execution, the inserting of dynamic hooks including inserting hooks into the user program to invoke a cache simulation process for any reference that includes a memory reference that might require a cache lookup, the cache simulation process including looking up a simulated cache having simulated cache entries;

for each linear block, adding timing information into the code in the host code buffer on the time it would take for the target processor to execute the user program, the timing information incorporating target processor instruction timing and cache effects;

executing the code in the host code buffers; and accumulating simulation time according to a simulation time frame, the accumulated simulation time accounting for the target processor instruction timing and cache effects as if the user program was executing on the target processor, the cache simulation process including storing, at execution time, for a target instruction that might require a cache lookup, a pointer to the simulated cache entry that results from a lookup of the simulated cache the first time execution of the target instruction is simulated such that searching the simulated cache can be avoided the next time the target instruction is executed in simulation.

80. The method of claim 79, further including:

simulating target digital circuitry on a hardware simulator running on the host computer system, wherein executing the code in the host code buffers includes communicating with the hardware simulator when an event requires interaction of the user program with the target digital circuitry.

81. A method of simulating on a host computer system the execution of a user program on a target processor, the method comprising:

decomposing the user program into linear blocks of target code;

translating each linear block into host code that simulates the operations of the linear block;

storing the host code of each linear block in a host code buffer for the linear block;

for each linear block, inserting dynamic hooks into the host code in the host code buffer that during execution invoke dynamic mechanisms that may effect timing and that cannot be determined ahead of execution;

for each linear block, adding timing information into the code in the host code buffer on the time it would take for the target processor to execute the user program, the timing information incorporating target processor instruction timing and cache effects;

for each host code buffer, looking up the next host code buffer to execute and executing the code in the next code buffers in sequence; and accumulating simulation time according to a simulation time frame, the accumulated simulation time accounting for the target processor instruction timing and cache effects as if the user program was executing on the target processor, wherein the looking up the next host code buffer at the conclusion of processing the code in a present host code buffer includes searching for the next host code buffer the first time the present host code buffer is processed, and, after the next host code buffer is found or newly created, storing for the present host code buffer a pointer to the next host code buffer such that the search for the next host code buffer can be avoided the next time the present host code buffer is processed and its next host code buffer is looked up.

82. The method of claim 81, wherein for each host code buffer, two next host code buffer pointers are stored, one pointing to a first host code buffer for a taken branch and the other pointing to a second host code buffer for an untaken branch in the case that the last target instruction translated in the present host code buffer is a conditional branch.

83. The method of claim 81, wherein a return address is stored for the present HCB in the case that the next HCB pointer does not point to the correct next HCB, wherein the present host code buffer includes an instruction to jump unconditionally to the location pointed to by the next pointer stored for the next host code buffer, and wherein the next host code buffer pointer initially points to a process to search for the next host code buffer, so that executing the code in a host code buffer of a sequence of host code buffers always ends in an unconditional indirect jump to the next location.

* * * * *

UNITED STATES PATENT AND TRADEMARK OFFICE
CERTIFICATE OF CORRECTION

PATENT NO. : 6,751,583 B1
DATED : June 15, 2004
INVENTOR(S) : Clarke et al.

It is certified that error appears in the above-identified patent and that said Letters Patent is hereby corrected as shown below:

Column 9,
Line 62, please change "can accommodate is additional processor simulators" to -- can accommodate additional processor simulators --.

Column 33,
Line 8, please change "to invoke is the TLB simulator" to -- to invoke the TLB simulator --.

Column 36,
Line 28, please change "FIG. SC" to -- FIG. 5C --.

Column 38,
Line 1, please change "Is" to -- ls --.

Column 50,
Line 33, please change "includes the timing information in the form of host code" to -- includes the timing information 110 in the form of host code --.

Signed and Sealed this

Twenty-seventh Day of July, 2004

JON W. DUDAS
*Acting Director of the United States Patent and Trademark Office*